United States Patent
Park et al.

(10) Patent No.: US 11,071,086 B2
(45) Date of Patent: Jul. 20, 2021

(54) WIRELESS COMMUNICATIONS FOR NETWORK ACCESS CONFIGURATION

(71) Applicant: Comcast Cable Communications, LLC, Philadelphia, PA (US)

(72) Inventors: Kyungmin Park, Herndon, VA (US); Esmael Dinan, McLean, VA (US); Jinsook Ryu, Herndon, VA (US); Hua Zhou, Herndon, VA (US); Ali Cirik, Herndon, VA (US); Hyoungsuk Jeon, Centreville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/863,160

(22) Filed: Apr. 30, 2020

(65) Prior Publication Data

US 2020/0351818 A1 Nov. 5, 2020

Related U.S. Application Data

(60) Provisional application No. 62/840,717, filed on Apr. 30, 2019.

(51) Int. Cl.
| | |
|---|---|
| *H04B 1/38* | (2015.01) |
| *H04W 48/10* | (2009.01) |
| *H04W 68/00* | (2009.01) |
| *H04W 76/28* | (2018.01) |
| *H04W 4/90* | (2018.01) |
| *H04W 74/08* | (2009.01) |

(52) U.S. Cl.
CPC ........... *H04W 68/005* (2013.01); *H04W 4/90* (2018.02); *H04W 74/0833* (2013.01); *H04W 76/28* (2018.02)

(58) Field of Classification Search
CPC ... H04W 68/02; H04W 68/005; H04W 76/27; H04W 76/28; H04W 68/00; H04W 68/025; H04W 74/0833; H04W 88/06; H04W 36/0061; H04W 36/0083; H04W 76/10; H04W 36/0085; H04W 36/0094
See application file for complete search history.

(56) References Cited

U.S. PATENT DOCUMENTS

| | | | |
|---|---|---|---|
| 8,971,961 | B2 | 3/2015 | Bishop et al. |
| 9,232,556 | B2 | 1/2016 | Su |
| 9,407,308 | B1 | 8/2016 | Su et al. |

(Continued)

FOREIGN PATENT DOCUMENTS

| | | |
|---|---|---|
| CN | 108632949 A | 10/2018 |
| EP | 3471459 A1 | 4/2019 |

(Continued)

OTHER PUBLICATIONS

Sep. 24, 2020, Extended European Search Report, EP 20172497.8.

(Continued)

*Primary Examiner* — Gary Lafontant
(74) *Attorney, Agent, or Firm* — Banner & Witcoff, Ltd.

(57) ABSTRACT

Wireless communications for network access configuration are described. A base station may configure a monitoring gap for a wireless device, based on information received from the wireless device. The wireless device may use the monitoring gap to communicate with another base station associated with another wireless network.

20 Claims, 33 Drawing Sheets

(56) References Cited

U.S. PATENT DOCUMENTS

| | | | |
|---|---|---|---|
| 9,769,867 | B2 | 9/2017 | Ramkumar et al. |
| 9,883,510 | B2 | 1/2018 | Su |
| 9,985,771 | B2 | 5/2018 | Olufunmilola et al. |
| 10,021,705 | B2 | 7/2018 | Franz et al. |
| 10,111,119 | B2 | 10/2018 | Dev et al. |
| 2013/0303203 | A1 | 11/2013 | Wang et al. |
| 2014/0233530 | A1 | 8/2014 | Damnjanovic et al. |
| 2014/0362824 | A1 | 12/2014 | Rousu et al. |
| 2015/0011236 | A1 | 1/2015 | Kazmi et al. |
| 2015/0057046 | A1 | 2/2015 | Challa et al. |
| 2015/0139015 | A1 | 5/2015 | Kadous et al. |
| 2015/0257199 | A1 | 9/2015 | Su |
| 2015/0312717 | A1 | 10/2015 | Shih et al. |
| 2016/0227547 | A1 | 8/2016 | Su |
| 2016/0302114 | A1 | 10/2016 | Jain et al. |
| 2017/0127305 | A1 | 5/2017 | Dev et al. |
| 2018/0062776 | A1* | 3/2018 | Teshima ............... H04W 16/14 |
| 2018/0176934 | A1* | 6/2018 | Uchino ............. H04W 72/1231 |
| 2018/0184452 | A1 | 6/2018 | Bitra et al. |
| 2020/0022109 | A1* | 1/2020 | Wang ................... H04W 76/28 |

FOREIGN PATENT DOCUMENTS

| | | |
|---|---|---|
| TW | 201832532 A | 9/2018 |
| WO | 2015105813 A2 | 7/2015 |
| WO | 2016118331 A1 | 7/2016 |
| WO | 2018005419 A1 | 1/2018 |
| WO | 2018232294 A1 | 12/2018 |

OTHER PUBLICATIONS

3GPP TS 36.331 V15.4.0 (Dec. 2018), Technical Specification, 3rd Generation Partnership Project; Technical Specification Group Radio Access Network; Evolved Universal Terrestrial Radio Access (E-UTRA); Radio Resource control (RRC); Protocol specification (Release 15).

R2-115375 3GPP TSG-RAN WG2 #75bis, Zhuhai, China, Oct. 10-14, 2011, Source: Ericsson, Title: Dual-SIM Dual-Standby UEs and their impact on the RAN.

S2-144682 SA WG2 Meeting #106, San Francisco, California, Nov. 17-21, 2014, Source: Alcatel-Lucent, Alcatel-Lucent Shanghai Bell, Verizon, Cisco, Nokia Networks, Title: Paging policy differentiation for IMS voice.

S2-1812404 SA WG2 Meeting #129bis, West Palm Beach, Florida, Nov. 26-30, 2018, Source: Intel, Title: Background information for the proposals on multi-SIM and Paging Cause.

S2-1813349 SA WG2 Meeting #129bis, West Palm Beach, Florida, Nov. 26-30, 2018, Source: Intel, Verizon, AT&T, Sony, Samsung, Charter Communications, China Mobile, Lenovo, Motorola Mobility, NEC, vivo, OPPO, KPN, ETRI, InterDigital, Convida Wireless, Title: New SID: Study on system enablers for multi-SIM devices.

"Enterprise Private LTE." SpiderCloud Wireless, retrieved from https://www.coming.com/microsites/coc/IBN/documents/SpiderCloud-Private-LTE.pdf on Oct. 6, 2020.

Ghai, Rajat, "CBRS Use-Cases With Focus on Localized Indoor Mobile Access (LIMA), Mobility and Service Continuity." 2018 Fall Technical Forum: SCTE ISBE, Atlanta, Georgia, Oct. 22-25, 2018.

* cited by examiner

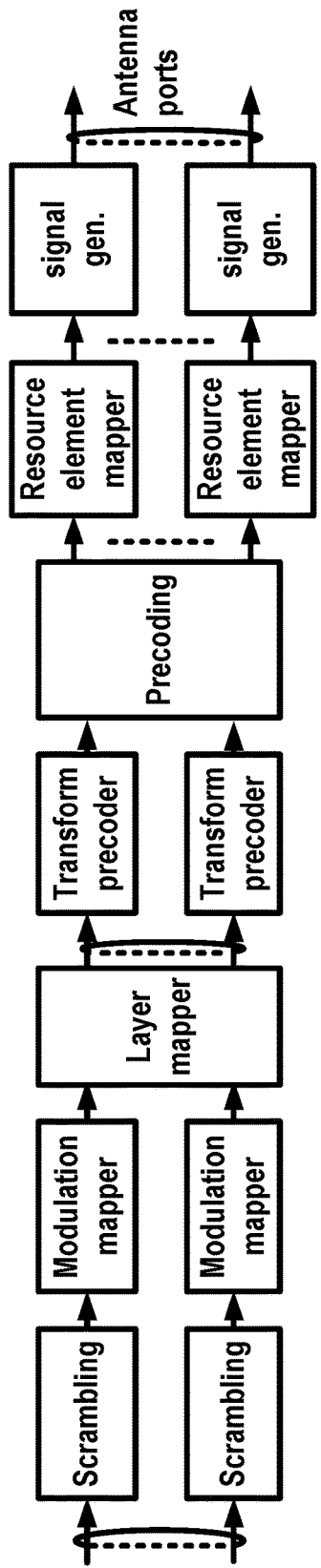
FIG. 4A
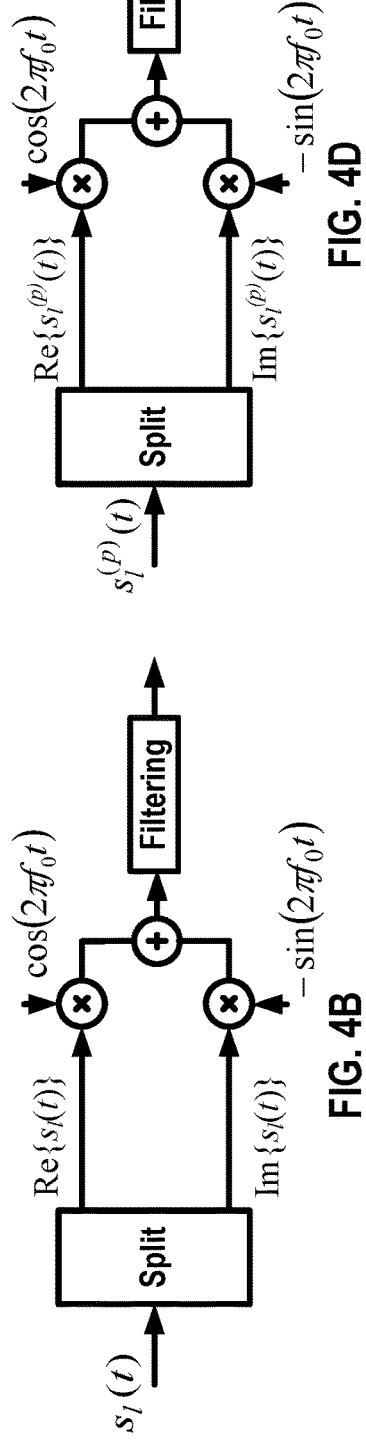
FIG. 4B
FIG. 4D
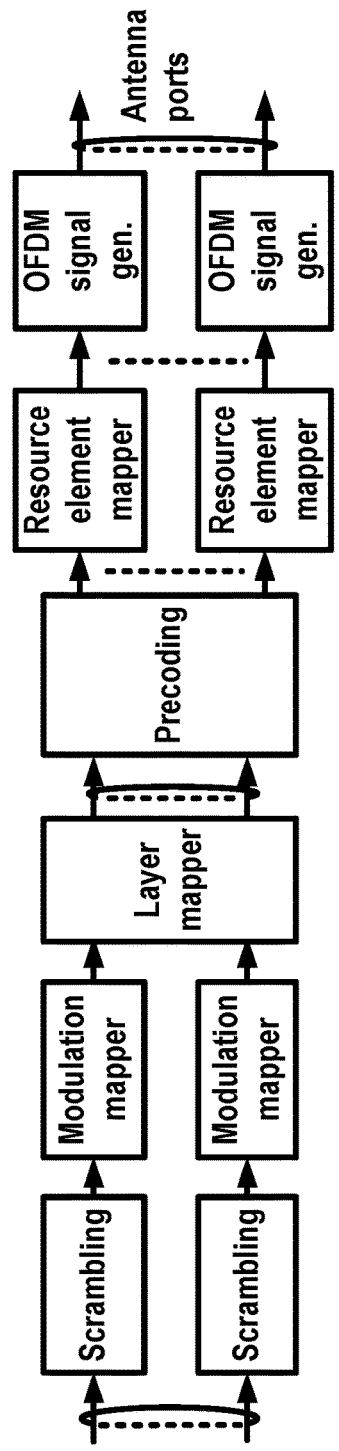
FIG. 4C

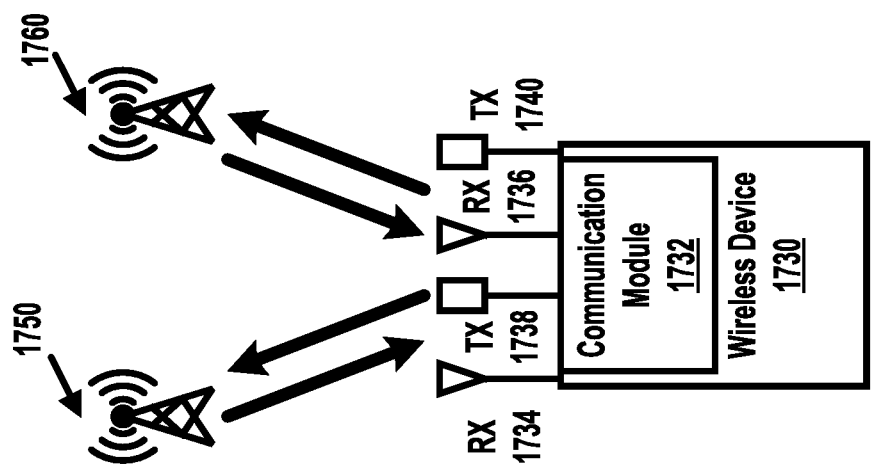
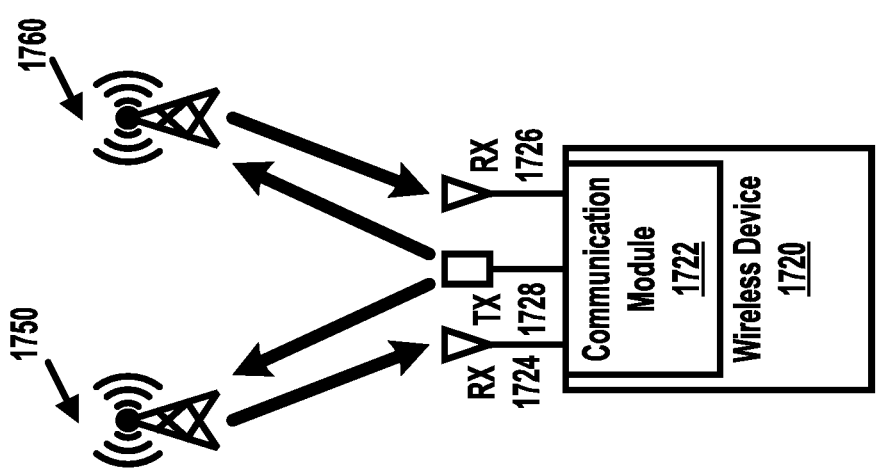
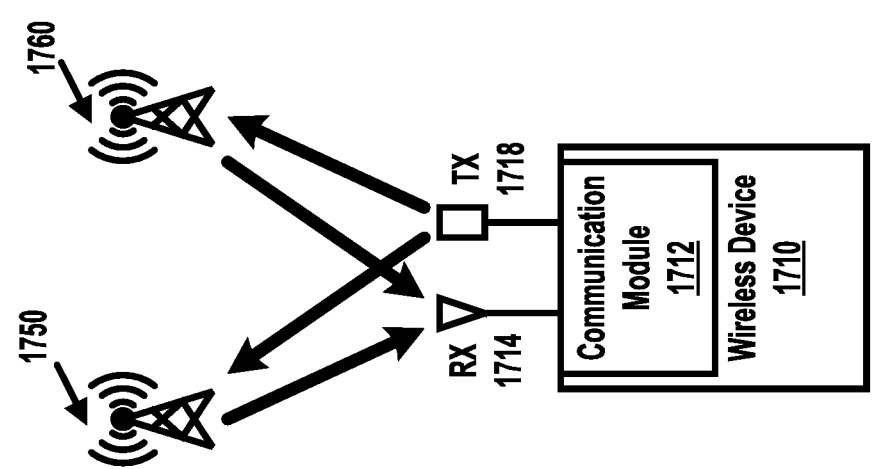

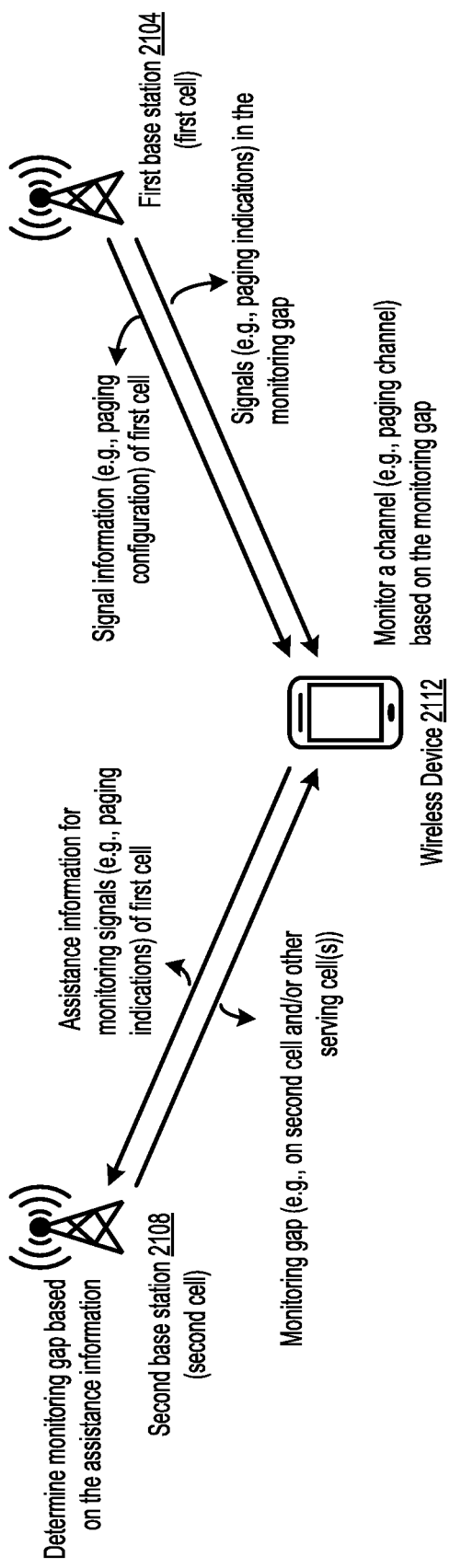
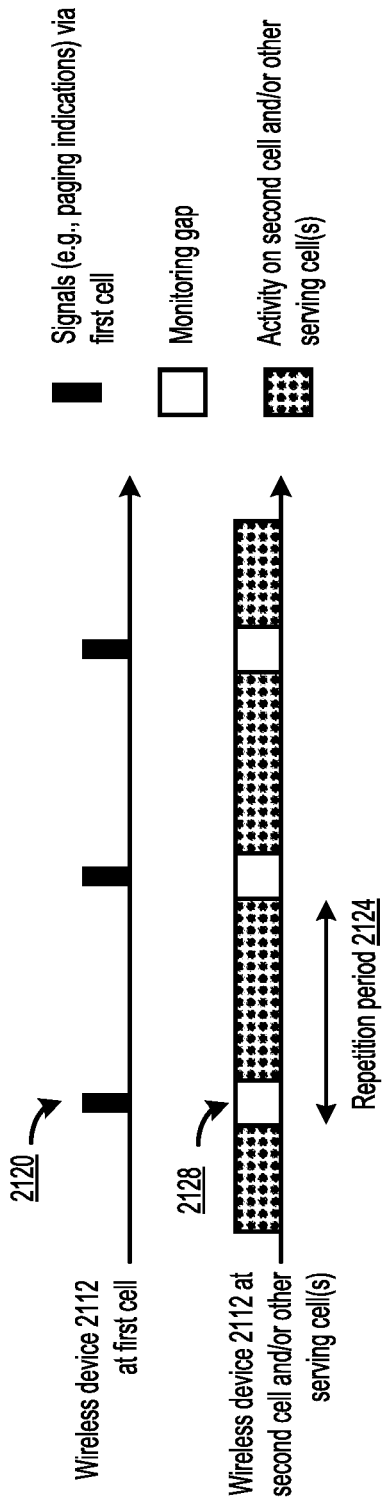
FIG. 21A
FIG. 21B

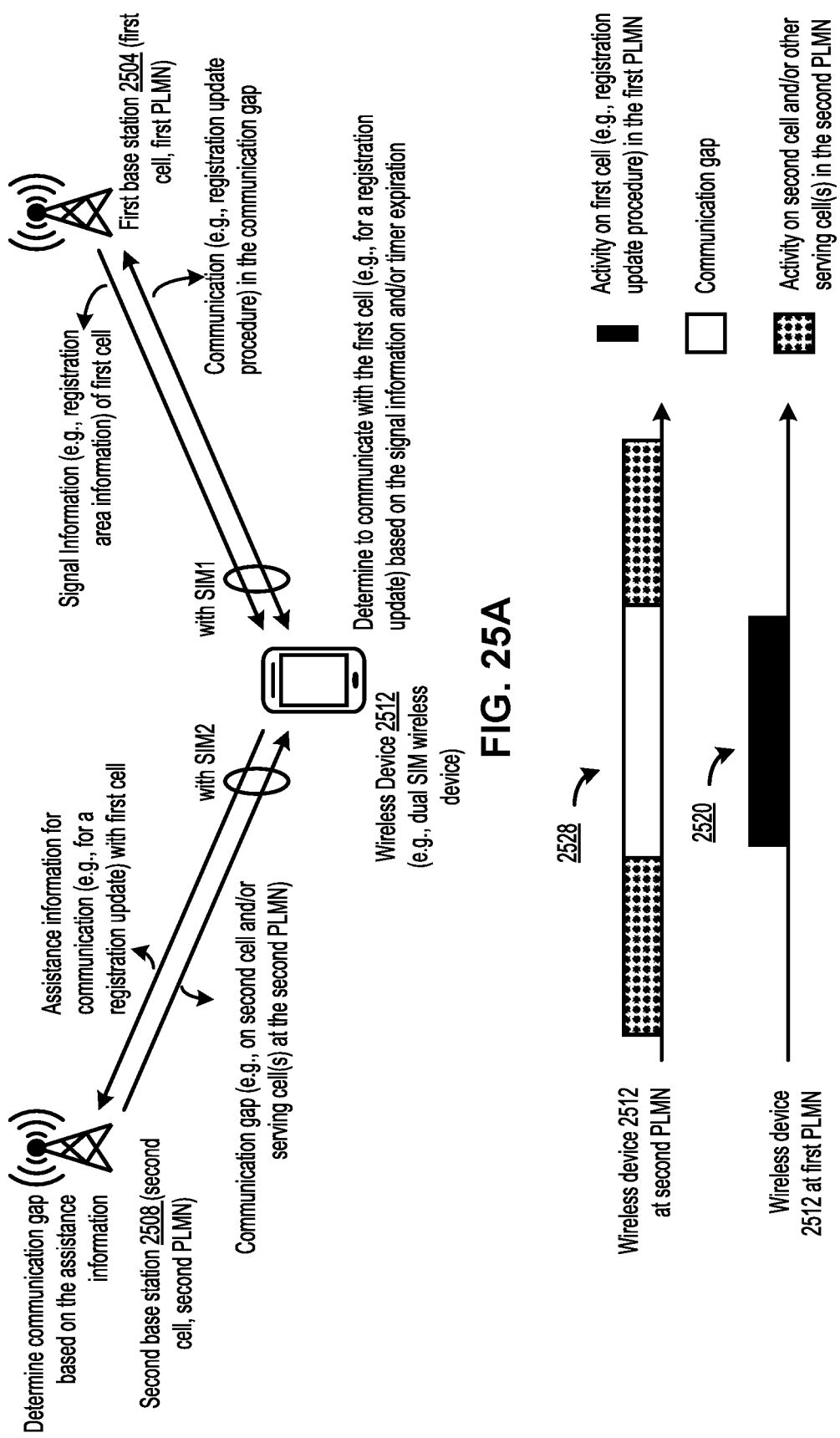

PCCH-Config field

```
PCCH-Config ::=            SEQUENCE {
    defaultPagingCycle         PagingCycle,
    nAndPagingFrameOffset      CHOICE {
        oneT                       NULL,
        halfT                      INTEGER (0..1),
        quarterT                   INTEGER (0..3),
        oneEighthT                 INTEGER (0..7),
        oneSixteenthT              INTEGER (0..15)
    },
    ns                         ENUMERATED {four, two, one},
    firstPDCCH-MonitoringOccasionOfPO   CHOICE {
        sCS15KHZoneT                                                     SEQUENCE (SIZE (1..maxPO-perPF)) OF INTEGER (0..139),
        sCS30KHZoneT-SCS15KHZhalfT                                       SEQUENCE (SIZE (1..maxPO-perPF)) OF INTEGER (0..279),
        sCS60KHZoneT-SCS30KHZhalfT-SCS15KHZquarterT                      SEQUENCE (SIZE (1..maxPO-perPF)) OF INTEGER (0..559),
        sCS120KHZoneT-SCS60KHZhalfT-SCS30KHZquarterT-SCS15KHZoneEighthT   SEQUENCE (SIZE (1..maxPO-perPF)) OF INTEGER (0..1119),
        sCS120KHZhalfT-SCS60KHZquarterT-SCS30KHZoneEighthT-SCS15KHZoneSixteenthT  SEQUENCE (SIZE (1..maxPO-perPF)) OF INTEGER (0..2239),
        sCS120KHZquarterT-SCS60KHZoneEighthT-SCS30KHZoneSixteenthT       SEQUENCE (SIZE (1..maxPO-perPF)) OF INTEGER (0..4479),
        sCS120KHZoneEighthT-SCS60KHZoneSixteenthT                        SEQUENCE (SIZE (1..maxPO-perPF)) OF INTEGER (0..8959),
        sCS120KHZoneSixteenthT                                           SEQUENCE (SIZE (1..maxPO-perPF)) OF INTEGER (0..17919)
    }                          OPTIONAL,      -- Need R
    ...
}
```

FIG. 27

| PCCH-Config field descriptions |
|---|
| *defaultPagingCycle* |
| Default paging cycle, used to derive 'T' in TS 38.304 [20]. Value rf32 corresponds to 32 radio frames, rf64 corresponds to 64 radio frames and so on. |
| *firstPDCCH-MonitoringOccasionOfPO* |
| Points out the first PDCCH monitoring occasion for paging of each PO of the PF. |
| *nAndPagingFrameOffset* |
| Used to derive the number of total paging frames in T (corresponding to parameter N) and paging frame offset (corresponding to parameter PF_offset). A value of oneSixteenthT corresponds to T / 16, a value of oneEighthT corresponds to T / 8, and so on.<br>If pagingSearchSpace is set to zero and if RMSI multiplexing pattern is 2 or 3:<br>- for ssb-periodicityServingCell of 5 or 10ms, N can be set to one of {oneT, halfT, quarterT, oneEighthT, oneSixteenthT}<br>- for ssb-periodicityServingCell of 20ms, N can be set to one of {halfT, quarterT, oneEighthT, oneSixteenthT}<br>- for ssb-periodicityServingCell of 40ms, N can be set to one of {quarterT, oneEighthT, oneSixteenthT}<br>- for ssb-periodicityServingCell of 80ms, N can be set to one of {oneEighthT, oneSixteenthT}<br>- for ssb-periodicityServingCell of 160ms, N can be set to 'oneSixteenthT'<br>If pagingSearchSpace is set to zero and if RMSI multiplexing pattern is 1, N can be set to one of {halfT, quarterT, oneEighthT, oneSixteenthT}<br>If pagingSearchSpace is not set to zero, N can be configured to one of {oneT, halfT, quarterT, oneEighthT, oneSixteenthT} |
| *ns* |
| Number of paging occasions per paging frame |

FIG. 28

GapConfig (e.g., MonitoringGapConfig, CommunicationGapConfig, and/or MutingGapConfig) field

```
-- ASN1START
-- GAP-CONFIG-START

MonitoringGapConfig ::=     SEQUENCE {
    gapFR2                      SetupRelease { GapConfig }      OPTIONAL,    -- Need M
    ...,
    [[
    gapFR1                      SetupRelease { GapConfig }      OPTIONAL,    -- Need M
    gapUE                       SetupRelease { GapConfig }      OPTIONAL,    -- Need M
    ]]
}

GapConfig ::=               SEQUENCE {
    gapOffset                   INTEGER (0..159),
    gl                          ENUMERATED {ms1dot5, ms3, ms3dot5, ms4, ms5dot5, ms6},
    grp                         ENUMERATED {ms20, ms40, ms80, ms160},
    gta                         ENUMERATED {ms0, ms0dot25, ms0dot5},
    ...
}

-- CONFIG-STOP
-- ASN1STOP
```

FIG. 29

| GapConfig field descriptions |
|---|
| gapFR1<br>Indicates gap configuration that applies to frequency FR1. In the case of EN-DC, gapFR1 may not be set up by NR RRC (i.e. LTE RRC may configure FR1 gap). gapFR1 may not be configured together with gapUE. The applicability of the gap be configured. |
| gapFR2<br>Indicates gap configuration that applies to frequency FR2. gapFR2 may not be configured together with gapUE. The applicability of the gap be configured. |
| gapUE<br>Indicates gap configuration that applies to frequencies (FR1 and FR2). In the case of EN-DC, gapUE may not be set up by NR RRC (i.e. LTE RRC may configure per UE gap). If gapUE is configured, neither gapFR1 nor gapFR2 may be configured. The applicability of the gap may be configured. |
| gapOffset<br>Value gapOffset may be the gap offset of the gap pattern with MGRP indicated in the field grp. The value range may be from 0 to grp-1. |
| gl<br>Value gl is the gap length in ms of the gap. The applicability of the gap may be configured. Value ms1dot5 may correspond to 1.5ms, ms3 may correspond to 3ms and so on. |
| grp<br>Value grp is gap repetition period in (ms) of the gap. The applicability of the gap may be configured. |
| gta<br>Value gta is the gap timing advance in ms. The applicability of the gap timing advance may be configured. Value ms0 may correspond to 0 ms, ms0dot25 may correspond to 0.25ms, and ms0dot5 may correspond to 0.5ms. For FR2, the network may configure 0 and 0.25ms. |

FIG. 30

WIRELESS COMMUNICATIONS FOR NETWORK ACCESS CONFIGURATION

CROSS-REFERENCE TO RELATED APPLICATIONS

This application claims the benefit of U.S. Provisional Application No. 62/840,717, titled "Network Access Configuration Information" and filed on Apr. 30, 2019. The above-referenced application is hereby incorporated by reference in its entirety.

BACKGROUND

A wireless device may communicate with one or more base stations. The wireless device may be able to communicate/associate with multiple wireless networks, for example, using multiple subscriber/user identities/modules/identifiers.

SUMMARY

The following summary presents a simplified summary of certain features. The summary is not an extensive overview and is not intended to identify key or critical elements.

Wireless communications using multiple wireless networks are described. A wireless device may be configured to communicate via one or more wireless networks. A base station associated with a wireless network may configure one or more resources (e.g., a wireless resource gap) for the wireless device to communicate with another wireless network. Configuring resource(s) as described herein may provide advantages such as reduced interference, increased reliability, reduced latency, and/or improved interoperability for the wireless device to use different networks, devices, services, etc.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 17A, FIG. 17B, and FIG. 17C show example wireless devices comprising various quantities of transmitters and receivers.

FIG. 21A shows an example of communications via at least two base stations.

FIG. 21B shows an example of wireless device communications via two cells in a time domain.

FIG. 25A shows an example of communications via at least two wireless networks.

FIG. 25B shows example of wireless device communications via a first PLMN and via a second PLMN.

FIG. 27 shows example paging control channel (PCCH) configuration parameters.

FIG. 28 shows descriptions of the example PCCH configuration parameters.

FIG. 29 shows example configuration parameters of a resource/gap.

FIG. 30 shows example configuration parameters of a resource/gap.

DETAILED DESCRIPTION

Figure 1:
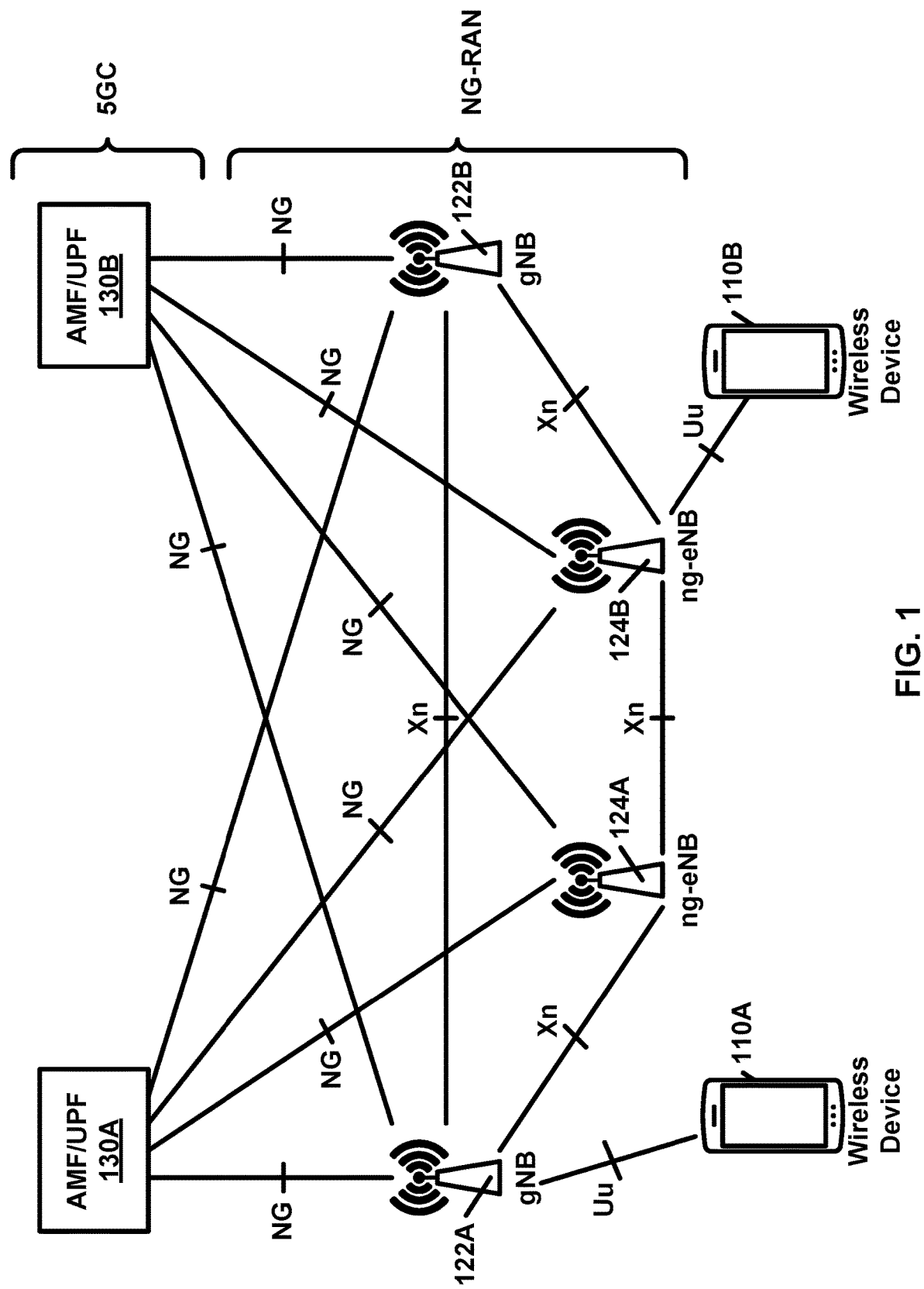
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to wireless communications for network access configuration.

The following acronyms are used throughout the drawings and/or descriptions, and are provided below for convenience although other acronyms may be introduced in the detailed description:

| | |
|---|---|
| 3GPP | 3rd Generation Partnership Project |
| 5GC | 5G Core Network |
| ACK | Acknowledgement |
| AMF | Access and Mobility Management Function |
| ARQ | Automatic Repeat Request |
| AS | Access Stratum |
| ASIC | Application-Specific Integrated Circuit |
| BA | Bandwidth Adaptation |
| BCCH | Broadcast Control Channel |
| BCH | Broadcast Channel |
| BFR | Beam Failure Recovery |
| BLER | Block Error Rate |
| BPSK | Binary Phase Shift Keying |
| BSR | Buffer Status Report |
| BWP | Bandwidth Part |
| CA | Carrier Aggregation |
| CC | Component Carrier |
| CCCH | Common Control CHannel |
| CDMA | Code Division Multiple Access |
| CN | Core Network |
| CORESET | Control Resource Set |
| CP | Cyclic Prefix |
| CP-OFDM | Cyclic Prefix- Orthogonal Frequency Division Multiplex |
| C-RNTI | Cell-Radio Network Temporary Identifier |
| CS | Configured Scheduling |
| CSI | Channel State Information |
| CSI-RS | Channel State Information-Reference Signal |
| CQI | Channel Quality Indicator |
| CSS | Common Search Space |
| CRC | Cyclic Redundancy Check |
| CU | Central Unit |
| DC | Dual Connectivity |
| DCCH | Dedicated Control Channel |
| DCI | Downlink Control Information |
| DL | Downlink |
| DL-SCH | Downlink Shared CHannel |
| DM-RS | DeModulation Reference Signal |
| DRB | Data Radio Bearer |
| DRX | Discontinuous Reception |
| DTCH | Dedicated Traffic Channel |
| DU | Distributed Unit |
| EPC | Evolved Packet Core |
| EPS | Evolved Packet System |
| E-UTRA | Evolved UMTS Terrestrial Radio Access |
| E-UTRAN | Evolved-Universal Terrestrial Radio Access Network |
| FDD | Frequency Division Duplex |
| FPGA | Field Programmable Gate Arrays |
| F1-C | F1-Control plane |
| F1-U | F1-User plane |
| gNB | next generation Node B |
| HARQ | Hybrid Automatic Repeat reQuest |
| HDL | Hardware Description Languages |
| IE | Information Element |
| IMSI | Internation Mobile Subscriber Identity |
| IP | Internet Protocol |
| LCH | Logical Channel |
| LCID | Logical Channel Identifier |
| LTE | Long Term Evolution |
| MAC | Medium Access Control |
| MBMS | Multimedia Broadcast Multicast Service |
| MCG | Master Cell Group |
| MCS | Modulation and Coding Scheme |
| MeNB | Master evolved Node B |
| MIB | Master Information Block |
| MME | Mobility Management Entity |
| MN | Master Node |
| NACK | Negative Acknowledgement |
| NAS | Non-Access Stratum |
| NG CP | Next Generation Control Plane |
| NGC | Next Generation Core |
| NG-C | NG-Control plane |
| ng-eNB | next generation evolved Node B |
| NG-U | NG-User plane |
| NR | New Radio |
| NR MAC | New Radio MAC |
| NR PDCP | New Radio PDCP |
| NR PHY | New Radio PHYsical |
| NR RLC | New Radio RLC |
| NR RRC | New Radio RRC |
| NSSAI | Network Slice Selection Assistance Information |
| O&M | Operation and Maintenance |
| OFDM | Orthogonal Frequency Division Multiplexing |
| PBCH | Physical Broadcast CHannel |
| PCC | Primary Component Carrier |
| PCCH | Paging Control CHannel |
| PCell | Primary Cell |
| PCH | Paging CHannel |
| PDCCH | Physical Downlink Control CHannel |
| PDCP | Packet Data Convergence Protocol |
| PDSCH | Physical Downlink Shared CHannel |
| PDU | Protocol Data Unit |
| PF | Paging Frame |
| PHICH | Physical HARQ Indicator CHannel |
| PHY | PHYsical |
| PLMN | Public Land Mobile Network |
| PMI | Precoding Matrix Indicator |
| PO | Paging Occasion |
| PRACH | Physical Random Access CHannel |
| PRB | Physical Resource Block |
| P-RNTI | Paging Radio Network Temporary Identifier |
| PSCell | Primary Secondary Cell |
| PSM | Power Saving Mode |
| PSS | Primary Synchronization Signal |
| pTAG | primary Timing Advance Group |
| PT-RS | Phase Tracking Reference Signal |
| PUCCH | Physical Uplink Control CHannel |
| PUSCH | Physical Uplink Shared CHannel |
| QAM | Quadrature Amplitude Modulation |
| QCLed | Quasi-Co-Located |
| QCL | Quasi-Co-Location |
| QFI | Quality of Service Indicator |
| QoS | Quality of Service |
| QPSK | Quadrature Phase Shift Keying |
| RA | Random Access |
| RACH | Random Access CHannel |
| RAN | Radio Access Network |
| RAT | Radio Access Technology |
| RA-RNTI | Random Access-Radio Network Temporary Identifier |
| RB | Resource Blocks |
| RBG | Resource Block Groups |
| RI | Rank indicator |
| RLC | Radio Link Control |
| RLM | Radio Link Monitoring |
| RNTI | Radio Network Temptorary Identifier |
| RRC | Radio Resource Control |
| RS | Reference Signal |
| RSRP | Reference Signal Received Power |
| SCC | Secondary Component Carrier |
| SCell | Secondary Cell |
| SCG | Secondary Cell Group |
| SC-FDMA | Single Carrier-Frequency Division Multiple Access |
| SDAP | Service Data Adaptation Protocol |
| SDU | Service Data Unit |
| SeNB | Secondary evolved Node B |
| SFN | System Frame Number |
| S-GW | Serving GateWay |
| SI | System Information |
| SIB | System Information Block |
| SIM | Subscriber Identity Module |
| SINR | Signal-to-Interference-plus-Noise Ratio |
| SMF | Session Management Function |
| SN | Secondary Node |
| SpCell | Special Cell |
| SR | Scheduling Request |
| SRB | Signaling Radio Bearer |
| SRS | Sounding Reference Signal |
| SS | Synchronization Signal |
| SSB | Synchronization Signal Block |
| SSS | Secondary Synchronization Signal |
| sTAG | secondary Timing Advance Group |

-continued

| | |
|---|---|
| S-TMSI | Serving Temporary Mobile Subscriber Identity |
| TA | Timing Advance |
| TAG | Timing Advance Group |
| TAI | Tracking Area Identifier |
| TAT | Time Alignment Timer |
| TB | Transport Block |
| TC-RNTI | Temporary Cell-Radio Network Temporary Identifier |
| TCI | Transmission Configuration Indication |
| TDD | Time Division Duplex |
| TDMA | Time Division Multiple Access |
| TRP | Transmission and Receiving Point |
| TTI | Transmission Time Interval |
| UCI | Uplink Control Information |
| UE | User Equipment |
| UL | Uplink |
| UL-SCH | Uplink Shared CHannel |
| UPF | User Plane Function |
| UPGW | User Plane Gateway |
| URLLC | Ultra-Reliable Low-Latency Communication |
| VHDL | VHSIC Hardware Description Language |
| V2X | Vehicle-to-Everything |
| Xn-C | Xn-Control plane |
| Xn-U | Xn-User plane |

Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
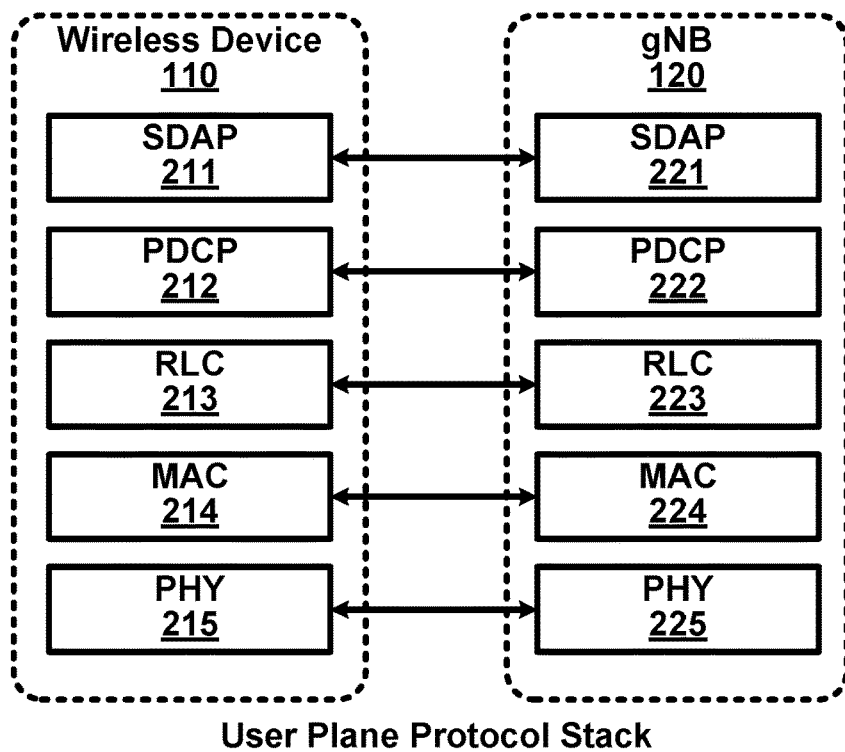
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
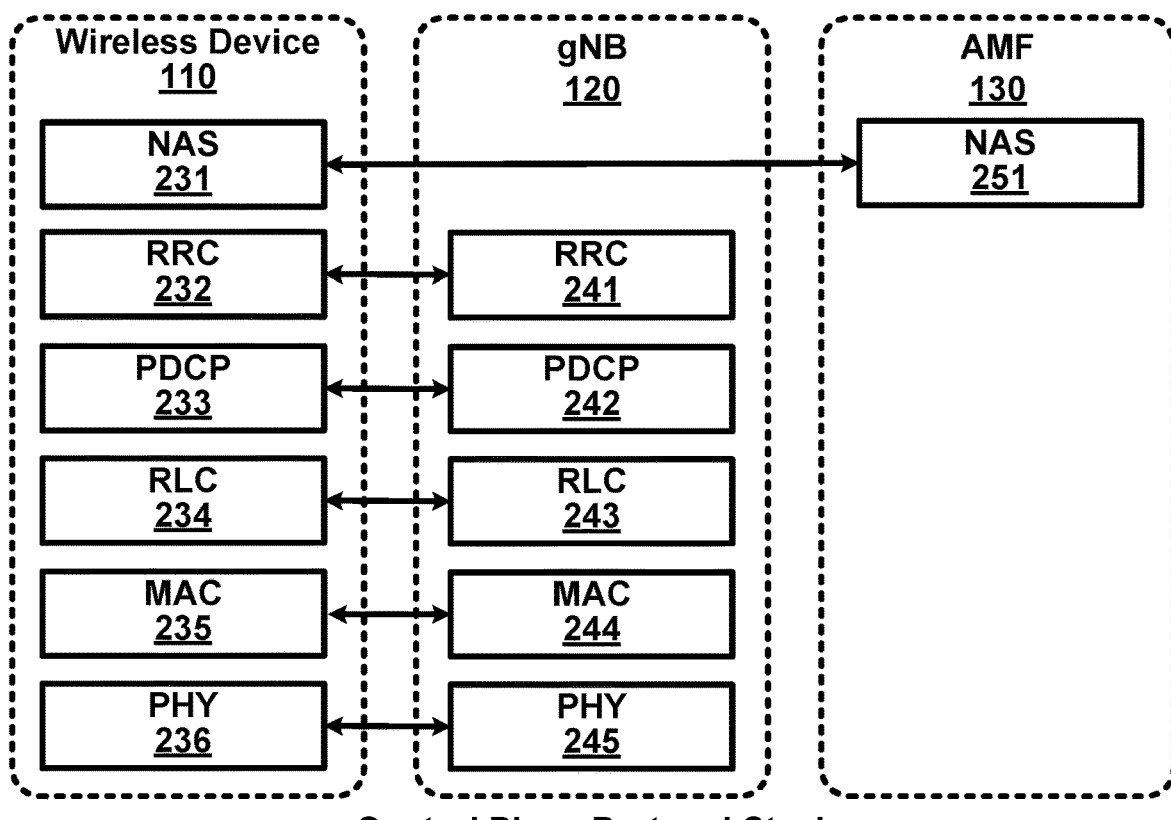
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
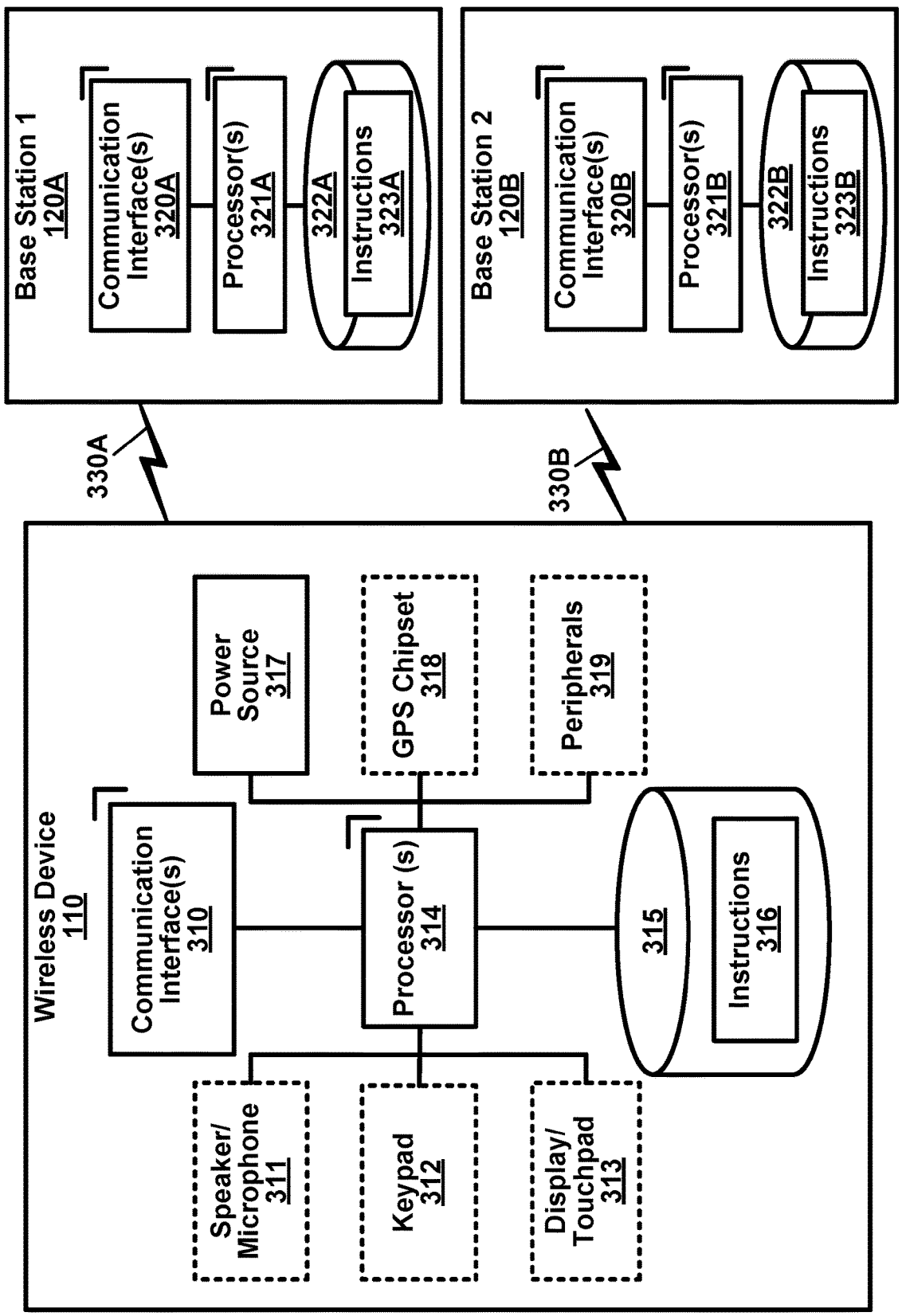
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, one or more transmission and reception points (TRPs), or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any quantity/number of sectors, for example: 1, 2, 3, 4, or 6 sectors. A base station may comprise any quantity/number of transmission and reception points (TRPs) (e.g., two TRPs, or any quantity of TRPs). A base station may comprise any quantity/number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., only static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
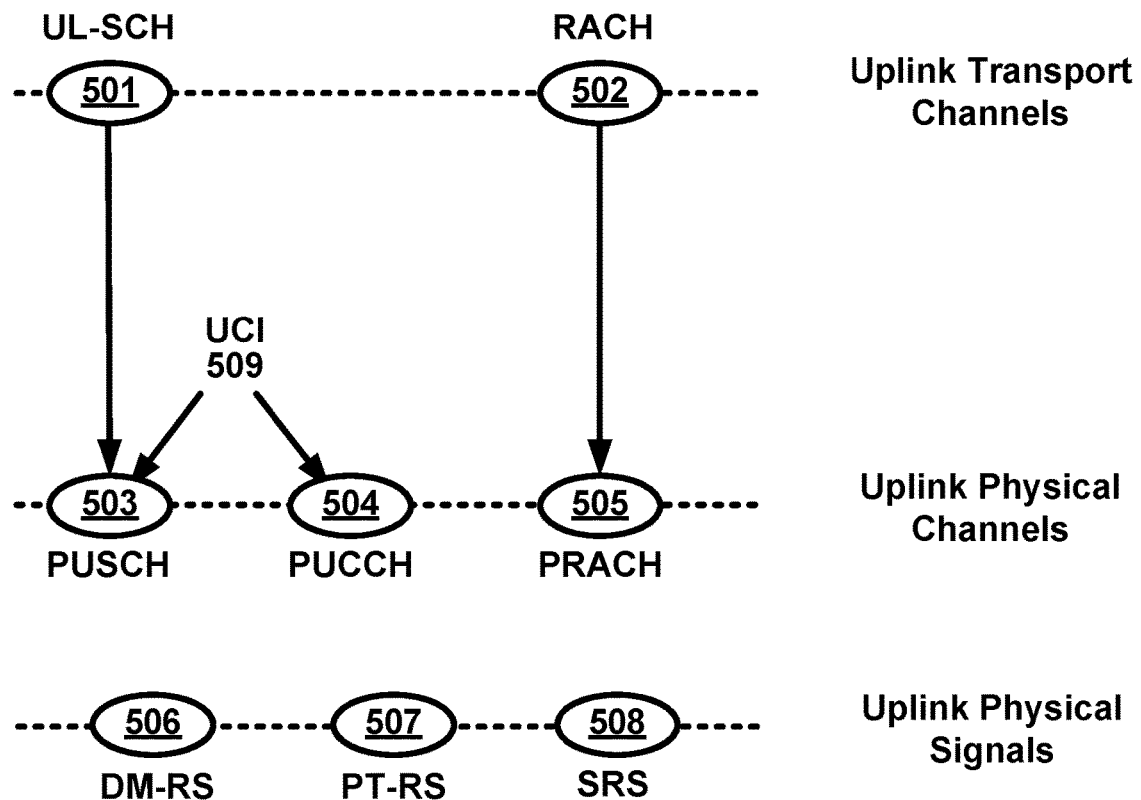
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum quantity/number of front-loaded DM-RS symbols for PUSCH and/or PUCCH. The wireless device may schedule a single-symbol DM-RS and/or double symbol DM-RS based on a maximum quantity/number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DM-RS port and a PT-RS port. A quantity/number of PT-RS ports may be less than a quantity/number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a quantity/number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a quantity/number of OFDM symbols in a SRS resource, starting OFDM symbol of a SRS resource, an SRS bandwidth, a frequency hopping bandwidth, a cyclic shift, and/or an SRS sequence ID.

Figure 5B:
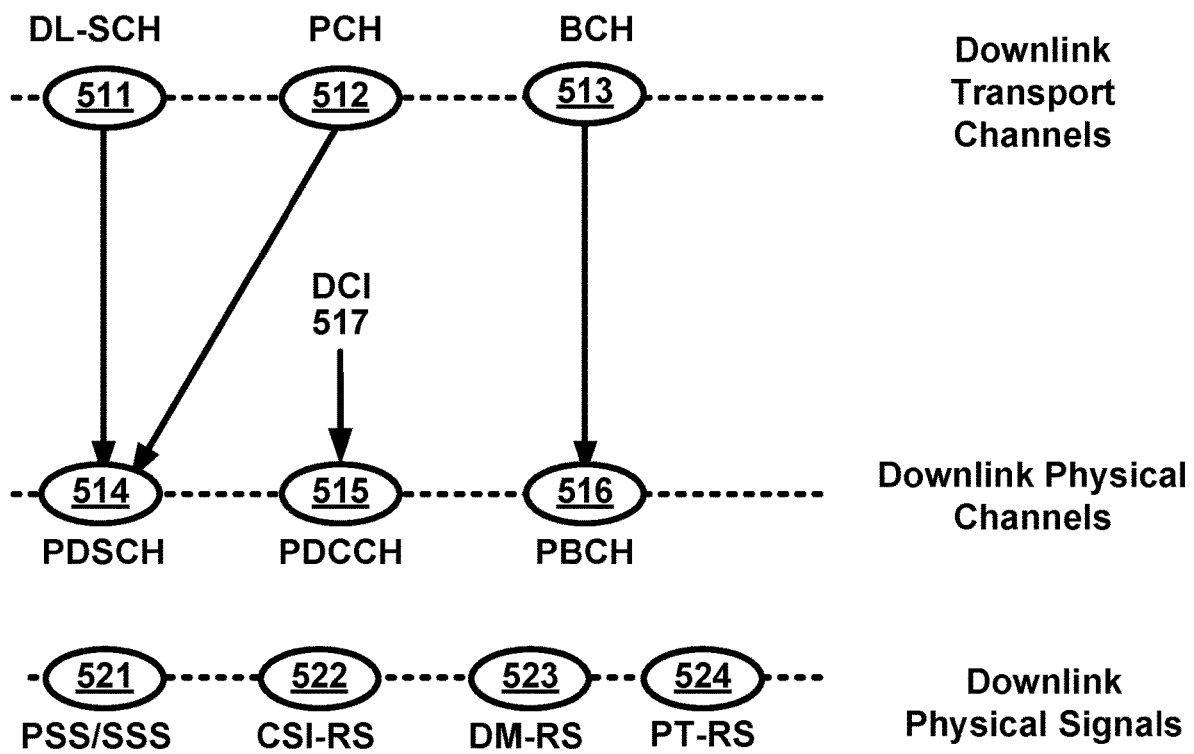
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH)

503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SSB/PBCH may comprise one or more OFDM symbols (e.g., 4 OFDM symbols numbered in increasing order from 0 to 3) within the SSB/PBCH. An SSB/PBCH may comprise the PSS/SSS 521 and/or the PBCH 516. In the frequency domain, an SSB/PBCH may comprise one or more contiguous subcarriers (e.g., 240 contiguous subcarriers with the subcarriers numbered in increasing order from 0 to 239) within the SSB/PBCH. The PSS/SSS 521 may occupy, for example, 1 OFDM symbol and 127 subcarriers. The PBCH 516 may span across, for example, 3 OFDM symbols and 240 subcarriers. A wireless device may assume that one or more SSB/PBCH transmitted with a same block index may be quasi co-located, for example, with respect to Doppler spread, Doppler shift, average gain, average delay, and/or spatial Rx parameters. A wireless device may not assume quasi co-location for other SSB/PBCH transmissions. A periodicity of an SSB/PBCH may be configured by a radio network (e.g., by an RRC signaling). One or more time locations in which the SS/PBCH block may be sent may be determined by subcarrier spacing. A wireless device may assume a band-specific sub-carrier spacing for an SSB/PBCH, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a quantity/number of antenna ports. A base station may configure a wireless device with 32 ports, or any other quantity/number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum quantity/number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DM-RS port and a PT-RS port. A quantity/number of PT-RS ports may be less than a quantity/number of DM-RS ports in a scheduled resource. The downlink PT-RS 524 may be confined in the scheduled time/frequency duration for a wireless device.

Figure 6:
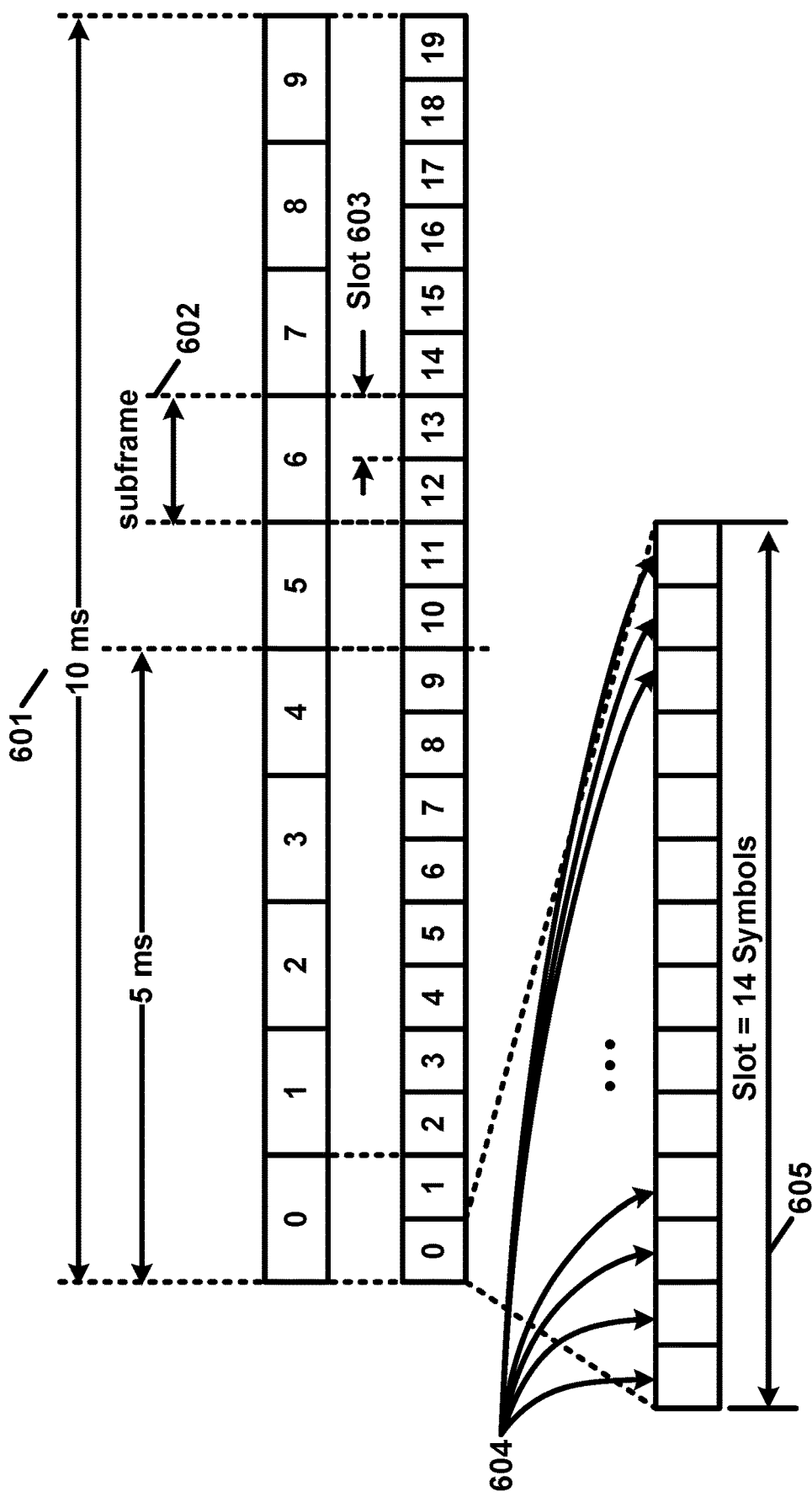
FIG. 6 shows an example transmission time and/or reception time for a carrier.

FIG. 6 shows an example transmission time and reception time, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The quantity/number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
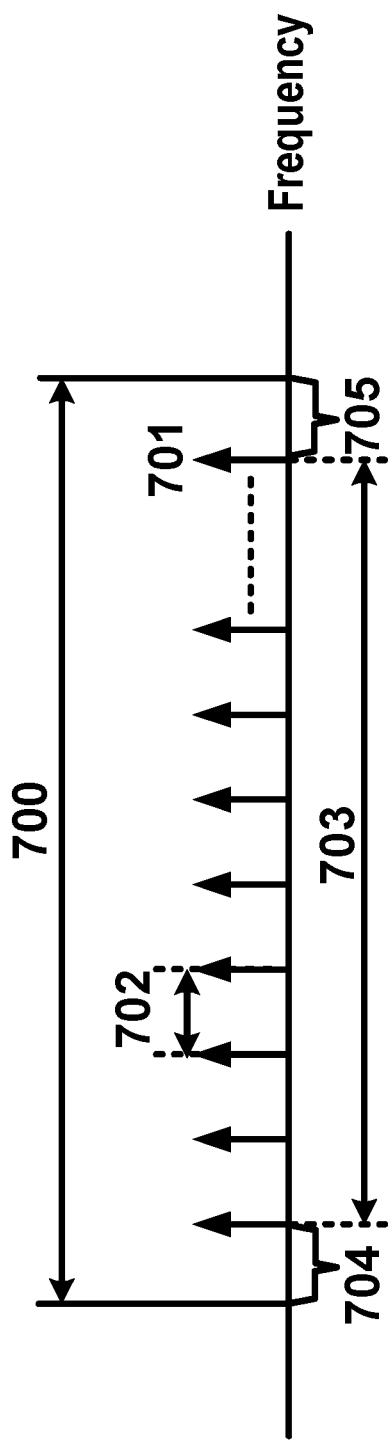
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a quantity/number of subcarriers 703 in a carrier. A bandwidth occupied by a quantity/number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A quantity/number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in quantity/number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
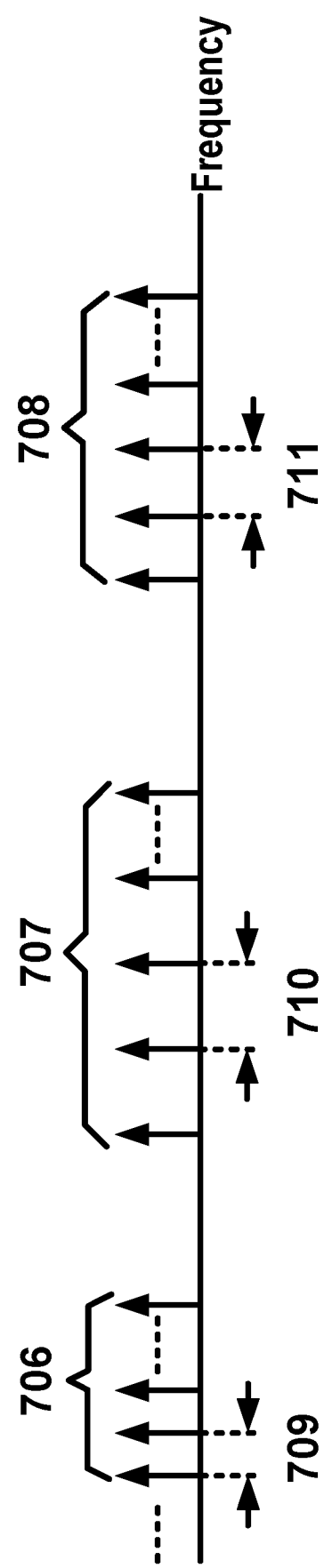

FIG. 7B shows examples of component carriers. A first component carrier may comprise a first quantity/number of subcarriers 706 having a first subcarrier spacing 709. A second component carrier may comprise a second quantity/number of subcarriers 707 having a second subcarrier spacing 710. A third component carrier may comprise a third quantity/number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
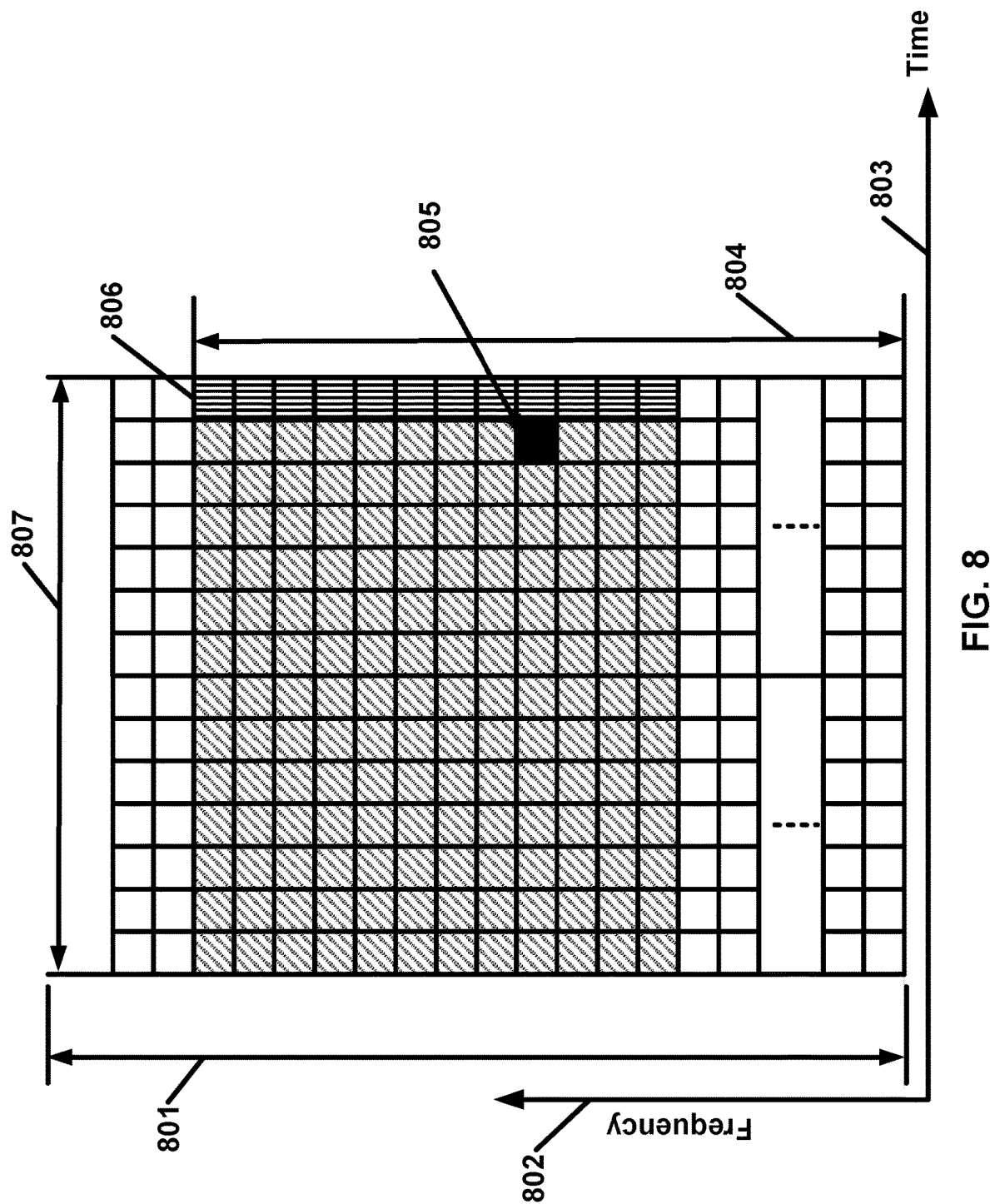
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first quantity/number of OFDM symbols in a subframe and a second quantity/number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first quantity/number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second quantity/number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
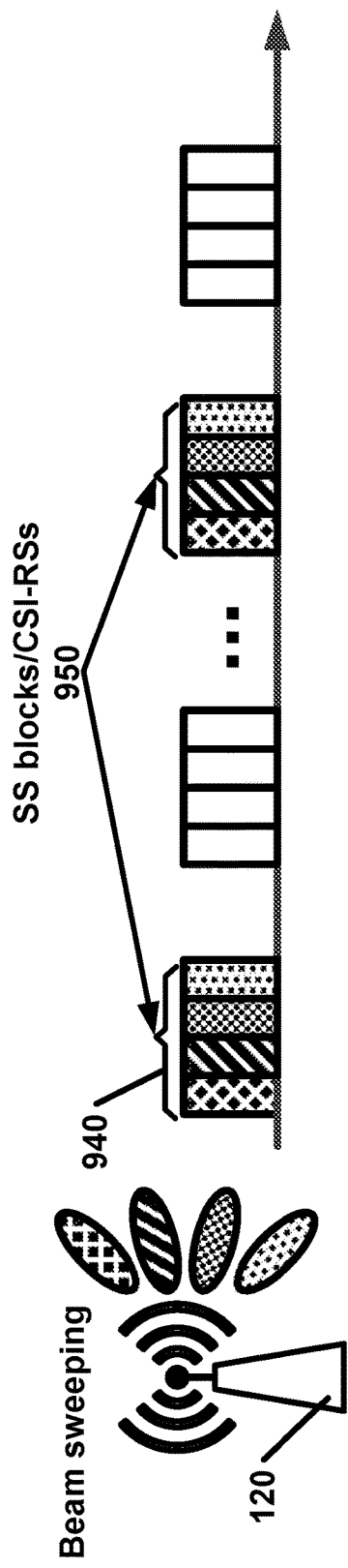
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
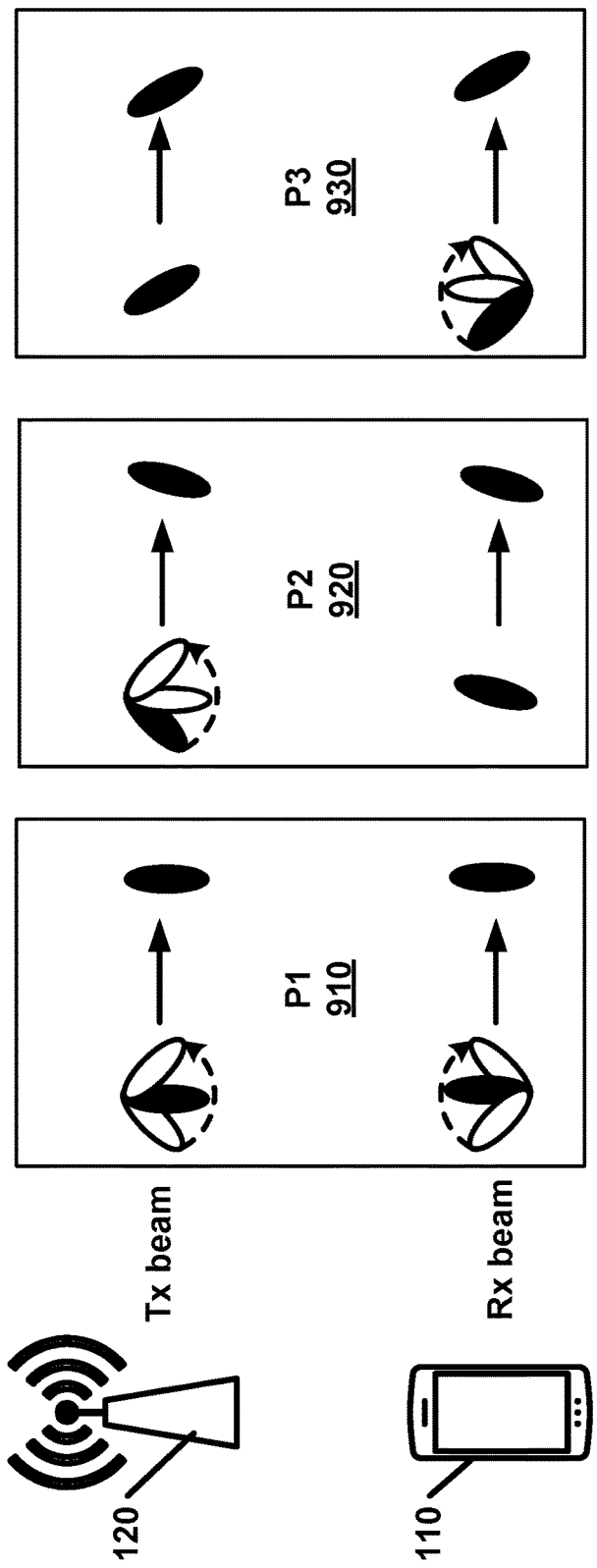
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
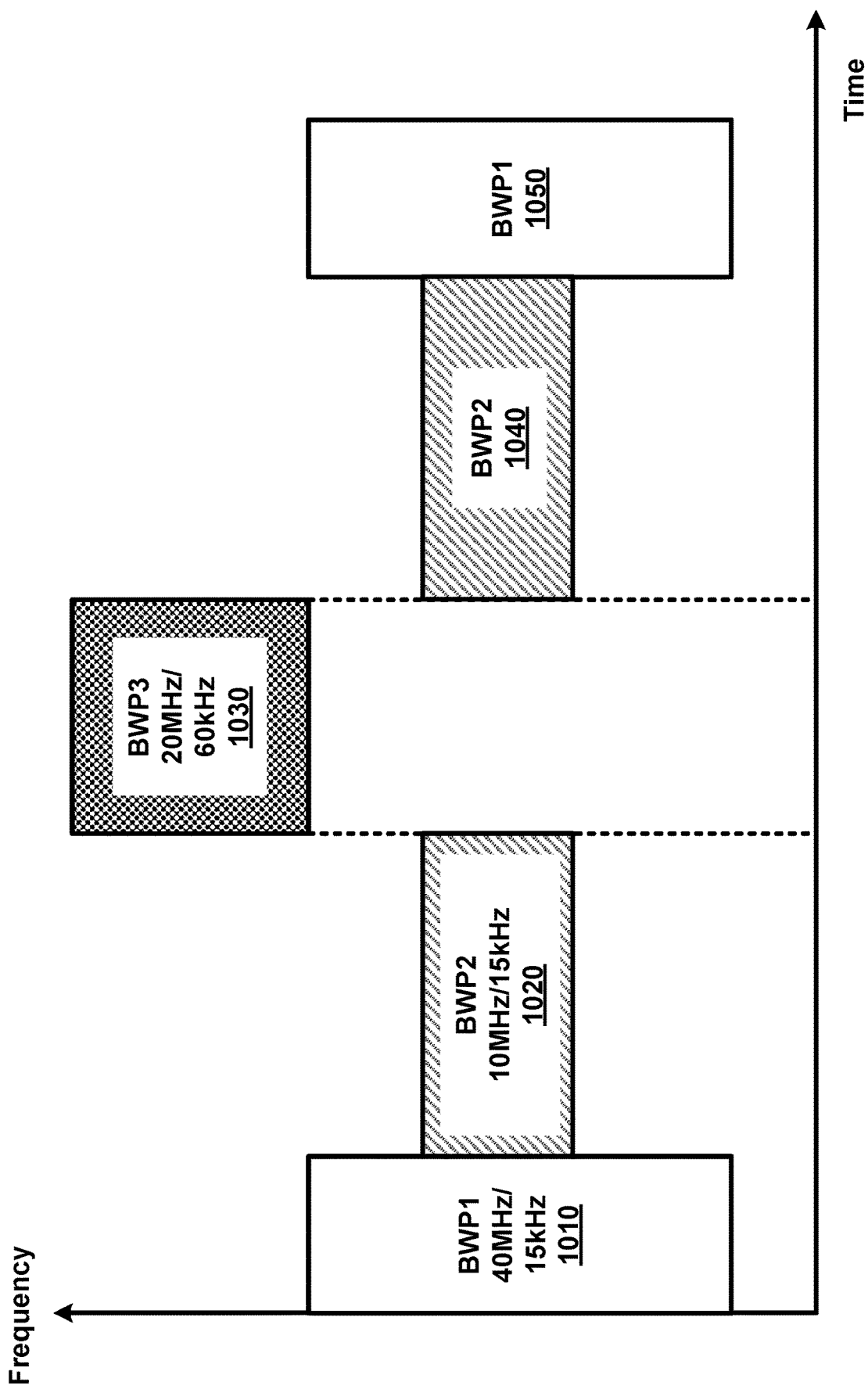
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any quantity/number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and quantity/number of contiguous PRBs, a subcarrier spacing, or a cyclic prefix, for example, for a CORE-SETs for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a quantity/number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
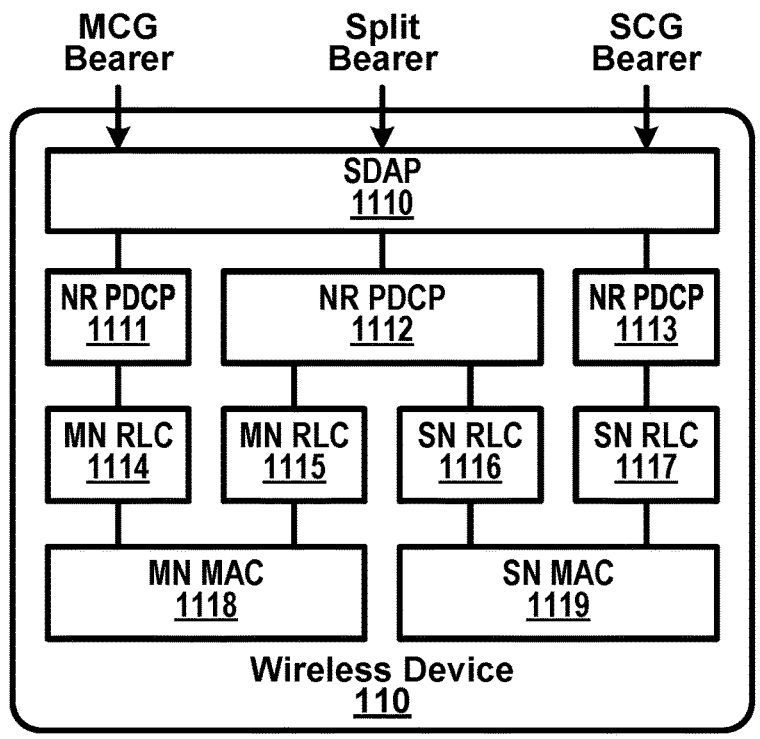
FIG. 11A and FIG. 11B show examples of multi connectivity.
Figure 11B:
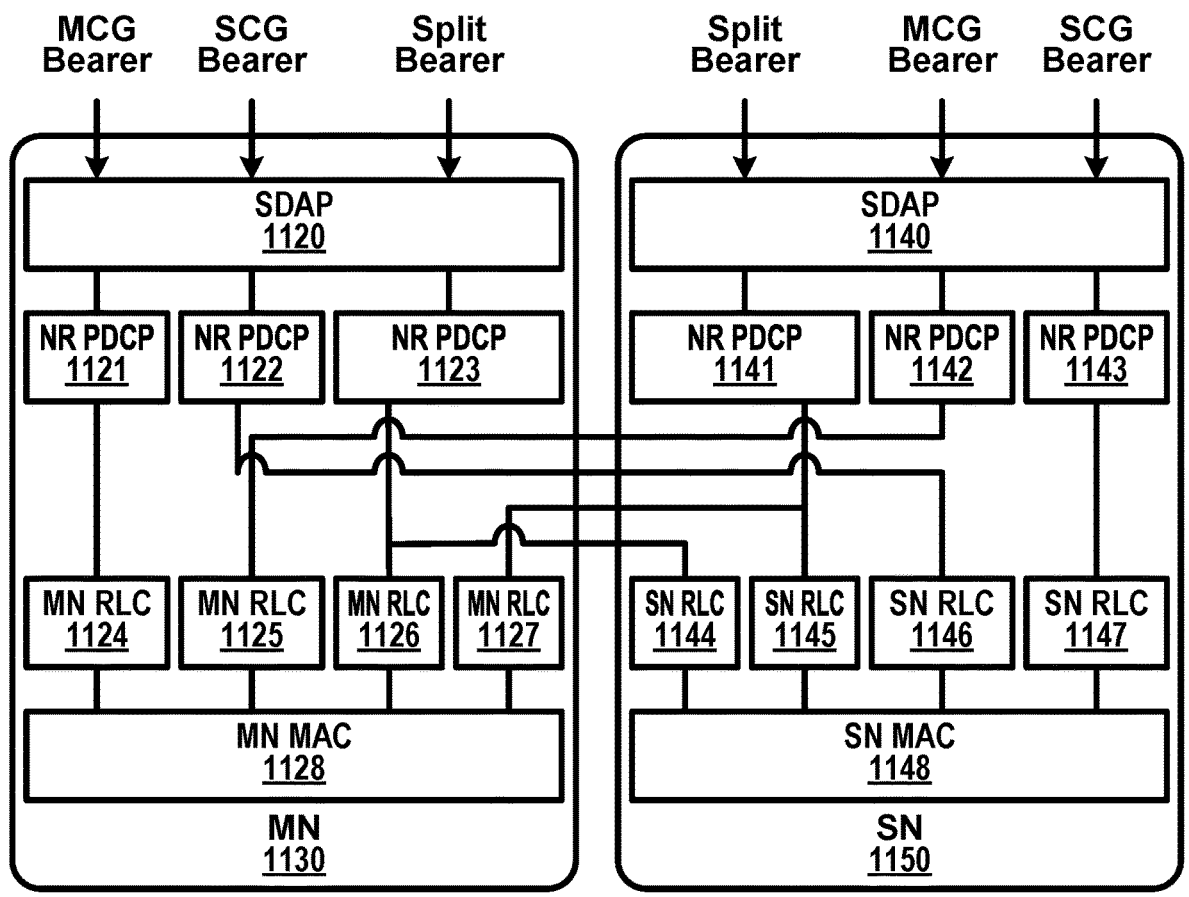

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a quantity/number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
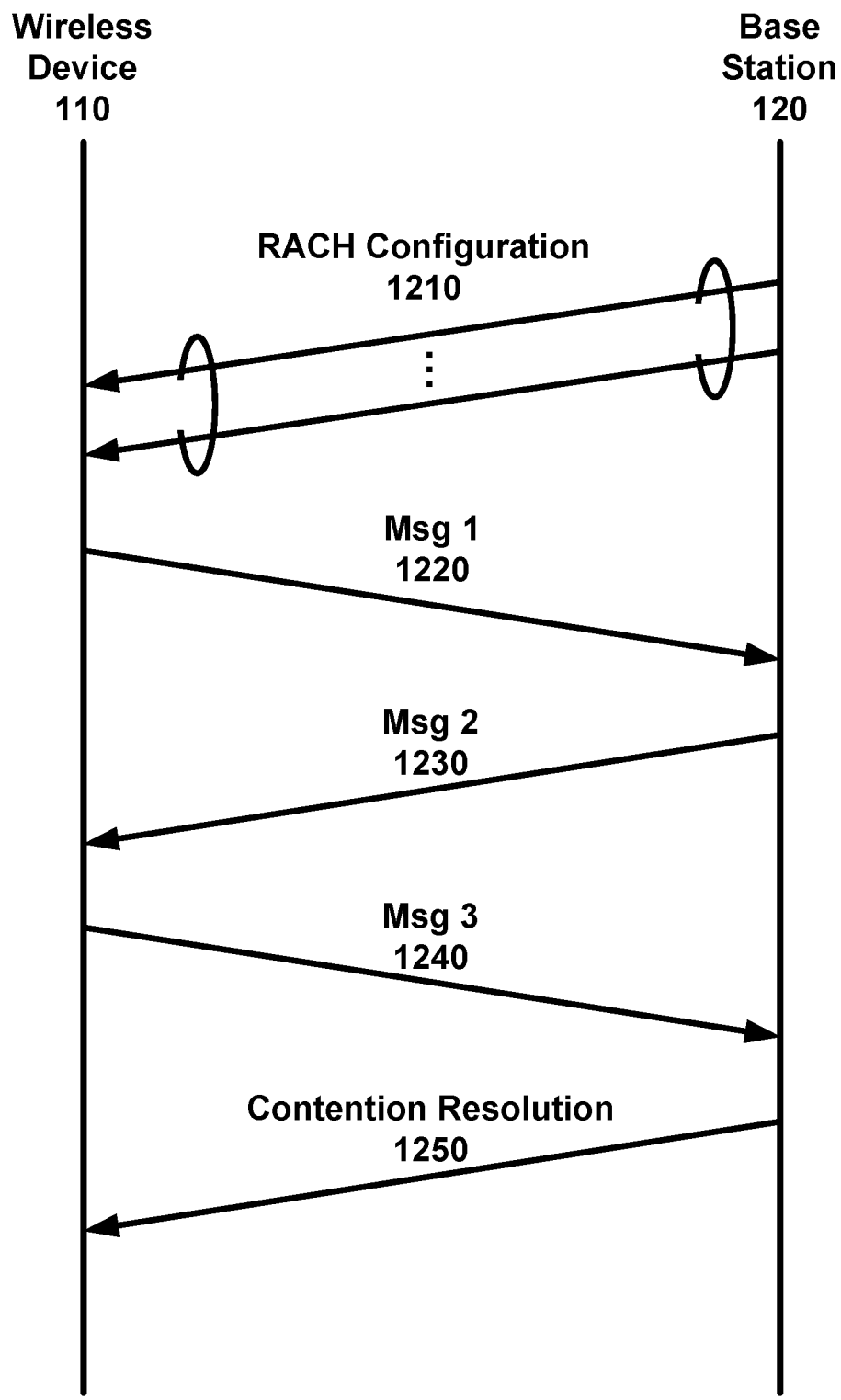
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum quantity/number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery request and corresponding PRACH resource(s) (e.g., if any), a time window to monitor RA response(s), a time window to monitor response(s) on a beam failure recovery request, and/or a contention resolution timer.

The Msg 1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a random access preamble index corresponding to a selected SS block or a CSI-RS from a set of one or more random access preambles for a beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention-free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises only a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
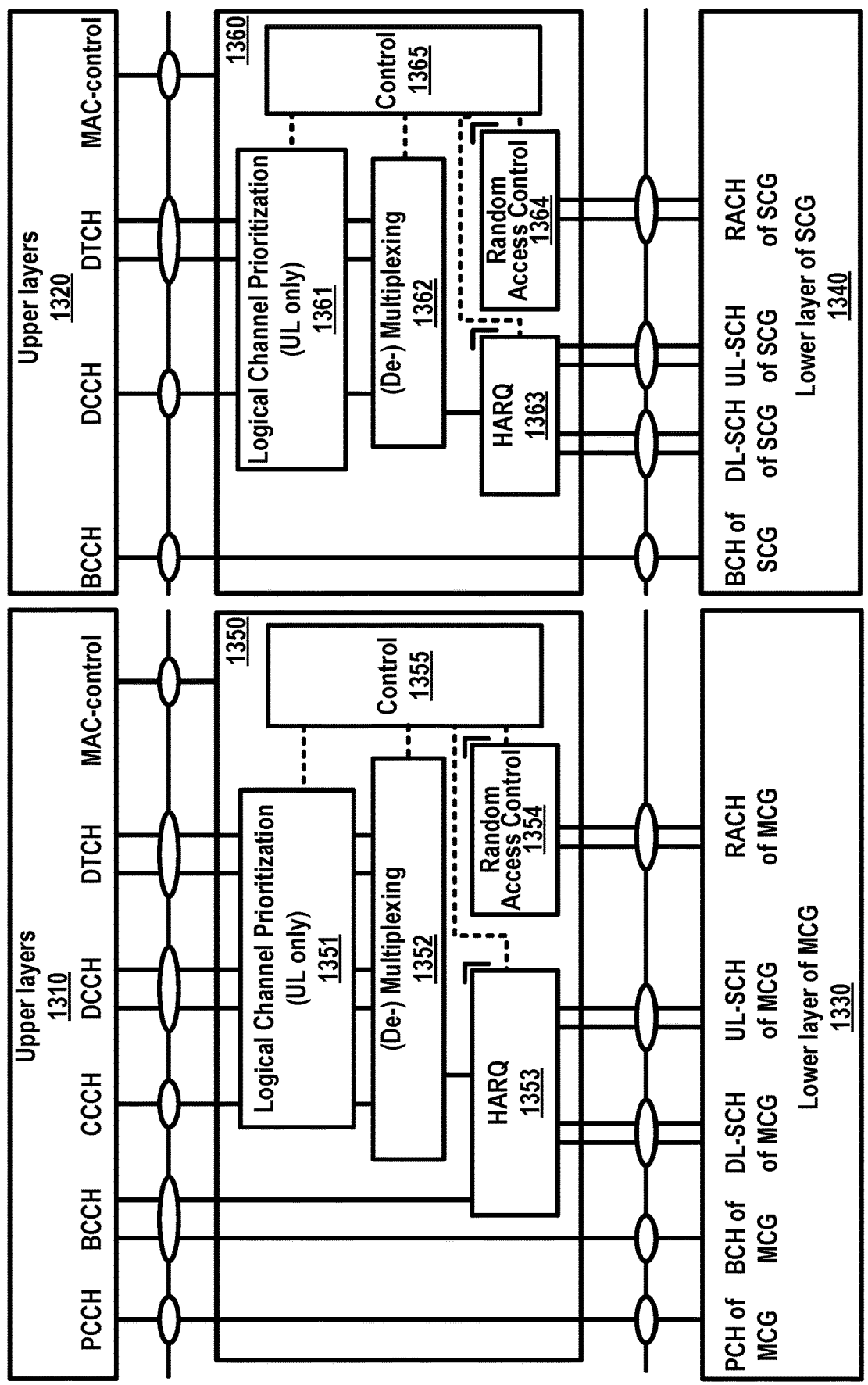
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a quantity/number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
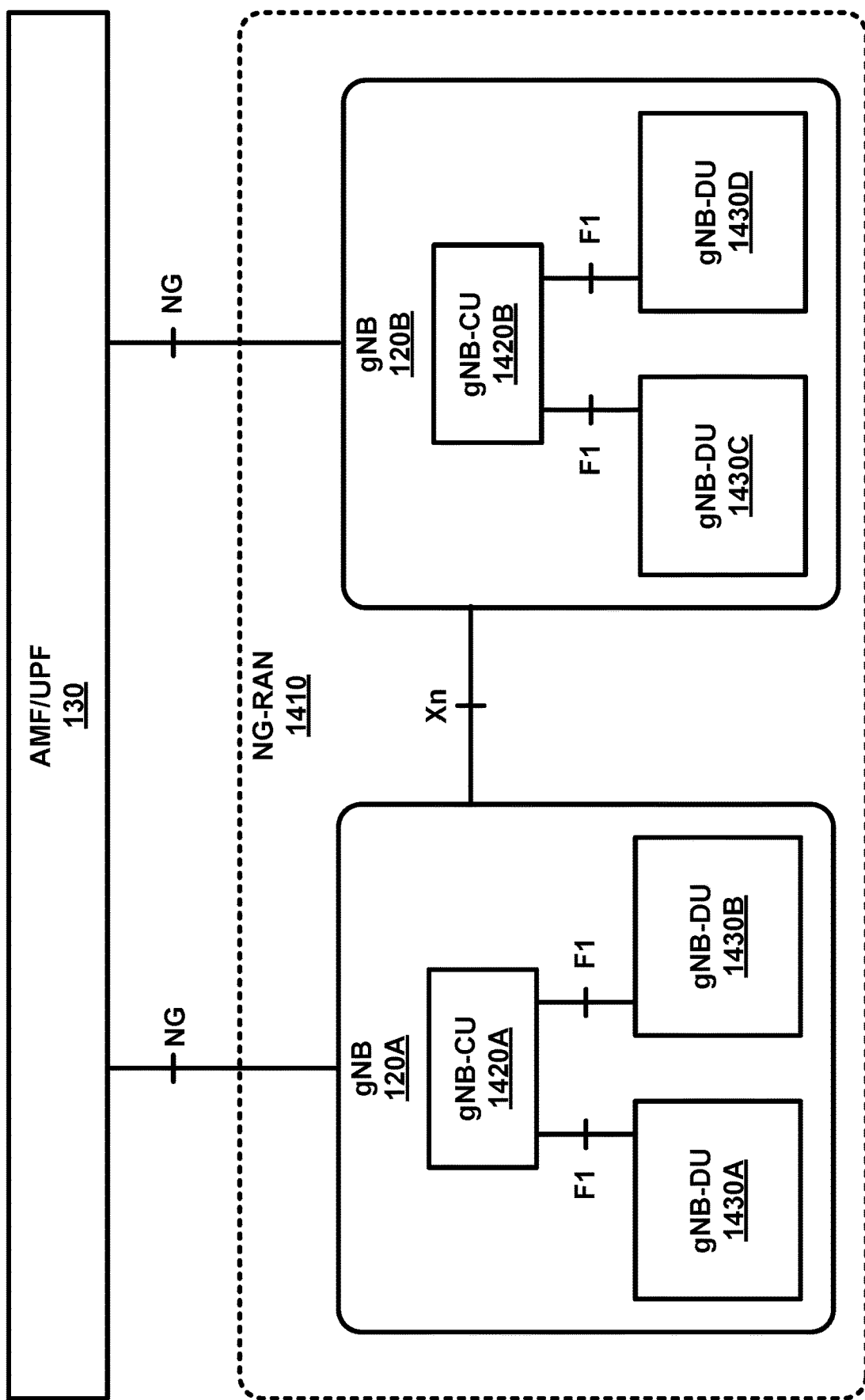
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
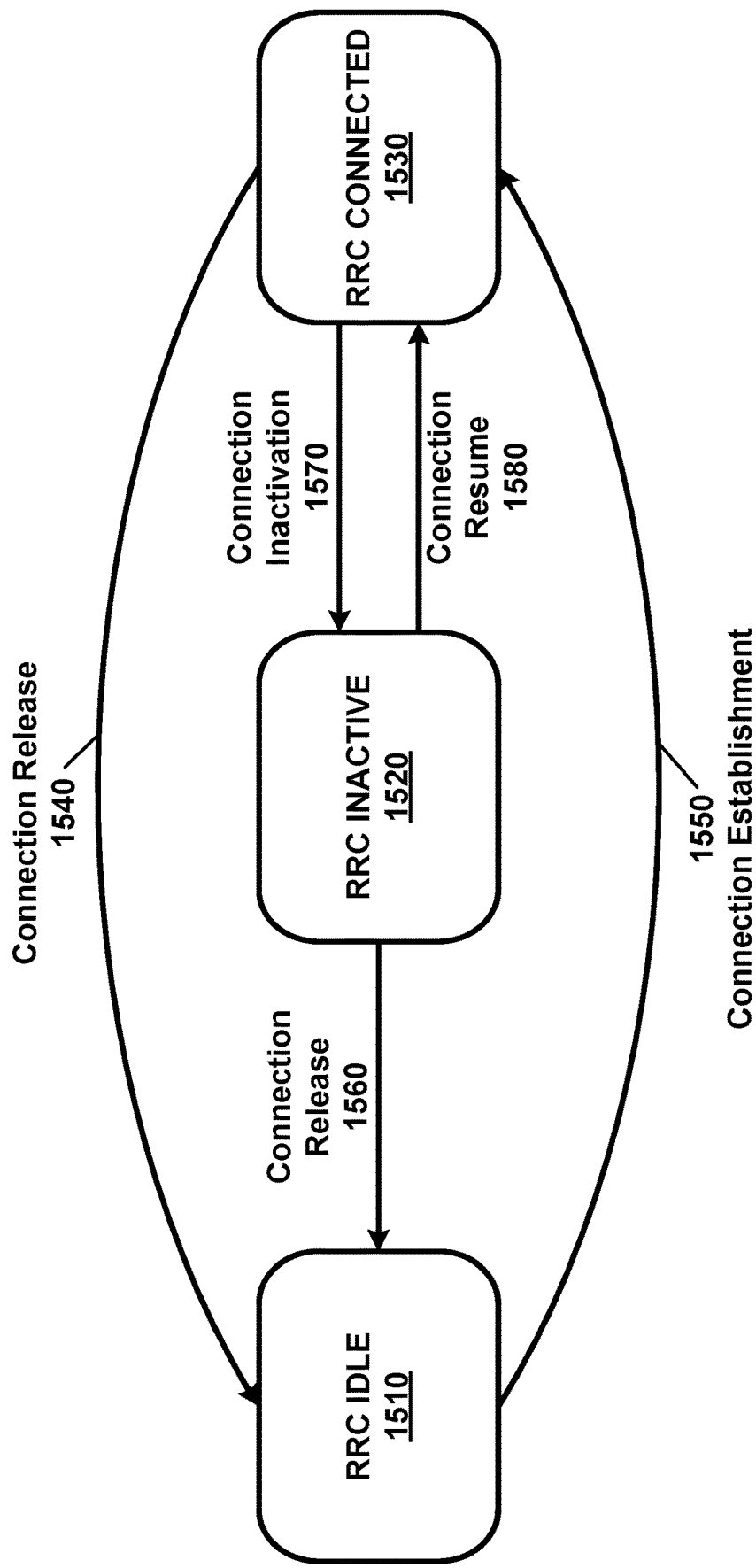
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

Wireless devices may support multiple subscriber/user identities/modules/identifiers (e.g., subscriber identity modules (SIMs), embedded and/or electronic SIMs (eSIMs), physical and/or electronic profiles, etc.), for example, each of which may comprise subscription information for a wireless network (e.g., different wireless networks). A multi-SIM wireless device may be a device that supports two (or more) SIMs, two (or more) physical profiles, and/or two (or more) electronic profiles. Multi-SIM devices may be used in a variety of scenarios. A user may access multiple subscriptions using a multi-SIM device. Service providers may offer bring your own device (BYOD) initiatives. A user may use a multi-SIM device to avail services from multiple service providers/subscriptions on the same device. A user may have multiple personal subscriptions and may choose which one to use based on a selected service. The user may access a first subscription via a first SIM (e.g., for calling/texting or other service) and a second subscription via a second SIM (e.g., for mobile internet facility or other service) using a multi-SIM device. The user may access an individual subscription via a first SIM and a group subscription (e.g., a family or business plan subscription) via a second SIM using a multi-SIM device. A user may use a multi-SIM device for communications with any combination of different services, networks, devices, etc. SIMs may be from the same or from different mobile network operators (MNOs).

Figure 16:
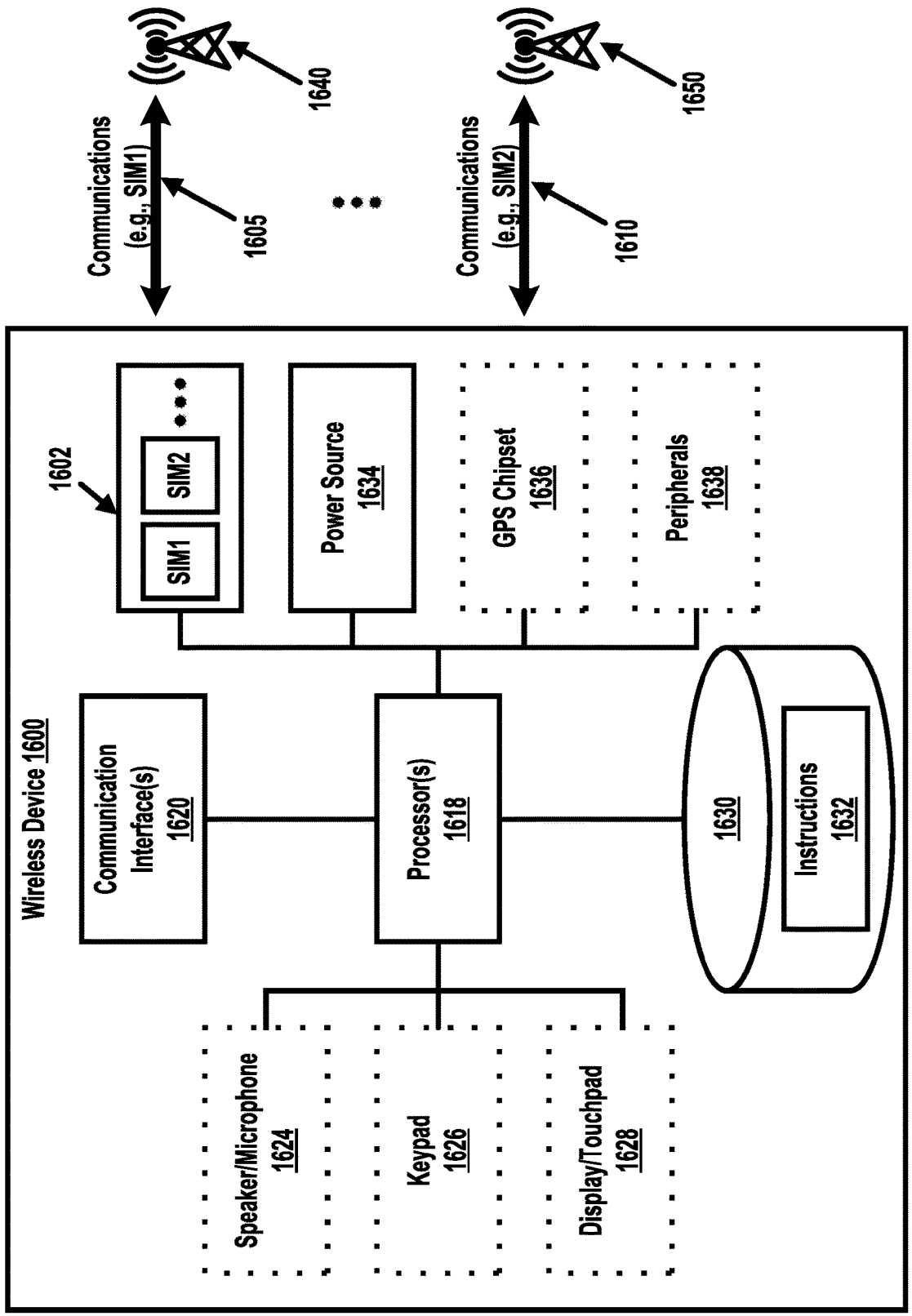
FIG. 16 shows an example architecture for a wireless device comprising multiple subscriber/user identities/modules/identifiers.

FIG. 16 shows an example architecture for a wireless device 1600 comprising multiple subscriber/user identities/modules/identifiers (SIMs) 1602. The SIMs 1602 may comprise any type of subscriber/user identity/module/identifier, for example, embedded and/or electronic SIMs (eSIMs), physical SIM cards, electronic or physical profiles, or any combination thereof. The wireless device 1600 may be referred to as a "multi-SIM" device. A wireless device that supports two SIMs 1602 may also or alternatively be referred to as a "dual-SIM" device. The wireless device 1600 may be used to address various use cases. The wireless device 1600 may comprise (e.g., be configured with) a personal wireless subscription (e.g., SIM1) and/or a business wireless subscription (e.g., SIM2). This use case may be particularly advantageous for bring-your-own-device (BYOD) initiatives and/or other examples in which a user may communicate via multiple networks and/or using multiple services. The wireless device 1600 may comprise (e.g., be configured with) multiple wireless subscriptions (e.g., an individual plan subscription via SIM1 and a family or business plan subscription via SIM2). The wireless device 1600 may engage in communications 1605 (e.g., communicate using SIM1) with a first base station 1640 (e.g., a gNB or any other communication device) of a first wireless network (e.g., a PLMN or any other communication device). The wireless device 1600 may engage in communications 1610 (e.g., communicate using SIM2) with a second base station 1650 of a second wireless network (e.g., a PLMN or any other communication device). The wireless device 1600 may engage in other communications (e.g., communicate using one or more other SIMs 1602) with one or more other base stations (e.g., gNBs or any other communication devices) of one or more other wireless networks (e.g., PLMNs or any other communication devices).

The wireless device 1600 may include one or more processors 1618, which may execute instructions stored in memory, such as non-removable memory 1630, removable memory 1632 (such as a Universal Serial Bus (USB) drive, compact disk (CD) or digital versatile disk (DVD), or floppy disk drive), or any other desired storage medium. Instructions may be stored in an attached (or internal) hard drive. The wireless device 1600 may include a security processor (not shown), which may execute instructions of a one or more computer programs to monitor the processes executing on the processor(s) 1618 and any process that requests access to any hardware and/or software components of the wireless device 1600 (e.g., the non-removable memory 1630, the removable memory 1632, the hard drive, a device controller (e.g., a keypad 1626, a display and/or touchpad 1628, a speaker and/or microphone 1624, and/or one or more peripherals 1638), one or more communication interfaces 1620 (e.g., transceiver, network interface, Bluetooth interface, Wi-Fi interface, etc.), and/or a GPS 1636 (e.g., a GPS chipset). The one or more communication interfaces 1620 may include a wired interface, a wireless interface, or a combination of the two. The network interface may facilitate communications with a network (e.g., a RAN, or any other network). The network interface may include a modem (e.g., a cable modem, wired modem, wireless modem, etc.). The network may include communication links, an external network, an in-home network, a provider's wireless, coaxial, fiber, a hybrid fiber/coaxial distribution system (e.g., a DOCSIS network), and/or any other desired network. The wireless device 1600 may include one or more output devices, such as the display and/or touchpad 1628 (e.g., a screen, a display device, a monitor, a television, etc.), and/or one or more output device controllers, such as a video processor. The wireless device 1600 may include one or more user input devices, such as a remote control, keyboard, mouse, touch screen, microphone, etc., that may be configured, for example, as one or more of the peripherals 1638. The wireless device 1600 may include a location-detecting device, for example, a GPS chipset 1636, which may be configured to receive and process global positioning signals and determine, with possible assistance from an external server and antenna, a geographic position of the wireless device 1600.

FIG. 17A, FIG. 17B, and FIG. 17C show example wireless devices 1710, 1720, and 1730, respectively, comprising various quantities of transmitters and receivers. The wireless device 1710 may comprise a communication module 1712 that communicates using a single receiver RX 1714 and a single transmitter TX 1718. The wireless device 1720 may comprise a communication module 1722 that communicates using two receivers RX 1724 and RX 1726 and a single transmitter TX 1728. The wireless device 1730 may comprise a communication module 1732 that communicates using two receivers RX 1734 and RX 1736 and two transmitters TX 1738 and 1740. A wireless device may have any quantity of receivers and/or transmitters.

The wireless device 1710 may send a message to a first base station 1750 (e.g., a gNB or any other communication device) of a first wireless network (e.g., a PLMN or any other communication device) using the transmitter TX 1718. The wireless device 1710 may receive a message from the first base station 1750 (e.g., a gNB or any other communication device) of the first wireless network (e.g., a PLMN or any other communication device) using the receiver RX 1714. The wireless device 1710 may send a message to a second base station 1760 (e.g., a gNB or any other communication device) of a second wireless network (e.g., a PLMN or any other communication device) using the transmitter TX 1718, The wireless device 1710 may receive a message from the second base station 1760 (e.g., a gNB or any other communication device) of the second wireless network (e.g., a PLMN or any other communication device) using the receiver RX 1714. The wireless device 1710 may communicate (e.g., send and/or receive a message) with one of the first base station 1750 (e.g., a gNB or any other communication device) or the second base station 1760 (e.g., a gNB or any other communication device) at a given time.

The wireless device 1720 may send a message to the first base station 1750 (e.g., a gNB or any other communication device) of the first wireless network (e.g., a PLMN or any other communication device) using the transmitter TX 1728. The wireless device 1720 may receive a message from the first base station 1750 (e.g., a gNB or any other communication device) of the first wireless network (e.g., a PLMN or any other communication device) using the receiver RX 1724. The wireless device 1720 may send a message to the second base station 1760 (e.g., a gNB or any other communication device) of the second wireless network (e.g., a PLMN or any other communication device) using the transmitter TX 1728. The wireless device 1720 may receive a message from the second base station 1760 (e.g., a gNB or any other communication device) of the second wireless network (e.g., a PLMN or any other communication device) using the receiver RX 1726. The wireless device 1720 may send a message to one of the first base station 1750 (e.g., a gNB or any other communication device) or the second base station 1760 (e.g., a gNB or any other communication device) at a given time using the transmitter TX 1728. The wireless device 1720 may receive one or more messages from one or both of the first base station 1750 (e.g., a gNB or any other communication device) and/or the second base station 1760 (e.g., a gNB or any other communication device) at a given time.

The wireless device 1730 may send a message to the first base station 1750 (e.g., a gNB or any other communication device) of the first wireless network (e.g., a PLMN or any other communication device) using the transmitter TX 1738. The wireless device 1730 may receive a message from the first base station 1750 (e.g., a gNB or any other communication device) of the first wireless network (e.g., a PLMN or any other communication device) using the receiver RX 1734. The wireless device 1730 may send a message to the second base station 1760 of the second wireless network (e.g., a PLMN or any other communication device) using the transmitter TX 1740. The wireless device 1730 may receive a message from the second base station 1760 (e.g., a gNB or any other communication device) of the second wireless network (e.g., a PLMN or any other communication device) using the receiver RX 1736. The wireless device 1730 may communicate (e.g., send and/or receive one or more messages) with one or both of the first base station 1750 (e.g., a gNB or any other communication device) and/or the second base station 1760 (e.g., a gNB or any other communication device) at a given time.

Multi-SIM devices may support a variety of implementations and/or behaviors (e.g., dual SIM single standby (DSSS), dual SIM dual standby (DSDS), dual SIM dual active (DSDA), etc.). An implementation of a multi-SIM device may comprise common radio and/or baseband components that may be shared among the multiple SIMs of the multi-SIM device. A multi-SIM device may be compatible with a variety of communication technologies (e.g., existing communication technologies, prior communication technologies, and/or future communication technologyes). A multi-SIM device and may need to seamlessly interact with multiple wireless systems (e.g., wireless networks, PLMNs, access technologies, etc.). A wireless device, actively communicating via a first wireless network, may need to occasionally check at least a second wireless network (e.g., to read a paging channel, perform measurements, and/or read system information) and/or communicate via the at least a second wireless network. This occasional activity on the at least a second wireless network may or may not have impact on performance of the first system, for example, which may depend upon implementation of a wireless device and/or other devices in a network. A base station may send (e.g., transmit) paging information, to a wireless device. The base station may send paging indications, for example, for emergency notifications, to indicate incoming calls/text messages, and/or to indicate any other information. A paging occasion (PO) may comprise time period (e.g., a subframe, a timeslot, or any duration) in which a base station may send (e.g., transmit) a paging indication to the wireless device. A paging frame (PF) may be a radio frame and/or may comprise one or more PO(s) or a starting point of a PO. POs may be determined based on a wireless device identifier (e.g., international mobile subscriber identity (IMSI) for an evolved packet system (EPS), a 5G-serving temporary mobile subscriber identity (S-TMSI) for a 5G system, respectively, and/or any other identifier).

A wireless device may use DRX) in RRC_IDLE and/or RRC_INACTIVE state. The wireless device may use DRX, for example, to reduce power consumption. A wireless device may monitor at least one PO per DRX cycle.

A selection of beam(s) for a reception of a paging message (e.g., paging indication) may be determined by the wireless device in multi-beam operations. A wireless device may assume and/or determine that a same paging message is repeated in transmitted beams. A paging message may (or may not) be the same for both RAN-initiated paging and CN-initiated paging.

A wireless device may determine (e.g., based on user-configured rules) whether or not to respond to a received paging indication (e.g., via a wireless network, PLMN, access technology, network, etc.). At least some paging indications may be associated with high priority services (e.g., ultra-relaible low-latency communication (URLLC) services, emergency notification services, etc.) and/or other priority services. Receiving and/or processing paging indications associated with high priority services, and/or ignoring paging indications associated with low priority services, may be advantageous (e.g., may reduce power consumption, prioritize urgent communications, etc.). The wireless device may be unable to make the distinction between high priority services and low priority services (or other priority level services), for example, if the wireless device is unable to determine a service type that triggered the paging indication.

A wireless device (e.g., a multi-SIM wireless device) may stop a current activity via a first system (e.g., a first wireless network, a first PLMN, a first access technology, a first network, etc.), for example, if the wireless device determines to respond to a page via a second system (e.g., a second wireless network, a second PLMN, a second access technology, a second network, etc.) and/or if the wireless device determines to send/receive signals (e.g., signals associated with a periodic mobility registration update) via the second system. The wireless device may autonomously release an RRC connection with the first system and abruptly leave the first system, for example, if a procedure for suspension of an ongoing activity in the first system is not indicated and/or specified. An autonomous release may be interpreted as an error case by the first system, may distort statistics in the first system, and/or may misguide algorithms that rely on the statistics. The first system may continue to send pages (e.g., keep paging) the wireless device and/or sending (e.g., transmitting) other signals to the wireless device, for example, during the wireless device's absence from the first system, which may result in a waste of resources.

DSDS terminals may be registered in one or more various networks. For example, DSDS terminals may be registered in two networks simultaneously, and/or may use just a single radio front-end and base band chain. A wireless device may be RRC connected to one network at a time. The wireless device may be RRC connected to a first network. The wireless device may attempt to at least receive paging indications from at least a second network and/or transmit/receive signals on the at least a second network (e.g., a second network, or any quantity of additional networks). The wireless device may create gaps on an active connection with the first network, for example, to listen to paging indications from the at least a second network and/or transmit/receive signals on the at least a second network. The wireless device may (e.g., depending on implementation and configuration) drop a connection (e.g., a data connecton) on the first network, for example, to receive a paging indication from the at least a second network. A wireless device may not attempt to release (e.g., cleanly release) a first connection on a first network to receive signals on the at least a second network. This operation may disrupt communications, may cause decreased performance, and/or may reduce system capacity, on the first network. The first network may continue sending (e.g., transmitting) signals to the wireless device, for example, even if the wireless device has dropped the connection with the first network. This operation may result in interference at the wireless device, for example, if the wireless device is receiving paging indications from the at least a second network.

A wireless device (e.g., configured with multiple subscriber identity modules (SIMs)) may not receive a signal (e.g., a paging indication) sent (e.g., transmitted) via a first system (e.g., first wireless network, first PLMN, first access technology, first network, etc.), and/or a wireless device may receive but may not be able to respond to the signal (e.g., may not be able to initiate a connection establishment procedure with the first system), for example, if the wireless device is actively communicating with at least a second system (e.g., a second system, second wireless network, second PLMN, second access technology, second network, and/or any other quantity of systems). Missing a signal (e.g., a paging indication) via a first system and/or an inability to communicate with the first system, for example, if the wireless device is communicating with a second system, may decrease service reliability and/or increase service latency.

Various examples described herein may provide enhanced signaling that may support simultaneous (or near simultaneous) communications with multiple systems. A wireless device may indicate, to a second system (e.g., a second network and/or any quantity of second systems), information corresponding to parameters used by the wireless device to monitor signals from a first system (e.g., first network) and/or to communicate with the first system. The wireless device may receive system information (e.g., paging configuration parameters) from the first system. The wireless device may send information (e.g., assistance information), corresponding to the system information, to the second system. The second system may configure resources and/or resource gaps (e.g., monitoring gaps, communication gaps) for the wireless device to monitor and/or communicate with the first system, for example, based on the information (e.g., assistance information). The wireless device may send/ receive signals from the first system in the configured resource gaps. The first system may send (e.g., transmit) paging indications in the configured resources and/or resource gaps. The wireless device may monitor a channel for paging indications from the first system in the configured resources and/or resource gaps. The wireless device may stop and/or refrain from communicating with the second system (and/or with any quantity of second systems) in the configured resources and/or resource gaps.

The information (e.g., assistance information) may indicate network type information (e.g., PLMN, vehicle-to-everything (V2X) network, service-based network, etc.) of the first system. The second system to may configure the resources and/or resource gaps, based on the network type information. Various examples described herein may increase service reliability and decrease service latency.

A wireless device may initiate an RRC connection resume procedure. The wireless device may initiate an RRC connection resume procedure, for example, if the wireless device receives a RAN-initiated paging. A wireless device may transition (e.g., switch and/or move) to RRC_IDLE and/or inform a NAS, for example, if the wireless device receives a CN-initiated paging in an RRC_INACTIVE state.

An SFN for a PF may be determined based on the equation:

(SFN+PF_offset)mod $T=(T$ div $N)*(UE\_ID$ mod $N)$ where SFN may be a system frame number, PF_offset may be an offset used for PF determination, T may be a duration of a DRX cycle, N may be a total quantity of paging frames in T, and UE_ID may be equal to, or substantially equal to, (5G-S-TMSI mod 1024). 5G-S-TMSI may be a wireless device identifier. T may be determined as the shortest of a wireless device-specific DRX duration (e.g., among a plurality of wireless device-specific DRX durations), for example, if configured by RRC or upper layers, and/or may be a default DRX value broadcast in system information. Index i_s, indicating the index of the PO in the PF, may be determined as:

$i\_s$=floor(UE_ID/$N$)mod $Ns$ where Ns may be a quantity/number of paging occasions in a paging frame.

Parameters Ns, PF/slot offset information (e.g., parameter nAndPagingFrameOffset), and/or the length of default DRX Cycle may be indicated, for example, in SIB1. Values of N and PF_offset may be derived from the parameter nAndPagingFrameOffset. A first PDCCH monitoring occasion of the PO (e.g., first-PDCCH-MonitoringOccasionOfPO) may be indicated in SIB1 for paging in initial DL BWP. The first PDCCH monitoring occasion of the PO may be indicated in the corresponding BWP configuration for paging in a DL BWP other than the initial DL BWP.

A wireless device may use as default identifier (e.g., UE_ID=0) for determining PF and i_s, for example, if the wireless device has no 5G-S-TMSI (e.g., if the wireless device has not yet registered onto the network). 5G-S-TMSI may be a 48 bit long bit string (or any other bit length). 5G-S-TMSI may be interpreted as a binary number in which the left most bit represents the most significant bit.

A wireless device may monitor a channel (e.g., a PDCCH) for paging indications from a first wireless network. PDCCH monitoring occasions for paging may be determined according to a paging search space (e.g., pagingSearchSpace) parameter and/or a monitoring occassion (e.g., firstPDCCH-MonitoringOccasionOfPO) parameter (e.g., if configured). PDCCH monitoring occasions for paging may be the same as monitoring occasions for remaining minimum system information (RMSI), for example, if a search space identifier (e.g., SearchSpaceId) is configured to be zero for the paging search space (e.g., pagingSearchSpace). Ns may be 1 or 2, for example, if the search space identifier (e.g., SearchSpaceId) is configured to be zero for the paging search space (e.g., pagingSearchSpace). There may be one PO which may start from a first PDCCH monitoring occasion for paging in the PF for Ns=1. PO may be in the first half frame (e.g., i_s=0) or the second half frame (e.g., i_s=1) of the PF for Ns=2. A wireless device may monitor the (i_s+1)th PO, for example, if the search space identifier (e.g., SearchSpaceId) is configured to be a value other than 0 for the paging search space (e.g., pagingSearchSpace). A PO may be a set of S consecutive PDCCH monitoring occasions and S may be a number/quantity of actual transmitted SSBs determined according to a parameter (e.g., ssb-PositionsInBurst) in SIB1. The $K^{th}$ PDCCH monitoring occasion for paging in the PO may correspond to the $K^{th}$ transmitted SSB. PDCCH monitoring occasions for paging, which may not overlap with UL symbols (e.g., as determined based on tdd-UL-DL-ConfigurationCommon parameter), may be sequentially numbered from zero starting from the first PDCCH monitoring occasion for paging in the PF. A starting PDCCH monitoring occasion number/quantity of (i_s+1)th PO may be the (i_s+1)th value of the monitoring occassion parameter (e.g., firstPDCCH-MonitoringOccasionOfPO), for example, if the monitoring occassion parameter (e.g., firstPDCCH-MonitoringOccasionOfPO) is present; otherwise, it may be equal to i_s*S.

A PO associated with a PF may start in the PF or may follow the PF. PDCCH monitoring occasions for a PO may span multiple radio frames. PDCCH monitoring occasions for a PO may span multiple periods of a paging search space, for example, if the search space identifier (e.g., SearchSpaceId) is configured to be a value other than 0 for the paging search space (e.g., pagingSearchSpace).

Figure 18:
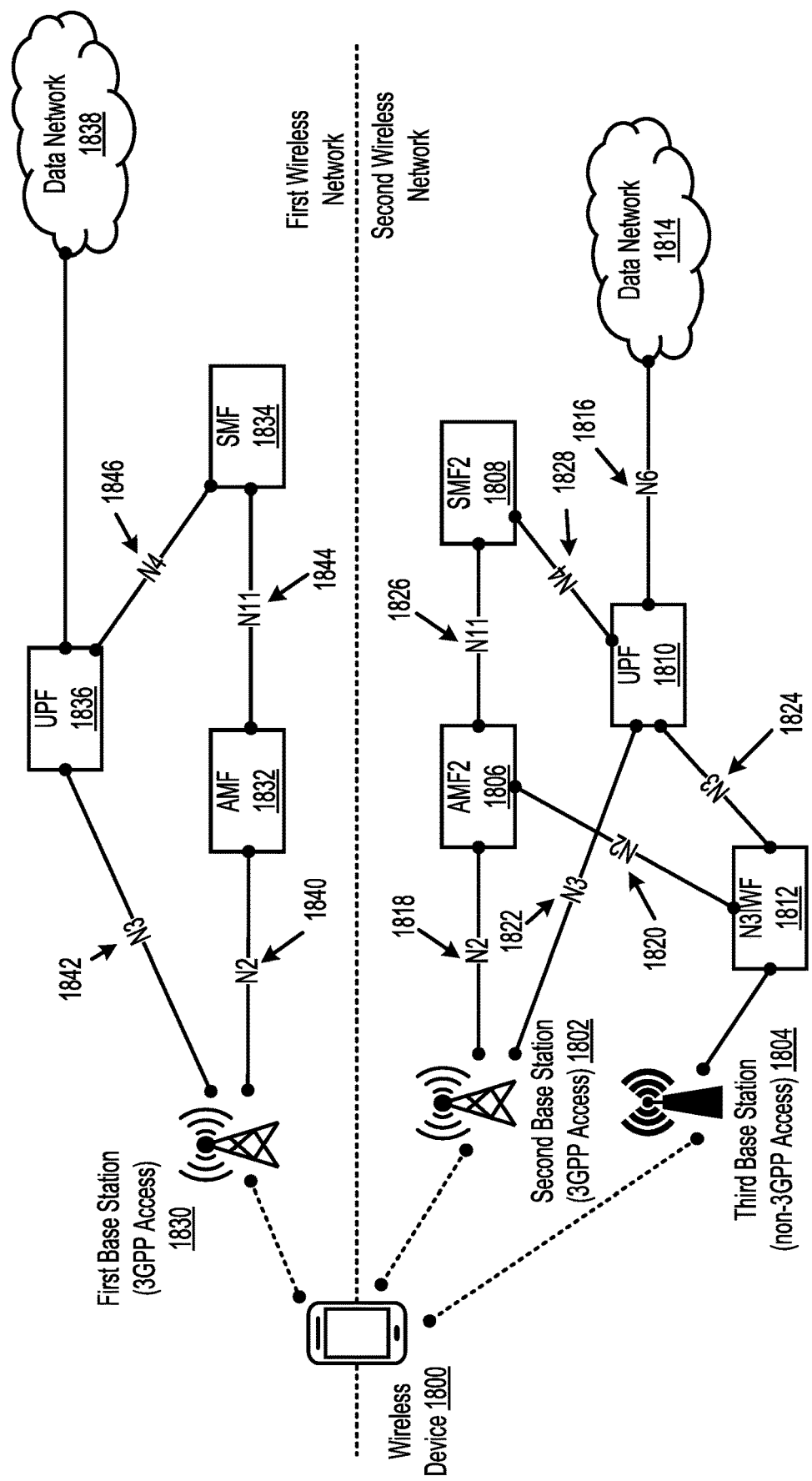
FIG. 18 shows an example network architecture.

FIG. 18 shows an example network architecture (e.g., 5G network architecture). The network architecture may comprise a wireless device 1800 (e.g., which may be the same as wireless device 100, 200, 400, 1600, or another wireless device) and two wireless networks (e.g., PLMNs, or any other communication devices), a first wireless network (e.g., a PLMN, or any other communication device) and a second wireless network (e.g., a PLMN, or any other communication device). Both the first wireless network (e.g., a PLMN, or any other communication device) and the second wireless network (e.g., a PLMN, or any other communication device) may use a 3GPP access technology for communications with the wireless device 1800. The second wireless network (e.g., a PLMN, or any other communication device) may also use a non-3GPP access technology for communications with the wireless device 1800. The wireless device 1800 may comprise a multi-SIM wireless device, for example, a dual-SIM wireless device.

The wireless device 1800 may be capable of sending (e.g., configured to send, configured to transmit, etc.) on one of the first or second wireless network (e.g., PLMNs, or any other communication devices) via a 3GPP access technology at a time. The wireless device 1800 may receive a message (e.g., paging message) comprising a request for 3GPP access technology communications via the first wireless network (e.g., a PLMN, or any other communication device) simultaneously (or near simultaneously) with the wireless device 1800 actively communicating via the second wireless network (e.g., a PLMN, or any other communication device) using a 3GPP access technology. The wireless device 1800 may determine a quality of service and/or a radio broadcast signal quality provided by the first wireless network (e.g., a PLMN, or any other communication device) based on the received message (e.g., paging message). The wireless device 1800 may avoid (e.g., may be configured to avoid) interrupting or canceling active communications via one wireless network (e.g., the second wireless network), after or based on the wireless device 1800 receiving a request for communications via another wireless network (e.g., the first wireless network). The wireless device 1800 may send a notification via a non-3GPP access technology to the first wireless network (e.g., a PLMN, or any other communication device), after or based on the request received from the first wireless network (e.g., a PLMN, or any other communication device), indicating that the wireless device 1800 declines, rejects, and/or does not accept the communications request. The notification may indicate to the first wireless network to prevent and/or stop transmission or retransmissions of the request for communications. The wireless device 1800 may decline, reject, and/or not accept the communications request from the first wireless network (e.g., a PLMN, or any other communication device) regardless of a quality of service provided by the first wireless network (e.g., a PLMN, or any other communication device) and/or based on the quality of service provided by the active connection with the second wireless network (e.g., a PLMN, or any other communication device) satisfying a minimum threshold level of quality.

The first wireless network (e.g., a PLMN, or any other communication device) may comprise a first base station 1830 (e.g., a gNB or an ng-eNB) that may use a first 3GPP access technology (e.g., 4G, 5G, LTE, NG-RAN, or other 3GPP access technology) for communicating with the wireless device 1800, an access and mobility function (AMF) 1832, a session management function (SMF) 1834, and a user plane function (UPF) 1836. The first 3GPP access technology may be the same as or different from the second 3GPP access technology. The UPF 1836 may interface with a data network 1838. An interface between the first base station 1830 and the AMF 1832 may comprise an N2 interface 1840. An interface between the first base station 1830 and the UPF 1836 may comprise an N3 interface 1842. An interface between the AMF 1832 and the SMF 1834 may comprise an N11 interface 1844. An interface between the UPF 1836 and the SMF 1834 may comprise an N4 interface 1846.

The second wireless network (e.g., a PLMN, or any other communication device) may comprise a second base station 1802 (e.g., a gNB or an ng-eNB) that may use a second 3GPP access technology (e.g., 5G, NG-RAN, or other 5G 3GPP access technology) for communicating with the wireless device 1800, a third base station 1804 that may use a non-3GPP access technology (e.g., a wireless LAN, Wi-Fi, or other non-3GPP access technology) for communicating with the wireless device 1800, an AMF 1806, an SMF 1808, a UPF 1810, and/or a non-3GPP interworking function (N3IWF) 1812. The second 3GPP access technology may be the same as or different from the first 3GPP access technology. The UPF 1810 may interface with a data network 1814 via an N6 interface 1816. The second base station 1802 and the third base station 1804 may communicate with and/or be connected to the AMF 1806. The third base station 1804 may communicate with and/or be connected to the AMF 1806 via the N3IWF 1812. The third base station 1804 may comprise an access node. The third base station 1804 may comprise at least one of an access point (AP), a wireless access point (WAP), and/or a Wi-Fi router. An interface between the second base station 1802 and the AMF 1806 may comprise an N2 interface 1818. An interface between the N3IWF 1812 and the AMF 1806 may comprise an N2 interface 1820. An interface between the second base station 1802 and the UPF 1810 may comprise an N3 interface 1822. An interface between the N3IWF 1812 and the UPF 1810 may comprise an N3 interface 1824. An interface between the AMF 1806 and the SMF 1808 may comprise an N11 interface 1826. An interface between the UPF 1810 and the first SMF 1808 may comprise an N4 interface 1828.

The wireless device 1800 may register with the first wireless network (e.g., a PLMN, or any other communication device) via the first base station 1830, and may register with the second wireless network (e.g., a PLMN, or any other communication device) via the second base station 1802. The wireless device 1800 may simultaneously (or near simultaneously) register/communicate with the second wireless network (e.g., a PLMN, or any other communication device) via the second base station 1802 and via the third base station 1804. The wireless device 1800 may establish more than one PDU session with the second wireless network (e.g., a PLMN, or any other communication device). A first PDU session may be routed via the second base station 1802 and a second PDU session may be routed via the third base station 1804. The wireless device 1800 may communicate with the first wireless network (e.g., a PLMN, or any other communication device) via the first base station 1830.

The wireless device 1800 may support at least two SIMs 1602, for example, as shown in FIG. 16. The wireless device 1800 may comprise a dual-SIM or a multi-SIM device. The at least two SIMs 1602 may comprise a first SIM (e.g., SIM1) for communicating with the first wireless network (e.g., a PLMN, or any other communication device) and a second SIM (e.g., SIM2) for communicating with second wireless network (e.g., a PLMN, or any other communication device), as shown in FIG. 16. One or more of the first SIM (e.g., SIM1) and the second SIM (e.g., SIM2) may comprise a physical SIM card (e.g., a plastic SIM card) or an embedded SIM (e.g., an electronic SIM card).

The wireless device 1800 may comprise a first communication module (e.g., 3GPP communication module) and a second communication module (e.g., a non-3GPP communication module, such as a WLAN/Wi-Fi communication module, a Bluetooth communication module, a satellite communication module, etc.). The first communication module may comprise at least one receiver and at least one transmitter. The wireless device 1800 may use the first communication module to communicate with the first wireless network (e.g., a PLMN, or any other communication device) via the first base station 1830 and to communicate with the second wireless network (e.g., a PLMN, or any other communication device) via the second base station 1802. The wireless device 1800 may use the second communication module to communicate with the second wireless network (e.g., a PLMN, or any other communication device) via the third base station 1804.

Figure 19:
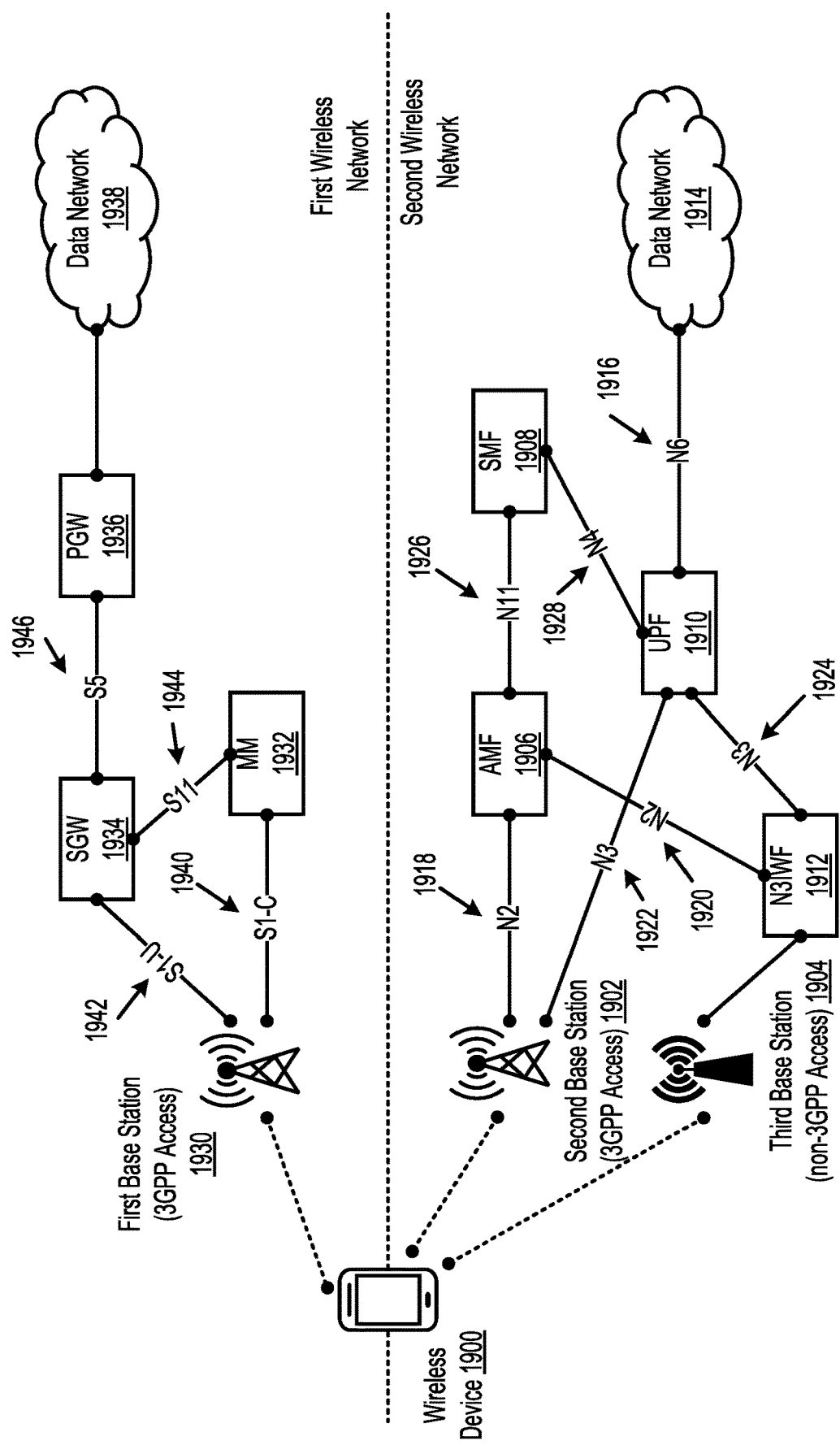
FIG. 19 shows an example network architecture.

FIG. 19 shows an example network architecture (e.g., 4G and 5G network architecture). The network architecture may comprise a wireless device 1900 (e.g., which may be the same as wireless device 100, 200, 400, 1600, 1800, or another wireless device) and two wireless networks, a first wireless network (e.g., a PLMN, or any other communication device) and a second wireless network (e.g., a PLMN, or any other communication device). The network architecture shown in FIG. 19 may be similar to the network architecture shown in FIG. 18, except, for example, for the 3GPP access technology used by the first wireless network (e.g., a PLMN, or any other communication device). The first wireless network shown in FIG. 19 may use a first core network (e.g., 4G core network) 3GPP access technology, for example, evolved packet core (EPC), whereas the second wireless network shown in FIG. 19 may use a second core network (e.g., 5G core network or any other core network) 3GPP access technology. The wireless device 1900 may comprise a multi-SIM wireless device, for example, a dual-SIM wireless device.

The first wireless network (e.g., a PLMN, or any other communication device) may comprise a first base station 1930 (e.g., an eNB) that uses a first 3GPP access technology (e.g., 4G, LTE, or other 4G 3GPP access technology) for communicating with the wireless device 1900, a mobility management entity (MME) 1932, a serving gateway (SGW) 1934, and a packet data network gateway (PGW) 1936. The PGW 1936 may interface with a data network 1938. An interface between the first base station 1930 and the MME 1932 may comprise an S1-C interface 1940. An interface between the first base station 1930 and the SGW 1934 may comprise an S1-U interface 1942. An interface between the MME 1932 and the SGW 1934 may comprise an S11 interface 1944. An interface between the SGW 1934 and the PGW 1936 may comprise an S5 interface 1946.

The second wireless network (e.g., a PLMN, or any other communication device) may comprise a second base station 1902 (e.g., a gNB) that uses a second 3GPP access technology (e.g., 5G, NG-RAN, or other 5G 3GPP access technology) for communicating with the wireless device 1900, a third base station 1904 that uses a non-3GPP access technology (e.g., a wireless LAN, Wi-Fi, or other non-3GPP access technology) for communicating with the wireless device 1900, a first access and mobility function (AMF) 1906, an SMF 1908, a UPF 1910, and an N3IWF 1912. The UPF 1910 may interface with a data network 1914 via an N6 interface 1916. The second base station 1902 and the third base station 1904 may communicate with/be connected to the AMF 1906. The third base station 1904 may communicate with/be connected to the AMF 1906 via the N3IWF 1912. The third base station 1904 may comprise an access node. The third base station 1904 may comprise at least one of an access point (AP), a wireless access point (WAP), and/or a Wi-Fi router. An interface between the second base station 1902 and the AMF 1906 may comprise an N2 interface 1918. An interface between the N3IWF 1912 and the AMF 1906 may comprise an N2 interface 1920. An interface between the third base station 1902 and the UPF 1910 may comprise an N3 interface 1922. An interface between the N3IWF 1912 and the UPF 1910 may comprise an N3 interface 1924. An interface between the AMF 1906 and the SMF 1908 may comprise an N11 interface 1926. An interface between the UPF 1910 and the SMF 1908 may comprise an N4 interface 1928.

The wireless device 1900 may register with the first wireless network (e.g., a PLMN, or any other communication device) via the first base station 1930, and may register with the second wireless network (e.g., a PLMN, or any other communication device) via the second base station 1902. The wireless device 1900 may simultaneously (or near simultaneously) register/communicate with the second wireless network (e.g., a PLMN, or any other communication device) via the second base station 1902 and via the third base station 1904. The wireless device 1900 may establish more than one PDU session with the second wireless network (e.g., a PLMN, or any other communication device). A first PDU session may be routed via the second base station 1902 and a second PDU session may be routed via the third base station 1904. The wireless device 1900 may communicate with the first wireless network (e.g., a PLMN, or any other communication device) via the first base station 1930.

The wireless device 1800 and 1900 may simultaneously (or near simultaneously) communicate via a 3GPP access technology of the first wireless network (e.g., a PLMN, or any other communication device) during a time period that the wireless device 1800 and 1900 may be communicating via a non-3GPP access technology of the second wireless network (e.g., a PLMN, or any other communication device), as shown in FIG. 18 and FIG. 19. A multi-SIM wireless device using a single transmission channel for 3GPP wireless network access may simultaneously (or near simultaneously) use non-3GPP transmission, for example, to communicate with a 3GPP wireless network.

A wireless device (e.g., UE, vehicle, communication device, handset, etc.), such as the wireless device 1800 shown in FIG. 18 and/or the wireless device 1900 shown in FIG. 19, may be registered to and/or may communicate with a first wireless network (e.g., the first wireless network as shown in FIG. 18 and/or the first wireless network as shown in FIG. 19) and/or a second wireless network (e.g., the second wireless network as shown in FIG. 18 and/or the second wireless network as shown in FIG. 19). The first wireless network may comprise, for example, at least one of a first PLMN, a first access technology (e.g., first system, first network), a first communication system (e.g., V2X system, cellular-V2X system, intelligent transportation system (ITS), IoT system, cellular communication system, etc.), a 5G wireless network (e.g., a first 5G wireless network), a first long-term evolution (LTE) wireless network, a first universal mobile telecommunications service (UMTS) wireless network, a satellite communication network, and/or any other wireless communication network. The second wireless network may comprise, for example, at least one of: a second PLMN, a second access technology (e.g., second system, second network), a second communication system (e.g., V2X system, cellular-V2X system, ITS, IoT system, cellular communication system, etc.), a 5G wireless network (e.g., a second 5G wireless network), a second LTE wireless network, a second UMTS wireless network, a satellite communication network, and/or any other wireless communication network.

A wireless device (e.g., the wireless devices 1600, 1710, 1720, 1730, 1800, or 1900) may support at least one SIM (e.g., the wireless device may be a dual-SIM and/or a multi-SIM wireless device). The at least one SIM may comprise at least one of a first SIM for communication with the first wireless network and/or a second SIM for communication with the second wireless network. One or more of the first SIM and the second SIM may be a physical SIM card (e.g., plastic SIM card) or an embedded SIM (eSIM) (e.g., electronic SIM card). The wireless device may have at least one receiver (e.g., single, dual, or multiple receivers) and/or at least one transmitter (e.g., single, dual, or multiple transmitters) for communication with the first wireless network and/or the second wireless network. The wireless device may comprise a communication module (e.g., 3GPP communication module; UMTS, LTE, 5G, any/or any other communication module). The communication module may comprise the at least one receiver and/or the at least one transmitter. The wireless device may employ the communication module for communication with the first wireless network and/or the second wireless network via one or more base stations (e.g., gNB, eNB, nodeB, etc.).

A first base station (e.g., the first base station 1830 and/or the first base station 1930) may serve a first wireless network. A second base station (e.g., the first base station 1830 and/or the first base station 1930) may serve a second wireless network. The first base station may comprise a gNB1, gNB, gNB central unit and/or gNB distributed unit, eNB, access node, access point, access network, RAN, and/or any other base station. The second base station may comprise a gNB1, gNB, gNB central unit and/or gNB distributed unit, eNB, access node, access point, access network, RAN, and/or any other base station. The first base station and/or a first cell may be associated with (e.g., for) the first wireless network (e.g., first system, first network, first RAT). The second base station and/or a second cell may be associated with (e.g., for) the second wireless network (e.g., second system, second network, second RAT). The first base station may be associated with (e.g., for) the first PLMN. The second base station may be associated with (e.g., for) the second PLMN. The first base station may serve the first cell. The second base station may serve the second cell.

Figure 20:
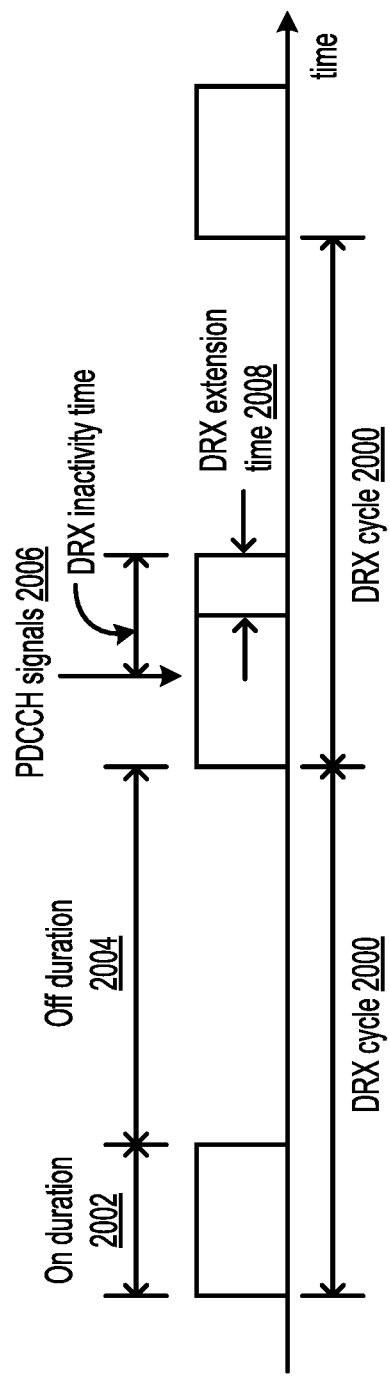
FIG. 20 shows an example that may be used for discontinuous reception (DRX)-based in-device coexistence (IDC).

FIG. 20 shows an example that may be ued for DRX-based in-device coexistence (IDC). This example may be used, for example, to resolve IDC issues. A wireless device may provide, to a base station in a first wireless network, DRX assistance information. The DRX information may be provided, for example, to configure a DRX cycle 2000 comprising a DRX on duration 2002 and a DRX off duration 2004. The wireless device may receive and/or send signals (e.g., paging signals) via the first network in the DRX on duration 2002. A DRX on duration may be maintained/extended, for example, if the wireless device transmits/receives signals to/from the base station. The wireless device may extend the DRX on duration by a DRX extension time 2008, for example, if the wireless device receives signals (e.g., PDCCH signals 2006) in the DRX on duration. The wireless device may not be able to communicate with (e.g., monitor for, receive from, transmit to, etc.) a second wireless network during a DRX on-duration (e.g., that may be extended) at the first wireless network. The DRX procedure may not provide proper gaps for the wireless device to enable simultaneous communication with the first wireless network and the second wireless network.

FIG. 21A shows an example of communications via at least two base stations. A first base station 2104 may be associated with a first cell and a first wireless network. A second base station 2108 may be associated with a second cell and a second wireless network. A wireless device 2112 may have an RRC connection with the second base station 2108. The wireless device 2112 may be in an RRC connected state at the second wireless network of the second base station 2108. The wireless device 2112 may be in an inactive state or idle state with respect to the first base station 2104.

The wireless device 2112 may receive, from the first base station 2104, signal information associated with the first cell. The signal information may comprise paging configuration information associated with the first cell. The wireless device 2112 may determine, based on the signal information, information such as assistance information for monitoring signals (e.g., paging indications) from the first wireless network (e.g., the first base station 2104 and/or the first cell). The wireless device 2112 may send (e.g., transmit), to the second base station 2108, a first message comprising the assistance information. The assistance information may indicate radio resources via which the wireless device 2112 may monitor and/or receive paging indications from the first wireless network (e.g., the first base station 2104 and/or the first cell).

The second base station 2108 may determine, based on the assistance information, configuration parameters of a monitoring gap (e.g., timing gap). The configuration parameters of the monitoring gap may indicate time resources and/or frequency resources of the monitoring gap. The monitoring gap indicated by the configuration parameters may (or may not) be the same as the radio resources indicated by the wireless device 2112, comprise the radio resources, and/or comprise at least a portion of the radio resources. The second base station 2108 may send (e.g., transmit), to the wireless device 2112, a second message indicating the configuration parameters of the monitoring gap.

The wireless device 2112 may receive the second message indicating the configuration parameters of the monitoring gap. The wireless device 2112 may monitor a channel of the first cell in the monitoring gap. The wireless device 2112 may transmit and/or receive via the channel of the first cell during the monitoring gap. The monitoring gap may correspond to a PO of the first cell. The wireless device 2112 may monitor a paging channel in the PO. The wireless device 2112 may receive, via the first cell, a paging indication. The wireless device 2112 may receive the paging indication via the paging channel in the monitoring gap.

The wireless device 2112 may stop and/or refrain from transmitting and/or receiving one or more signals to/from the second cell (and/or other serving cells of the wireless device 2112 in the second wireless network) in/during the monitoring gap. The wireless device 2112 may refrain from monitoring one or more channels in the second cell (and/or other serving cells of the wireless device 2112 in the second wireless network) in/during the communication gap. The wireless device 2112 may be in an idle state with respect to the second cell (and/or other serving cells of the wireless device 2112 in the second wireless network) in/during the communication gap. The second base station 2108 may not assign any resources, to the wireless device 2112, for uplink and/or downlink to/from the second wireless network in/during the monitoring gap. The wireless device 2112 may receive the paging indication, in/during the monitoring gap, without any interference from the second base station 2108.

The wireless device 2112 may maintain the RRC connection with the second network (e.g., the second base station 2108) in/during the monitoring gap. The wireless device 2112 may be in an RRC connected state at the second wireless network, for example, during the receiving of the paging indication and/or in the monitoring gap.

FIG. 21B shows an example of wireless device communications via two cells (e.g., the first cell and the second cell) in a time domain. The wireless device 2112 may receive paging indications 2120 via the first cell in/during a monitoring gap 2128. The wireless device 2112 may transmit/receive signals to/from the second cell and/or the other serving cells of the wireless device 2112 in the second wireless network outside the monitoring gap 2128. The monitoring gap for receiving paging indications may be associated with a repetition period 2124 (e.g., indicated by the configuration parameters of the monitoring gap).

Figures 22A, 22B:
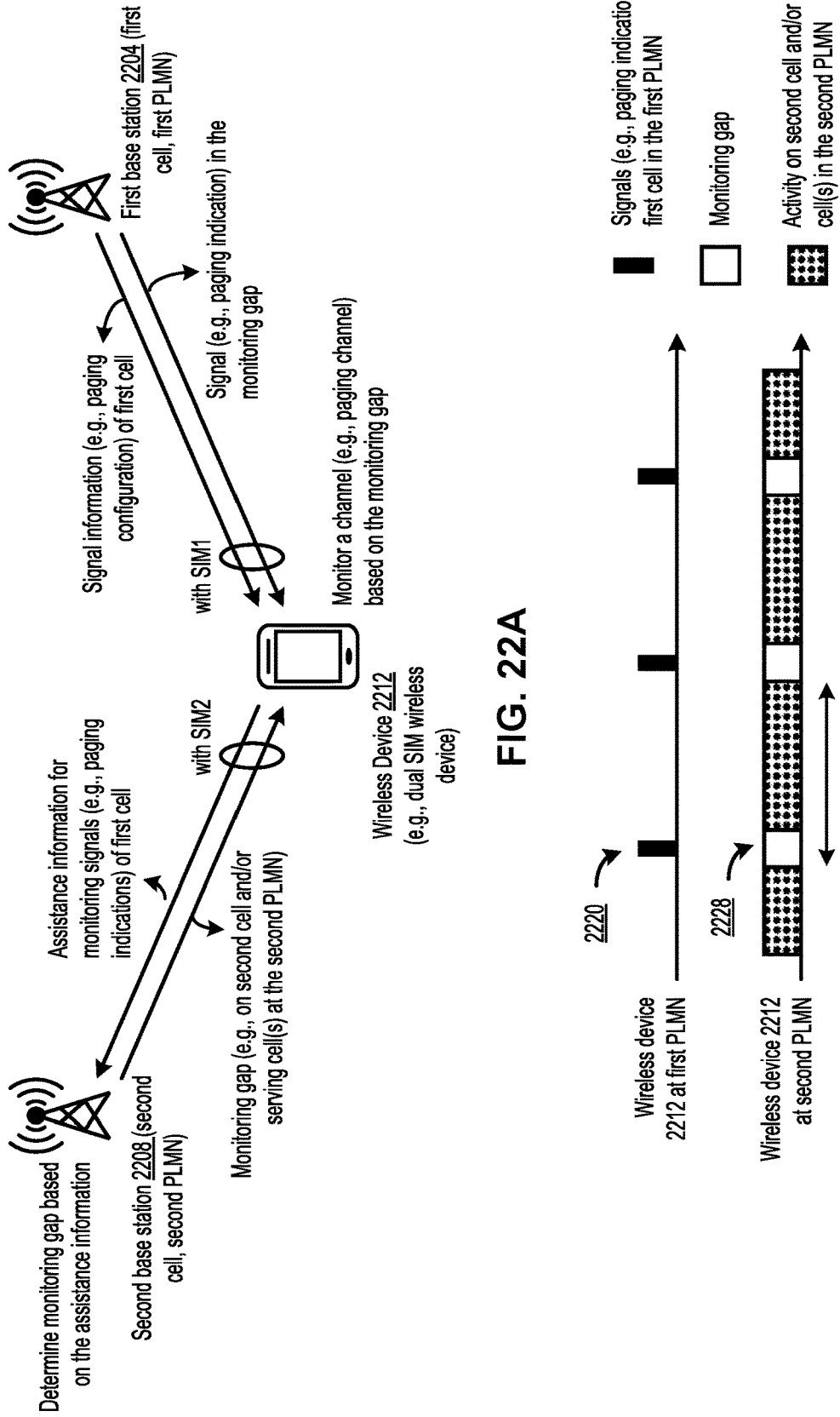
FIG. 22A shows an example of communications via at least two wireless networks.
FIG. 22B shows example of wireless device communications via a first public land mobile network (PLMN) and via a second PLMN.

FIG. 22A shows an example of communications via at least two wireless networks (e.g., PLMNs). A first base station 2204 may be associated with a first PLMN and/or a first cell. A second base station 2208 may be associated with a second PLMN and/or a second cell. The first PLMN may correspond to a first RAT (e.g., a first 3GPP access technology such as 4G) and the second PLMN may correspond to a second RAT (e.g., a second 3GPP access technology such as 5G or any other access technology).

A wireless device 2212 may be multi-SIM wireless device. The wireless device 2212 may use a first SIM (e.g., SIM1) to communicate with the first PLMN. The wireless device 2212 may use a second SIM (e.g., SIM2) to communicate with the second PLMN. The wireless device 2212 may have an RRC connection with the second base station 2208. The wireless device 2212 may be in an RRC connected state at the second PLMN corresponding to the second base station 2208. The wireless device 2212 may be dual-registered with the first PLMN and the second PLMN. The wireless device 2212 may be in an inactive state or idle state with respect to the first base station 2204.

The wireless device 2212 may receive, from the first base station 2204 of the first PLMN, signal information of the first cell. The signal information may comprise paging configuration information of the first cell. The wireless device 2212 may determine, based on the signal information, information (e.g., assistance information) for monitoring signals (e.g., paging indications) from the first PLMN (e.g., the first base station 2204 and/or the first cell). The wireless device 2212 may send/transmit, to the second base station 2208, a first message comprising the information (e.g., assistance information). The information (e.g., assistance information) may indicate radio resources via which the wireless device 2212 monitors/receives paging indications from the first PLMN (e.g., the first base station 2204 and/or the first cell).

The second base station 2208 may determine, based on the information (e.g., assistance information), configuration parameters of a monitoring gap (e.g., timing gap). The configuration parameters of the monitoring gap may indicate time resources and/or frequency resources of the monitoring gap. The monitoring gap indicated by the configuration parameters may (or may not) be the same as the radio resources indicated by the wireless device 2212, comprise the radio resources, and/or comprise at least a portion of the radio resources. The second base station 2208 may send/transmit, to the wireless device, a second message indicating the configuration parameters of the monitoring gap.

The wireless device 2212 may receive the second message indicating the configuration parameters of the monitoring gap. The wireless device 2212 may monitor a channel of the first cell in the monitoring gap. The monitoring gap may correspond to a PO of the first cell. The wireless device may monitor a paging channel in the PO. The wireless device 2212 may receive, via the first cell, a paging indication via the paging channel in/durin the monitoring gap.

The wireless device 2212 may stop and/or refrain from transmitting/receiving one or more signals to/from the second cell (and/or other serving cells of the wireless device 2212 in/during the second PLMN) in the monitoring gap. The wireless device 2212 may stop and/or refrain from monitoring one or more channels in the second cell (and/or the other serving cells) in/during the communication gap. The wireless device 2212 may be in an idle state with respect to the second cell (and/or the other serving cells) in/during the communication gap. The second base station 2208 may not assign any resources, to the wireless device 2212, for uplink and/or downlink to/from the second PLMN in/during the monitoring gap. The wireless device 2212 may receive the paging indication, in the monitoring gap, without any interference from the second PLMN.

The wireless device 2212 may maintain the RRC connection with the second PLMN (e.g., the second base station 2208) in/during the monitoring gap. The wireless device 2212 may be in an RRC connected state at the second PLMN, for example, during the receiving of the paging indication and/or in the monitoring gap.

FIG. 22B shows an example of wireless device communications via two PLMNS (e.g., a first PLMN and a second PLMN). The wireless device 2212 may receive paging indications 2220 via the first cell in/during a monitoring gap 2228. The wireless device 2212 may transmit/receive signals to/from the second cell and/or the other serving cells of the wireless device 2212 in the second PLMN outside the monitoring gap 2228. The monitoring gap for receiving paging indications may be associated with a repetition period 2224 (e.g., indicated by the configuration parameters of the monitoring gap).

Figure 23:
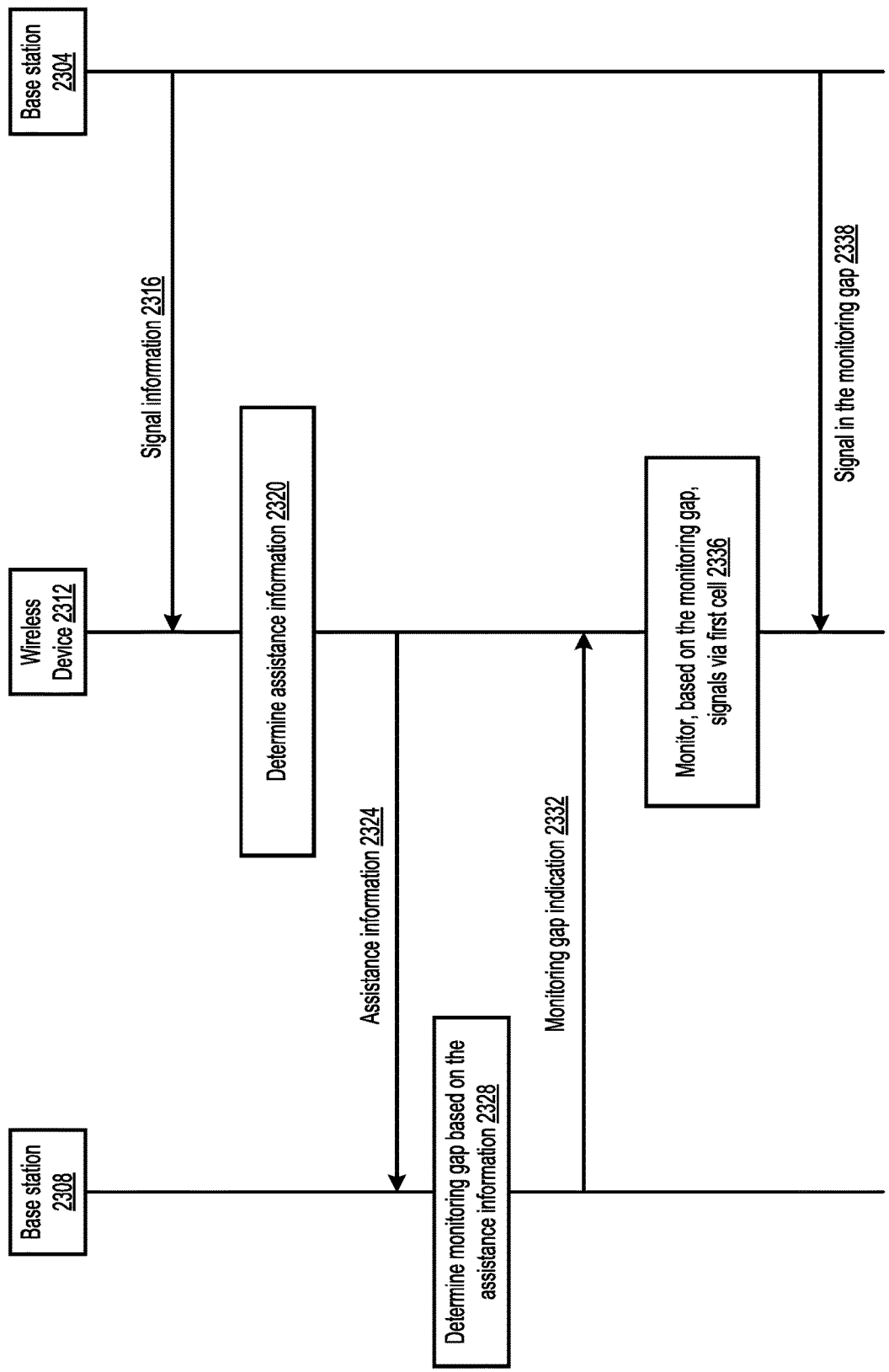
FIG. 23 shows an example of communications via at least two base stations.

FIG. 23 shows an example of communications via at least two base stations. The at least two base stations may comprise, for example, a first base station 2304 and a second base station 2308. The first base station 2304 may be associated with a first cell and/or a first wireless network. The second base station 2308 may be associated with a second cell and/or a second wireless network. The first base station 2304 and the second base station 2308 may correspond to a same RAT or may correspond to different RATs. A wireless device 2312 may be a multi-SIM wireless device.

At step 2316, the first base station 2304 may send, to the wireless device 2312, a message comprising signal information. The signal information may comprise paging configuration information associated with a first cell of the first base station 2304. The signal information may comprise information associated with a downlink channel at the first base station 2304. At step 2320, the wireless device 2312 may determine assistance information based on the signal information. At step 2324, the wireless device 2312 may send, to the second base station 2308, a message comprising the assistance information. The assistance information may indicate radio resources via which the wireless device 2112 monitors/receives signals (e.g., paging indications) from the first wireless network (e.g., the first base station 2304 and/or the first cell).

At step 2328, the second base station 2308 may determine, based on the assistance information, a monitoring gap for monitoring/receiving signals from the first wireless network. At step 2332, the second base station 2308 may send, to the wireless device 2312, a message indicating the monitoring gap. At step 2336, the wireless device 2312 may monitor, in/during the monitoring gap, signals via the first cell. The wireless device may monitor a paging occasion in the first cell. At step 2338, the first base station 2304 may send, to the wireless device 2336, a signal (e.g., a paging indication) in/during the monitoring gap. The wireless device may receive the signal in/during the monitoring gap, for example, based on the monitoring the first cell.

Figure 24A:
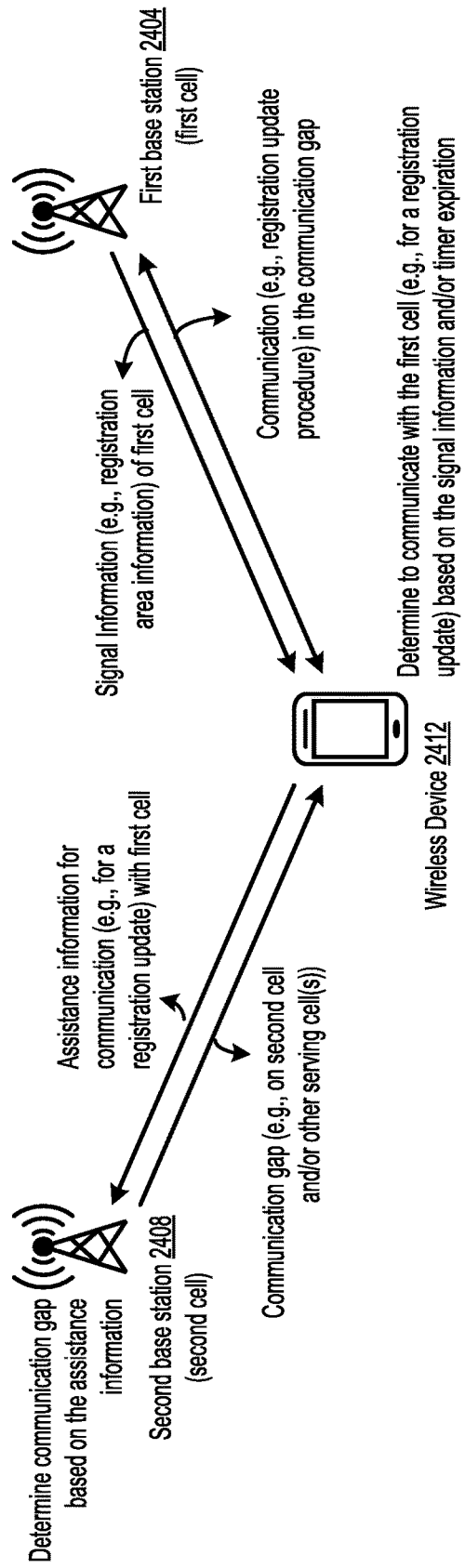
FIG. 24A shows an example of communications via least two base stations.

FIG. 24A shows an example of communications via at least two base stations. A first base station 2404 may be associated with a first cell and a first network. A second base station 2408 may be associated with a second cell and a second network. A wireless device 2412 may have an RRC connection with the second base station 2408. The wireless device 2412 may be in an RRC connected state at a wireless network of the second base station 2408. The wireless device 2412 may be in an inactive state or idle state with respect to the first base station 2404.

The wireless device 2412 may receive, from the first base station 2404, signal information of the first cell. The signal information may comprise, corresponding to the first cell, tracking area information (e.g., tracking area code, TAC, tracking area identifier, TAI, etc.), registration area information (e.g., registration area code, registration area identifier), RAN area information (e.g., RAN notification area identifier, RAN area identifier, cell identifier, etc.), closed subscribe group (CSG) identifier, closed access group (CAG) identifier, network slice information (e.g., S-NSSAI, NSSAI, etc.) of a supported network slice, and/or the like.

The wireless device 2412 may determine to communicate with the first cell, for example, based on the signal information and/or an expiration of a timer. The timer may be a timer for a periodic area update (e.g., a tracking area update, a registration area update, a RAN area update, and/or a RAN notification area update). The wireless device 2412 may determine to communicate with the first cell for a tracking area update and/or a registration update, for example, based on the first cell being a new tracking area and/or a new registration area (e.g., different from a previous tracking area and/or a previous registration area).

The wireless device 2412 may determine, based on the signal information, assistance information for communication with the first network (e.g., the first base station and/or the first cell). The communication may comprise signals associated with at least one of: a tracking area update procedure, a registration update procedure, a RAN area update procedure, packet transmission, small data transmission (e.g., early data transmission, EDT), a random access process, data or small data reception (e.g., early data transmission, EDT), and/or the like. The wireless device 2412 may determine, based on the signal information, radio resources via which the wireless device 2412 may transmit/receive the signals at the first wireless network (e.g., the first base station 2404 and/or the first cell). The wireless device 2412 may send/transmit, to the second base station 2408, a first message comprising the assistance information (e.g., indication of the radio resources).

The second base station 2408 may determine, based on the assistance information, configuration parameters of a communication gap. The configuration parameters of the communication gap may indicate time resources and/or frequency resources of the communication gap. The communication gap indicated by the configuration parameters may be the same as the radio resources indicated by the wireless device 2412, may comprise the radio resources, and/or may comprise at least a portion of the radio resources. The second base station 2408 may send (e.g., transmit), to the wireless device 2412, a second message indicating the configuration parameters of the communication gap.

The wireless device 2412 may receive the second message indicating the configuration parameters of the communication gap. The wireless device 2412 may communicate with the first network (e.g., the first base station 2404 and/or the first cell) in/during the communication gap. The communication with the first network may comprise at least one of: signal reception/transmission, the tracking area update procedure, the registration update procedure, the RAN area update procedure, the packet transmission, the small data transmission (e.g., early data transmission, EDT), random access process, data or small data reception (e.g., early data transmission, EDT), and/or the like.

The wireless device 2412 may stop and/or refrain from transmitting/receiving one or more signals to/from the second cell (and/or other serving cells of the wireless device 2412 in the second wireless network) in/during the communication gap. The wireless device 2412 may stop and/or refrain from monitoring one or more channels in the second cell (and/or the other serving cells) in/during the communication gap. The wireless device 2412 may be in an idle state with respect to the second cell (and/or the other serving cells) in/during the communication gap. The second base station 2408 may not assign any resources, to the wireless device 2412, for uplink and/or downlink to/from the second wireless network in/during the communication gap. The wireless device 2412 may communicate with the first base station 2404, in/during the communication gap, without any interference from the second wireless network.

The wireless device 2412 may maintain the RRC connection with the second wireless network (e.g., the second base station 2408) in/during the communication gap. The wireless device 2412 may be in an RRC connected state at the second wireless network, for example, if communicating with the first base station 2404 in/during the communication gap.

Figure 24B:
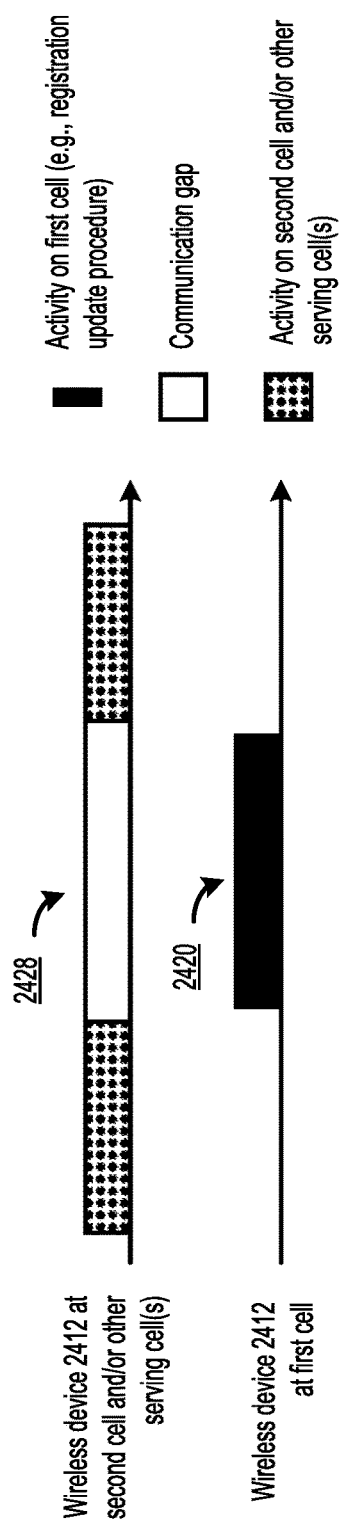
FIG. 24B shows an example of wireless device communications via two cells in a time domain.

FIG. 24B shows an example of wireless device communications via two cells (e.g., the first cell and the second cell) in a time domain. The wireless device 2412 may receive transmit/receive signals 2420 to/from the first cell in a communication gap 2428. The wireless device 2412 may transmit/receive signals to/from the second cell and/or the other serving cells of the wireless device 2412 in the second wireless network outside (e.g., not during) the communication gap 2428.

FIG. 25A shows an example of communications via at least two wireless networks (e.g., PLMNs). A first base station 2504 may be associated with a first PLMN and/or a first cell. A second base station 2508 may be associated with a second PLMN and/or a second cell. The first PLMN may correspond to a first RAT (e.g., a first 3GPP access technology such as 4G). The second PLMN may correspond to a second RAT (e.g., a second 3GPP access technology such as 5G).

A wireless device 2512 may be multi-SIM wireless device. The wireless device 2512 may use a first SIM (e.g., SIM1) to communicate with the first PLMN, and a second SIM (e.g., SIM2) to communicate with the second PLMN. The wireless device 2512 may have an RRC connection with the second base station 2508. The wireless device 2512 may be in an RRC connected state at the second PLMN corresponding to the second base station 2508. The wireless device 2512 may be dual-registered with the first PLMN and the second PLMN. The wireless device 2512 may be in an inactive state or idle state with respect to the first base station 2504.

The wireless device 2512 may receive, from the first base station 2504 of the first PLMN, signal information of the first cell. The signal information may comprise, corresponding to the first cell, tracking area information (e.g., tracking area code, TAC, tracking area identifier, TAI, etc.), registration area information (e.g., registration area code, registration area identifier), RAN area information (e.g., RAN notification area identifier, RAN area identifier, cell identifier, etc.), closed subscribe group (CSG) identifier, closed access group (CAG) identifier, network slice information (e.g., S-NSSAI, NSSAI, etc.) of a supported network slice, and/or the like.

The wireless device 2512 may determine to communicate with the first cell, for example, based on the signal information and/or timer expiration. The wireless device 2512 may determine to communicate with the first cell for a tracking area update and/or a registration update, for example, based on the first cell being a new tracking area and/or a new registration area (e.g., different from a previous tracking area and/or a previous registration area).

The wireless device 2512 may determine, based on the signal information, assistance information for communication with the first PLMN (e.g., the first base station 2504 and/or the first cell). The communication may comprise signals associated with at least one of: a tracking area update procedure, a registration update procedure, a RAN area update procedure, packet transmission, small data transmission (e.g., early data transmission, EDT), a random access process, data or small data reception (e.g., early data transmission, EDT), and/or the like. The wireless device may determine, based on the signal information, radio resources via which the wireless device may transmit/receive the signals at the first wireless network (e.g., the first base station 2404 and/or the first cell). The wireless device 2512 may send (e.g., transmit), to the second base station 2508, a first message comprising the assistance information (e.g., indication of the radio resources).

The second base station 2508 may determine, based on the assistance information, configuration parameters of a communication gap. The configuration parameters of the communication gap may indicate time resources and/or frequency resources of the communication gap. The communication gap indicated by the configuration parameters may be the same as the radio resources indicated by the wireless device 2512, may comprise the radio resources, and/or may comprise at least a portion of the radio resources. The second base station 2508 may send (e.g., transmit), to the wireless device 2512, a second message indicating the configuration parameters of the communication gap.

The wireless device 2512 may receive the second message indicating the configuration parameters of the communication gap. The wireless device may communicate with the first PLMN (e.g., the first base station 2504 and/or the first cell) in/during the communication gap. The communication with the PLMN may comprise at least one of: signal reception/transmission, the tracking area update procedure, the registration update procedure, the RAN area update procedure, the packet transmission, the small data transmission (e.g., early data transmission, EDT), random access process, data or small data reception (e.g., early data transmission, EDT), and/or the like.

The wireless device 2512 may stop and/or refrain from transmitting/receiving one or more signals to/from the second cell (and/or other serving cells of the wireless device 2512 in the second PLMN) in/during the communication gap. The wireless device 2512 may stop and/or refrain from monitoring one or more channels in the second cell (and/or the other serving cells) in/during the communication gap. The wireless device 2512 may be in an idle state with respect to the second cell (and/or the other serving cells) in/during the communication gap. The second base station 2508 may not assign any resources, to the wireless device 2512, for uplink and/or downlink to/from the second PLMN in the communication gap. The wireless device 2512 may communicate with the first base station 2504, in/during the communication gap, without any interference from the second base station 2508.

The wireless device 2512 may maintain the RRC connection with the second PLMN (e.g., the second base station 2508) in the communication gap. The wireless device 2512 may be in an RRC connected state at the second PLMN, for example, if communicating with the first base station 2504 in/during the communication gap.

FIG. 25B shows an example of wireless device communications via two PLMNs (e.g., a first PLMN and via a second PLMN). The wireless device 2512 may transmit/receive signals 2520 to/from the first cell in the first PLMN in/during a communication gap 2528. The wireless device 2512 may transmit/receive signals to/from the second cell and/or the other serving cells of the wireless device 2512 in the second PLMN outside (e.g., not during) the communication gap 2528.

Figure 26:
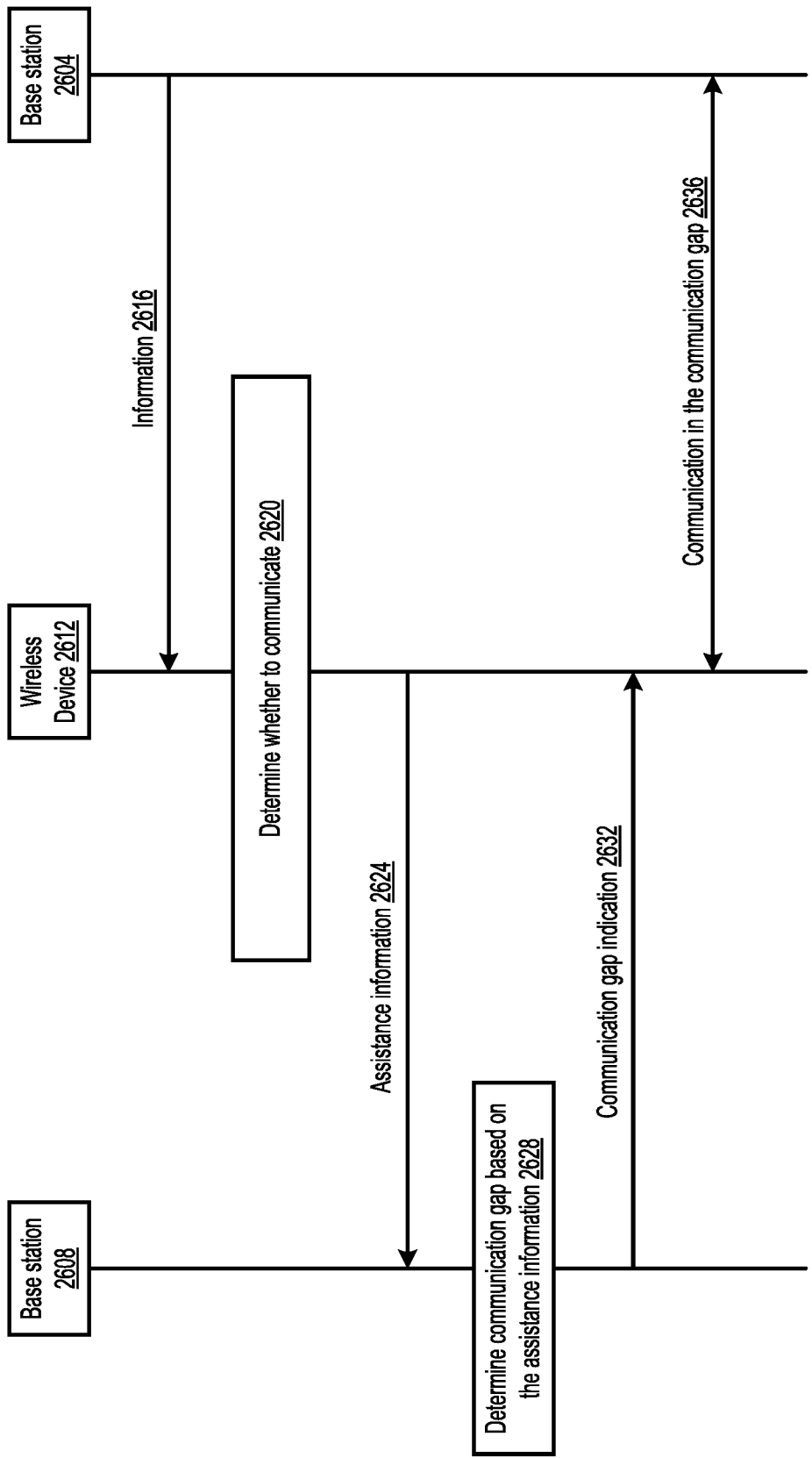
FIG. 26 shows an example of communications via at least two base stations.

FIG. 26 shows an example of communications via at least two base stations. The at least two base stations may comprise, for example, a first base station 2604 and a second base station 2608. The first base station 2604 may be associated with a first cell and/or a first wireless network. The second base station 2608 may be associated with a second cell and/or a second wireless network. The first base station 2604 and the second base station 2608 may correspond to a same RAT or may correspond to different RATs. A wireless device 2612 may be a multi-SIM wireless device.

At step 2616, the first base station 2604 may send, to the wireless device 2612, a message comprising signal information. The signal information may correspond to signal information described above with reference to FIG. 24 and/or FIG. 25. At step 2620, the wireless device 2612 may determine assistance information based on the signal information. At step 2624, the wireless device 2612 may send, to the second base station 2608, a message comprising the assistance information. The assistance information may indicate radio resources (e.g., at the first cell) via which the wireless device 2112 transmits/receives signals from the first wireless network (e.g., the first base station 2604 and/or the first cell).

At step 2628, the second base station 2608 may determine, based on the assistance information, a communication gap for monitoring/transmitting/receiving signals to/from the first wireless network. At step 2632, the second base station 2608 may send, to the wireless device 2612, a message indicating the monitoring gap. At step 2636, the wireless device 2612 may monitor/transmit/receive signals, to/from the first wireless network, in/during the communication gap.

Provision of gaps (e.g., monitoring gaps and/or communication gaps) may enable a higher quality of service (e.g., higher throughput that may be facilitated by 5G or other protocols) in a dual-SIM/multi-SIM device. The gaps may enable a wireless device to communicate with a base station/wireless network without dropping a connection (e.g., an RRC connection) with another base station/wireless network, thereby maintaining higher quality of service. The gaps may enable the wireless device to access a service configured for high reliability (e.g., a URLLC service, an emergency notification service). A wireless device may use the gaps to receive emergency notifications and/or transmit/receive URLLC data via a wireless network without releasing an RRC connection with another wireless network. A wireless device may use the gaps to perform various procedures in a wireless network (e.g., the tracking area update procedure, the registration update procedure, the RAN area update procedure, etc.) without releasing an RRC connection with another wireless network. A wireless device may use the gaps to receive paging indications in a wireless network without releasing an RRC connection with another wireless network.

A wireless device may receive, from a first base station (e.g., of a first wireless network), at least one system information message (e.g., at least one SIB and/or at least one information message). The at least one system information message may comprise signal information (e.g., the signal information of the first cell, as described above with reference to FIGS. 21-26) of a first cell of the first base station. The first wireless network may comprise a first PLMN. The wireless device may correspond to the wireless device 2112, the wireless device 2212, the wireless device 2312, the wireless device 2412, the wireless device 2512, and/or the wireless device 2612. The first base station may correspond to the first base station 2104, the first base station 2204, the first base station 2304, the first base station 2404, the first base station 2504, and/or the first base station 2604.

The signal information may comprise paging information. The paging information may comprise at least one of: paging search space, pagingSearchSpace, Type2-PDCCH CSS set configured by pagingSearchSpace (e.g., in PDCCH-ConfigCommon for a DCI format with CRC scrambled by a P-RNTI on the primary cell of the MCG), PCCH configuration parameters (e.g., PCCH-Config, paging related configuration) etc. The wireless device may monitor a channel and/or receive a paging indication/message, for example, based on the paging information. The signal information may comprise cell information of the first cell. The cell information of the first cell may comprise at least one of: PLMN identifier of the first PLMN of the first cell, tracking area information (e.g., tracking area code, TAC, tracking area identifier, TAI, etc.), registration area information (e.g., registration area code, registration area identifier), RAN area information (e.g., RAN notification area identifier, RAN area identifier, cell identifier, etc.), closed subscribe group (CSG) identifier, closed access group (CAG) identifier, network slice information (e.g., S-NSSAI, NSSAI, etc.) of a supported network slice, and/or the like. The wireless device may communicate (e.g., initiate an RRC connection, a random access process, etc.) based on the cell information of the first cell.

The at least one system information message may comprise at least one of: RRC message (e.g., RRC reconfiguration message, RRC setup message, RRC reestablishment message, RRC resume message, etc.), MIB, SIB1, SIB2, SIB5, and/or the like. The at least one system information message may be transmitted via physical layer messaging, MAC layer messaging, and/or the like.

The signal information may comprise configuration information of at least one of: a paging occasion; a synchronization signal; a reference signal (e.g., CSI-RS, DM-RS, etc.); an SIB; a multimedia broadcast multicast service (MBMS); reception/transmission (e.g., downlink/uplink scheduling information) of transport blocks for at least one service (e.g., emergency service, URLLC service, V2X service, etc.); and/or the like. The downlink/uplink scheduling information may comprise indications of size, slots, subframes, frequency, periodicity, timing offset (e.g., quantity of slots/subframes and/or time duration from a reference time point (e.g., SFN #0) at the first base station and/or the first cell), and/or resource block, etc., corresponding to the transport blocks.

The signal information may comprise paging control channel configuration parameters. The paging control channel configuration parameters may comprise indications of at least one of: a paging cycle; a paging offset (e.g., paging frame offset); a number of paging occasions per paging frame; a first PDCCH monitoring occasion for paging of a paging occasion of a paging frame (e.g., firstPDCCH-MonitoringOccasionOfPO); and/or the like. Indications of a paging offset may comprise indications of size, slots, subframes, frequency, periodicity, and/or timing offset (e.g., a number of slots/subframes and/or a time duration from a reference time point (e.g., SFN #0) at the first base station and/or the first cell).

The at least one system information message (e.g., the signal information, the configuration information, the paging control channel configuration parameters, etc.) may comprise indications of at least one of: PDCCH configuration parameters (e.g., pdcch-Config, pdcch-ConfigSIB1, etc.), beam subcarrier offset parameter (e.g., ssb-SubcarrierOffset), subcarrier spacing information (e.g., subCarrierSpacingCommon), system frame number (e.g., systemFrameNumber), and/or the like. The PDCCH configuration parameters may comprise information of a common ControlResourceSet (CORESET), a common search space, and/or necessary PDCCH parameters. A field of the PDCCH configuration parameters (e.g., pdcch-ConfigSIB1) may indicate frequency positions where the wireless device may find SS/PBCH block with SIB1 or a frequency range where a wireless network (e.g., the first wireless network of the first base station) may not provide SS/PBCH block with SIB1, for example, if a field of the beam subcarrier offset parameter (e.g., ssb-SubcarrierOffset) indicates that SIB1 is not present. A paging indication for the wireless device may be transmitted via the PBCH. The beam subcarrier offset parameter (e.g., ssb-SubcarrierOffset) may correspond to a frequency domain offset k_SSB between SSB and an overall resource block grid in number of subcarriers. A value range of the beam subcarrier offset parameter may be extended by an additional most significant bit (MSB) encoded within PBCH. The beam subcarrier offset parameter may indicate that a cell (e.g., the first cell) does not provide SIB1 and that there is no CORESET (e.g., CORESET #0) configured in MIB. The field of the PDCCH configuration parameters (e.g., pdcch-ConfigSIB1) may indicate frequency positions where the wireless device may (or may not) find a SS/PBCH with a control resource set and/or search space for SIB1, for example, if the beam subcarrier offset parameter indicates that the cell (e.g., the first cell) does not provide SIB1 and that there is no CORESET #0 configured in MIB.

The subcarrier spacing information (e.g., subCarrierSpacingCommon) may indicate subcarrier spacing for SIB1, Msg 2/4 for initial access, paging, and/or broadcast SI-messages. A value (such as scs15or60) may correspond to a 15 kHz subcarrier spacing, and/or a value (such as scs30or120) may correspond to a 30 kHz subcarrier spacing, for example, if the wireless device acquires the at least one system information message (e.g., MIB) on a carrier frequency that is less than 6 GHz. A value (such as scs15or60) may correspond to 60 kHz and/or a value (such as scs30or120) may correspond to 120 kHz, for example, if the wireless device acquires the at least one system information message (e.g., MIB) on a carrier frequency that is greater than 6 GHz. The system frame number (e.g., systemFrameNumber) may indicate 6 MSB of a 10-bit SFN (or any other quantity of MSBs of a SFN). 4 LSBs of the SFN may be indicated in a PBCH transport block as part of channel coding (e.g., outside the MIB encoding).

The at least one system information message (e.g., SIB1, the signal information, the paging information, the cell information) may comprise serving cell configuration parameters (e.g., servingCellConfig (dedicated), servingCellConfigCommon, servingCellConfigCommonSIB, etc.). The serving cell configuration parameters may comprise at least one of: beam configuration parameters (e.g., for SSB, CSI-RS, etc.), uplink configuration parameters, and/or downlink configuration parameters (e.g., DownlinkConfig (dedicated), DownlinkConfigCommon, DownlinkConfigCommonSIB, etc.) of the first cell. The downlink configuration parameters may comprise at least one of: BWP downlink configuration parameters (e.g., BWP-DownlinkCommon, BWP-Downlink (dedicated)), PCCH configuration parameters (e.g., PCCH-Config, paging related configuration), and/or the like. The BWP downlink configuration parameters may comprise PDCCH configuration parameters (e.g., PDCCH-ConfigCommon, PDCCH-Config (dedicated)) comprising information corresponding to a paging search space (e.g., pagingSearchSpace). The information corresponding to the paging search space may indicate an identifier of a search space for paging (e.g., indicating Type2-PDCCH CSS set).

FIG. 27 shows example PCCH configuration parameters (e.g., PCCH-Config). The PCCH configuration parameters may comprise at least one of: paging cycle information (e.g., defaultPagingCycle), PO information (e.g., firstPDCCH-MonitoringOccasionOfPO), PF/slot offset information (e.g., nAndPagingFrameOffset), number of POs (e.g., ns), and/or the like. The PF/slot offset information may comprise a quantity of slots/subframes and/or a time duration from a reference time point (e.g., SFN #0).

FIG. 28 shows descriptions of the example PCCH configuration parameters. The paging cycle information (e.g., defaultPagingCycle) of the PCCH configuration parameters may indicate a default paging cycle, which may be used to derive DRX cycle of the wireless device (e.g., T). T may be determined as the shortest one of a wireless device-specific DRX value of the wireless device, if configured by RRC and/or upper layers, and a default DRX value broadcasted in a system information message. The default DRX value may be applied, for example, if a wireless device-specific DRX value is not configured by RRC messaging and/or by upper layers. A defaultPagingCycle value rf32 may indicate that the default paging cycle is 32 radio frames. A defaultPagingCycle value rf64 may indicate that the default paging cycle is 64 radio frames, and so on. The PO information (e.g., firstPDCCH-MonitoringOccasionOfPO) of the PCCH configuration parameters may indicate first PDCCH monitoring occasion for paging of PO of a PF.

The PF offset information (e.g., nAndPagingFrameOffset) of the PCCH configuration parameters may be used to determine a number N of total PFs in T (e.g., DRX cycle of the wireless device) and/or PF offset (e.g., PF_offset). A value (such as oneSixteenthT) may correspond to T/16. A value (such as oneEighthT) may correspond to T/8, and so on. The quantity/number N of total PFs in T may be based on SSB periodicity (e.g., ssb-periodicityServingCell).: N may be set to, for example, if a paging search space (e.g., pagingSearchSpace) is set to zero and if RMSI multiplexing pattern is 2 or 3: one of {oneT, halfT, quarterT, oneEighthT, oneSixteenthT} for ssb-periodicityServingCell of 5 or 10 ms; one of {halfT, quarterT, oneEighthT, oneSixteenthT} for ssb-periodicityServingCell of 20 ms; one of {quarterT, oneEighthT, oneSixteenthT} for ssb-periodicityServingCell of 40 ms; one of {oneEighthT, oneSixteenthT} for ssb-periodicityServingCell of 80 ms; and/or oneSixteenthT for ssb-periodicityServingCell of 160 ms. N may be set to one of {halfT, quarterT, oneEighthT, oneSixteenthT}, for example, if a paging search space (e.g., pagingSearchSpace) is set to zero and if RMSI multiplexing pattern is 1. N may be set to one of {oneT, halfT, quarterT, oneEighthT, oneSixteenthT}, for example, if a paging search space (e.g., pagingSearchSpace) is not set to zero. The PCCH configuration parameters may indicate a number of paging occasions per paging frame (e.g., ns).

The wireless device may determine, based on the at least one system information message (e.g., the signal information, the paging information, and/or the cell information), information such as assistance information (e.g., the assistance information as described above with reference to FIGS. 21-26). The assistance information may be for monitoring of signals from the first wireless network (e.g., via the first cell and/or the first base station) and/or for communication with the first wireless network (e.g., via the first cell and/or the first base station). The wireless device may send the assistance information to a second base station (e.g., associated with a second wireless network and/or a second cell). The second base station may correspond to the second base station 2108, the second base station 2208, the second base station 2308, the second base station 2408, the second base station 2508, or the second base station 2608. The second wireless network may be a second PLMN.

The wireless device may determine the assistance information for monitoring/receiving paging indications from the first wireless network (e.g., the first base station and/or the first cell), for example, based on the signal information and/or the paging information (e.g., paging control channel configuration parameters). The wireless device may determine, based on the signal information, radio resources (e.g., at the first cell) via which the wireless device monitors/receives paging indications from the first wireless network (e.g., the first base station and/or the first cell). The radio resources may be, for example, frequency resources and/or time resources. The radio resources for monitoring/receiving paging indications may be based on at least one of: the paging cycle information, the paging occasion information, the paging frame offset information, the number of paging occasions, the BWP downlink configuration parameters, the PCCH configuration parameters, the frequency positions where the wireless device may find SS/PBCH block, and/or the like. The assistance information may indicate at least one of a periodicity (e.g., of paging occasions, paging frames/subframes/slots, etc.), a timing offset (e.g., of paging occasions, paging frames/subframes/slots, etc.), a size/duration (e.g., of paging indications/occasions), and/or the like.

The wireless device may determine, based on the signal information (e.g., the cell information, configuration information of the reference signal, the SIB, the MBMS, the reception/transmission of transport blocks for the at least one service, etc.), the assistance information for monitoring/receiving packets/data from the first wireless network (e.g., the first base station and/or the first cell). The packets/data may correspond to a broadcast signal, downlink packets, etc. The monitoring/receiving packets/data may comprise monitoring/receiving at least one of: packets for services, packets for a V2X service, packets for a URLLC service, emergency data, packets for a broadcast/multicast service, system information blocks (e.g., MIB, SIB1, SIB2, etc.), and/or the like. The wireless device may determine, based on the signal information, radio resources (e.g., at the first cell).) via which the wireless device may monitor/receive packets/data from the first wireless network (e.g., the first base station and/or the first cell). The radio resources may be, for example, frequency resources and/or time resources. The radio resources for monitoring/reception packets/data may be based on at least one of: the configuration information of the MBMS and/or reception/transmission of transport blocks for the at least one service (e.g., emergency service, URLLC service, V2X service, etc.), the BWP downlink configuration parameters, the PDCCH configuration parameters, the beam subcarrier offset parameters, subcarrier spacing information, the frequency information, the CORESET parameters, and/or the like.

The wireless device may determine, based on the signal information (e.g., the cell information, the configuration information of the reference signal and/or the reception/transmission of transport blocks for the at least one service, the system information block, etc.), the assistance information for communication with the first wireless network (e.g., the first base station and/or the first cell). The communication may comprise signals associated with at least one of: a tracking area update procedure, a registration update procedure, a RAN area update procedure, packet transmission, small data transmission (e.g., early data transmission, EDT), a random access process, data or small data reception (e.g., early data transmission, EDT), and/or the like.

The wireless device may determine to communicate with the first wireless network for the tracking area update and/or the registration update, for example, based on the first cell being a new tracking area and/or a new registration area (e.g., different from a previous tracking area and/or a previous registration area). The wireless device may determine to communicate with the first wireless network for the RAN area update, for example, based on the first cell being a new RAN area (e.g., different from a previous RAN area). The wireless device may determine to communicate with the first wireless network for the tracking/registration/RAN area update at the first cell, for example, based on expiration of a corresponding periodic area update timer. The wireless device may determine to communicate with the first wireless network for the packet transmission and/or the small data transmission, for example, based on the wireless device generating packets/data to send (e.g., transmit) for one or more services. The wireless device may determine to communicate with the first wireless network for the random access process and/or the data or small data reception, for example, based on the wireless device generating packets/data to send (e.g., transmit) for one or more services and/or receiving a paging indication from the first wireless network (e.g., from the first base station and/or via the first cell).

The wireless device may determine, based on the signal information, radio resources (e.g., at the first cell) via which the wireless device may communicate with the first wireless network (e.g., the first base station and/or the first cell). The radio resources may be, for example, frequency resources and/or time resources. The radio resources for communication with the first wireless network may be based on at least one of: the cell information (e.g., the PLMN identifier, the tracking area information, the registration area information, the RAN area information, the CSG identifier, the CAG identifier, the network slice information, etc.), the configuration information of the reference signal and/or of the reception/transmission of transport blocks for the at least one service, the configuration information of the SIB, the serving cell configuration parameters, and/or the like. The cell information may be based on need of roaming, periodic/event-based area update, membership verification, etc. The radio resources may be determined based on a time duration needed for the communication, a size of data for the packet transmission and/or the small data transmission, a size of data for the data or small data reception, a QoS (e.g., priority, type of service, QCI, 5QI, etc.) of the data for the packet/data transmission/reception and/or the small data transmission/reception, and/or the like. The wireless device may determine the radio resources based on a paging indication from the first wireless network (e.g., the first base station and/or the first cell) for the communication (e.g., access request and/or the data or small data reception). The paging indication may indicate the size of the data for the data reception or small data reception.

The wireless device may determine, based on the radio resources, information associated with an occasion for communications via the first wireless network. The wireless device may determine at least one of a periodicity of the occasion, a timing offset of the occasion, and/or a size of the occasion (e.g., a time duration). The timing offset may be a number of slots/subframes and/or time duration from a reference time point (e.g., SFN #0) at the second base station and/or the second cell. Time resources indicated by the periodicity, the timing offset, and/or the size of occasion (e.g., in time domain) may be same as the radio resources, may comprise the radio resources, and/or may comprise at least a portion of the radio resources.

The wireless device may determine frequency information based on the radio resources. The wireless device may determine the frequency information based on the BWP downlink configuration parameters, the frequency positions, the frequency information, the PDCCH configuration parameters, the beam subcarrier offset parameters, the CORESET parameters, etc. The frequency information may comprise at least one of: a frequency; a bandwidth; a combination of bands; a carrier; a subcarrier; a bandwidth part; a beam (e.g., spatial domain information; SS, CSI-RS, etc.); and/or the like. The frequency information (e.g., in frequency domain) may be same as the radio resources, may comprise the radio resources, and/or may comprise at least a portion the radio resources. The frequency information may comprise an indication of a band (e.g., carrier, frequency), for example, if the band operates in a same band combination and/or a same RF/RF chain as the radio resources for the monitoring/receiving paging indications, for the monitoring/receiving packets/data, and/or for the communication. This may reduce RF/RF chain switching, for example, if switching communications between the first wireless network and the second wireless network. The assistance information may comprise the periodicity of the occasion, the timing offset of the occasion, and/or the size of the occasion determined based on the radio resources and/or the frequency information determined based on the radio resources.

The wireless device may determine, based on the signal information, the assistance information indicating available resources at the second wireless network (e.g., the second base station, the second cell). The wireless device may determine the available resources based on the at least one system information message comprising DRX configuration parameters, power saving mode (PSM) configuration parameters, resource gap (e.g., monitoring gap, communication gap, timing gap, etc.) configuration parameters, and/or the like at the first wireless network (e.g., the first base station, the first cell). The wireless device may determine the available resources based on the at least one system information message indicating activation of the DRX configuration parameters, the PSM configuration parameters, a resource gap of the resource gap configuration parameters, and/or the like. The at least one system information message may be DCI, MAC CE, or an RRC message comprising an activation indication indicating activation of the DRX configuration parameters. The assistance information may comprise DRX configuration parameters of the wireless device at the first base station and/or a wireless device identifier of the wireless device at the first cell. The assistance information may be based on at least one of: the DRX configuration parameters at the first base station; the wireless device identifier (e.g., TMSI, 5G-S-TMSI, IMSI, etc.) of the wireless device at the first cell; and/or the like. The assistance information may comprise the DRX configuration parameters and/or the resource gap configuration parameters of the wireless device at the first wireless network (e.g., the first base station and/or the first cell). The resource gap configuration parameters may be in a subframe structure of the second base station and/or the second cell. The resource gap configuration parameters may be time shifted by a timing synchronization gap (e.g., a time difference of SFN #0)

between the first cell and the second cell. The assistance information (e.g., for the paging monitoring/receiving) may be based on at least one of: the DRX configuration parameters at the first wireless network (e.g., the first base station and/or the first cell); a wireless device identifier (e.g., TMSI, 5G-S-TMSI) of the wireless device at the first wireless network (e.g., the first base station and/or the first cell); and/or the like. The second base station (e.g., the second wireless network) may configure uplink/downlink resources for the wireless device based on the available resources (e.g., the uplink/downlink resources may be equal to and/or subset of the available resources).

The wireless device may determine, based on the signal information, the assistance information indicating available frequencies (e.g., one or more bands, one or more band combinations) at the second wireless network (e.g., the second base station, the second cell). The wireless device may determine the available frequencies based on the available frequencies not overlapping a serving frequency of the first wireless network (e.g., the first base station and/or the first cell). The wireless device may determine the available frequencies based on the available frequencies being configured for the resource gap. The wireless device may determine the available frequencies based on the available frequencies not operating in a same band combination and/or a same RF/RF chain with the radio resources for the monitoring/receiving paging indications, for the monitoring/receiving packets/data, and/or for the communication. The second base station (e.g., the second wireless network) may configure uplink/downlink resources for the wireless device based on the available frequencies (e.g., the uplink/downlink resources may be equal to and/or subset of the available frequencies).

The assistance information may comprise indication of radio resources that are to be avoided, by the wireless base station, for communicating with the second wireless network and/or radio resources configured by the wireless device at the first wireless network. The assistance information may comprise, for example, at least one of the periodicity of the occasion, the timing offset of the occasion, the size of the occasion, the frequency information of the occasion, etc. The assistance information may indicate that the wireless device is a multi-SIM device (e.g., a dual-SIM device).

The assistance information may comprise at least one of: an indication that the assistance information is for monitoring the first wireless network (e.g., the first base station and/or the first cell); an indication (e.g., a PLMN identifier) of a PLMN (e.g., the first PLMN) of the first base station or the first cell; and/or the like. The assistance information may comprise at least one of: an indication that the assistance information is for a V2X service at the first wireless network; an indication that the assistance information is for an emergency service at the first wireless network; an indication that the assistance information is for a URLLC service at the first wireless network; an indication of a QoS and/or a priority of a service at the first wireless network; an indication that the assistance information is for a primary network (e.g., high priority network); and/or the like. The first wireless network may be the primary network of the wireless device.

The wireless device may send (e.g., transmit), to the second base station and based on the signal information, a first message comprising the assistance information for the signal monitoring and/or signal transmission/reception at the first wireless network (e.g., the first base station and/or the first cell). The assistance information for the signal monitoring and/or signal transmission/reception may comprise: the radio resources for monitoring/receiving paging indications from the first wireless network, the radio resources for monitoring/receiving packets/data from the first wireless network, and/or the radio resources for communication in the first wireless network. The first message may comprise at least one uplink RRC message. The at least uplink RRC message may comprise at least one of: a wireless device assistance information message, a wireless device capability information message, an uplink information transfer message, a wireless device information message, an RRC message (e.g., an RRC setup request message, an RRC reestablishment request message, an RRC resume request message, an RRC setup complete message, an RRC reestablishment complete message, an RRC resume complete message, an RRC reconfiguration complete message, etc.), and/or the like. The first message may comprise a MAC layer indication (e.g., MAC CE), a PHY layer indication (e.g., UCI), an indication via any other layer, and/or the like. The wireless device may receive an information request message from the second base station, and the wireless device may send the first message based on (e.g., in response to) the information request message. The wireless device may receive an information response message indicating a response to/an acknowledgement of the first message.

The second base station may determine, based on the assistance information, configuration parameters of the gap (e.g., a monitoring gap and/or a communication gap). The gap may be in a time domain and/or in a frequency domain. The gap may be for monitoring/receiving paging indications, for monitoring/receiving packets/data, and/or for communication of the wireless device at the first wireless network (e.g., the first base station and/or the first cell). The second base station may not assign uplink/downlink resources (e.g., dedicated uplink/downlink resources) for the wireless device in the gap. The second base station may not send/transmit signals to the wireless device and/or receive signals from the wireless device in the gap. The gap may be configured as periodic radio resources and/or a time duration of radio resources. The second base station may configure gap periodicity, gap time offset, and/or gap size, for example, if configuring periodic radio resources for the gap. The second base station may configure gap duration and/or gap offset, for example, if configuring the time duration for the gap.

FIG. 29 shows example configuration parameters of a resource/gap. The resource/gap may be determined by the second wireless device. The configuration parameters may be indicated in a gap configuration field (e.g., GapConfig field, MonitoringGapConfig field, CommunicationGapConfig field, and/or MutingGapConfig field).

The configuration parameters of the gap (e.g., wireless resource, time duration, occassion, offset, etc.) may indicate, for the gap, at least one of: a gap periodicity; a gap time offset; a gap size (e.g., a time duration of each gap occasion); a gap duration (e.g., a time duration of entire configured gap); and/or the like. The gap time offset may be a number of slots/subframes and/or time duration from a reference time point (e.g., SFN #0) at the second base station and/or the second cell. The configuration parameters may indicate, for the gap, gap frequency information and/or spatial information. The gap frequency information and/or spatial information may comprise at least one of: a frequency; a bandwidth; a combination of bands; a carrier; a subcarrier; a bandwidth part; a beam (e.g., SS, CSI-RS, etc.); and/or the like. The gap frequency information may indicate frequency domain resources associated with the gap. The configuration parameters may comprise configurations of a PSM, a DRX cycle, a measurement gap, a monitoring gap, a communication gap, and/or the like. The gap indicated by the configuration parameters (e.g., in a time domain and/or in a frequency domain) may be the same as resources indicated by the assistance information, may comprise resources indicated by the assistance information, and/or may comprise at least a portion of resources indicated by the assistance information. The gap indicated by the configuration parameters (e.g., in a time domain and/or in a frequency domain) may be the same as the radio resources determined by the wireless device (e.g., for communicating with the first wireless network), may comprise the radio resources, and/or may comprise at least a portion of the radio resources.

FIG. 30 shows example configuration parameters of a resource/gap. The resource/gap may be, for example, a resource/gap as indicated in a gap configuration field (e.g., GapConfig field). Parameters gapFR1 and gapFR2 may indicate gap configurations corresponding to frequencies FR1 and FR2, respectively. Parameter gapUE may indicate gap configurations corresponding to both frequencies FR1 and FR2. Parameters gapFR1 and gapFR2 may (or may not) be configured, for example, if parameter gapUE is configured. Parameter gapOffset may indicate the gap offset. Parameter gl may indicate a length of the gap (e.g., in ms). Parameter grp may indicate a repetition period of the gap (e.g., in ms). Parameter gta may indicate a gap timing advance (e.g., in ms). The gap timing advance may be time duration by which a gap is advanced from an end of a subframe that is before (e.g., immediately before) a gap that may be configured among serving cells.

A third base station may configure the configuration parameters of the gap for the wireless device. The third base station may comprise at least one of: a secondary base station (e.g., in dual connectivity) for the wireless device, a handover source base station of the wireless device, a handover target base station of the wireless device, and/or the like.

The configuration parameters of the gap may comprise at least one of: cell configuration parameters (e.g., parameters indicating secondary cell addition, secondary cell removal, and/or secondary cell modification), bandwidth part configuration parameters, handover parameters (e.g., handover command), and/or the like. The second base station may remove/deactivate a secondary cell of the wireless device, for example, if a carrier of the secondary cell overlaps the radio resources indicated by the assistance information. The second base station may remove/deactivate a first bandwidth part of the wireless device, for example, if at least a portion of the first bandwidth part overlaps the radio resources indicated by the assistance information. The second base station may initiate an inter-band (e.g., inter-frequency) handover, for example, if a carrier of a primary cell of the wireless device overlaps the radio resources indicated by the assistance information.

The configuration parameters of the gap may indicate resource configuration parameters. The second base station may determine the resource configuration parameters based on the available resources indicated by the assistance information. The second base station may determine the resource configuration parameters indicating resources that the wireless device may use. The resource configuration parameters may indicate at least one of: a secondary cell addition, a secondary cell modification, and/or a secondary cell activation for a secondary cell of the wireless device, a second bandwidth part activation of a second bandwidth part, and/or uplink/downlink resource assignments for the wireless device. The resource configuration parameters may indicate the available resources as indicated in the assistance information (e.g., uplink/downlink radio resources, secondary cell, second bandwidth part, etc.).

The second base station may determine the configuration parameters of the gap based on the indication that the wireless device is a multi-SIM device (e.g., a dual-SIM device). The second base station may determine the configuration parameters of the gap based on at least one of: the indication that the assistance information is to monitor the first wireless network; the indication (e.g., the PLMN identifier) of the PLMN (e.g., the first PLMN) of the first base station or the first cell; and/or the like. The second base station may assign the gap for the wireless device, for example, if the PLMN is allowed (e.g. contracted or assigned) to cooperate with/is collocated with the second wireless network. The second base station may determine the configuration parameters of the gap based on at least one of: the indication that the assistance information is for the V2X service at the first wireless network; the indication that the assistance information is for the emergency service at the first wireless network; the indication that the assistance information is for the URLLC service at the first wireless network; the indication of the QoS and/or the priority of the service at the first wireless network; the indication that the assistance information is for the primary network (e.g., high priority network); and/or the like. The second base station may determine to configure the gap, for example, if the services (e.g., the V2X service, the emergency service, the URLLC service, and/or the service with the QoS and/or the priority) at the first wireless network are more important/urgent and/or have a higher priority than one or more services of the wireless device at the second wireless network. The second base station may degrade/deprioritize the one or more services of the wireless device at the second wireless network in the gap. The second base station may determine to configure the gap, for example, if the first wireless network is the primary network of the wireless device and/or if the second wireless network is a secondary/supplementary network of the wireless device.

The second base station may send (e.g., transmit), to the wireless device, a second message indicating the gap (e.g., the monitoring gap and/or the communication gap). The second message may comprise the configuration parameters of the gap. The second message may comprise the information response message indicating the response to/the acknowledgement of the first message. The second message may comprise at least one of: a downlink RRC message (e.g., an RRC reconfiguration message, an RRC connection reconfiguration message, an RRC setup message, an RRC reestablishment message, an RRC resume message, etc.), a MAC layer indication (e.g., a downlink MAC CE), a PHY layer indication (e.g., a downlink control indication, DCI, a PDCCH indication), etc.

The second message may comprise, for the gap, at least one of: parameters for a PSM; parameters for DRX; parameters for a measurement gap; parameters for a paging gap; parameters for a system information gap; and/or the like. The second message may comprise at least one of: an activation indication of the PSM, an activation indication of the DRX, a deactivation indication of the secondary cell, a handover command for the inter-band handover, a bandwidth part switching indication of the first bandwidth part, and/or the like.

The wireless device may stop and/or refrain from, transmitting to the second wireless network (e.g., the second base station and/or the second cell) in/during the gap. The wireless device may stop and/or refrain from transmitting at least one of: transport blocks; sounding reference signals; CSI reports; and/or the like. The wireless device may stop and/or refrain from monitoring channels and/or receiving signals from the second wireless network (e.g., the second base station, the second cell, neighboring cells of the second cell) in/during the gap. The wireless device may stop and/or refrain from monitoring/receiving, at least one of: a PDCCH; a PDSCH; a reference signal; transport blocks; and/or the like.

The wireless device may monitor, based on the monitoring gap, at least one signal of the first cell. An occasion of the at least one signal may comprise at least one of: a subframe; an OFDM symbol; and/or the like. The wireless device may use radio resources of the gap for at least one of: the monitoring/receiving paging indications at the first wireless network, the monitoring/receiving packets/data at the first wireless network, and/or the communication at the first wireless network.

The wireless device may monitor a paging occasion and/or receive a paging indication via the gap from the first wireless network (e.g., the first base station and/or the first cell). The wireless device may monitor/receive packets/data (e.g., broadcast signal, downlink packets, etc.) via the gap from the first wireless network (e.g., the first base station and/or the first cell). The monitoring/receiving the packets/data may comprise monitoring/receiving at least one of: packets for services, packets for a V2X service, packets for a URLLC service, emergency data, packets for a broadcast/multicast service, SIBs (e.g., SIB1, SIB2, etc.), MIBs, and/or the like.

The wireless device may communicate with the first wireless network (e.g., the first base station and/or the first cell) via the gap that is configured at the second wireless network (e.g., the second base station and/or the second cell). The communication with the first wireless network may comprise at least one of: signal reception/transmission, the tracking area update procedure, the registration update procedure, the RAN area update procedure, the packet transmission, the small data transmission (e.g., early data transmission, EDT), random access process, data or small data reception (e.g., early data transmission, EDT), and/or the like.

The signal reception/transmission may comprise reception/transmission of signals comprising at least one of: a paging indication; a synchronization signal; a reference signal; an SIB; transport blocks for MBMS; transport blocks for at least one service (e.g., an emergency service, a URLLC service, a V2X service, etc.); and/or the like. The wireless device may send (e.g., transmit), to the first base station and based on (e.g., in response to) receiving the signal (e.g., the paging indication), a random access preamble for at least one of: an RRC connection procedure; a registration update procedure; a tracking area update procedure; a RAN area update procedure; an early data transmission; a data transmission; and/or the like.

The wireless device may communicate with the first wireless network via the gap for the tracking area update procedure and/or the registration update procedure, for example, based on the first cell being a new tracking area and/or a new registration area (e.g., different from a previous tracking area and/or a previous registration area). The wireless device may communicate with the first wireless network via the gap for the RAN area update procedure, for example, based on the first cell being a new RAN area (e.g., different from a previous RAN area). The wireless device may communicate with the first wireless network via the gap for the tracking area update procedure/the registration area update procedure/the RAN area update procedure at the first cell based on expiration of a corresponding periodic area update timer.

The wireless device may communicate with the first wireless network via the gap for the packet transmission and/or the small data transmission, for example, based on the wireless device generating/getting (e.g., from higher layers) packets/data to transmit for one or more services (e.g., a V2X service, an emergency service, a URLLC service, and/or high priority services). The wireless device may communicate with the first wireless network via the gap for the random access process and/or the data or small data reception, for example, based on the wireless device generating/getting packets/data to transmit for one or more services (e.g., a V2X service, an emergency service, a URLLC service, and/or high priority services) and/or based on receiving a paging indication (e.g., indicating downlink data for V2X services, emergency services, URLLC services, and/or high priority services) from the first wireless network (e.g., from the first base station and/or via the first cell).

The wireless device may maintain the RRC connection with the second wireless network (e.g., the second base station), for example, if the wireless device is at least one of: monitoring/receiving the paging indications, monitoring/receiving the packet/data, and/or the communicating at the first wireless network (e.g., the first base station and/or the first cell). The wireless device may be in an RRC connected state at the second wireless network of the second base station, for example, during at least one of: the monitoring/receiving the paging indications, the monitoring/receiving the packet/data, and/or the communicating at the first wireless network. The wireless device may transmit/receive, to/from the second wireless network (e.g., the second base station and/or the second cell), transport blocks and/or control signals on/via one or more resources other than the gap. The wireless device may monitor one or more resources other than the gap on the second wireless network.

Figure 31:
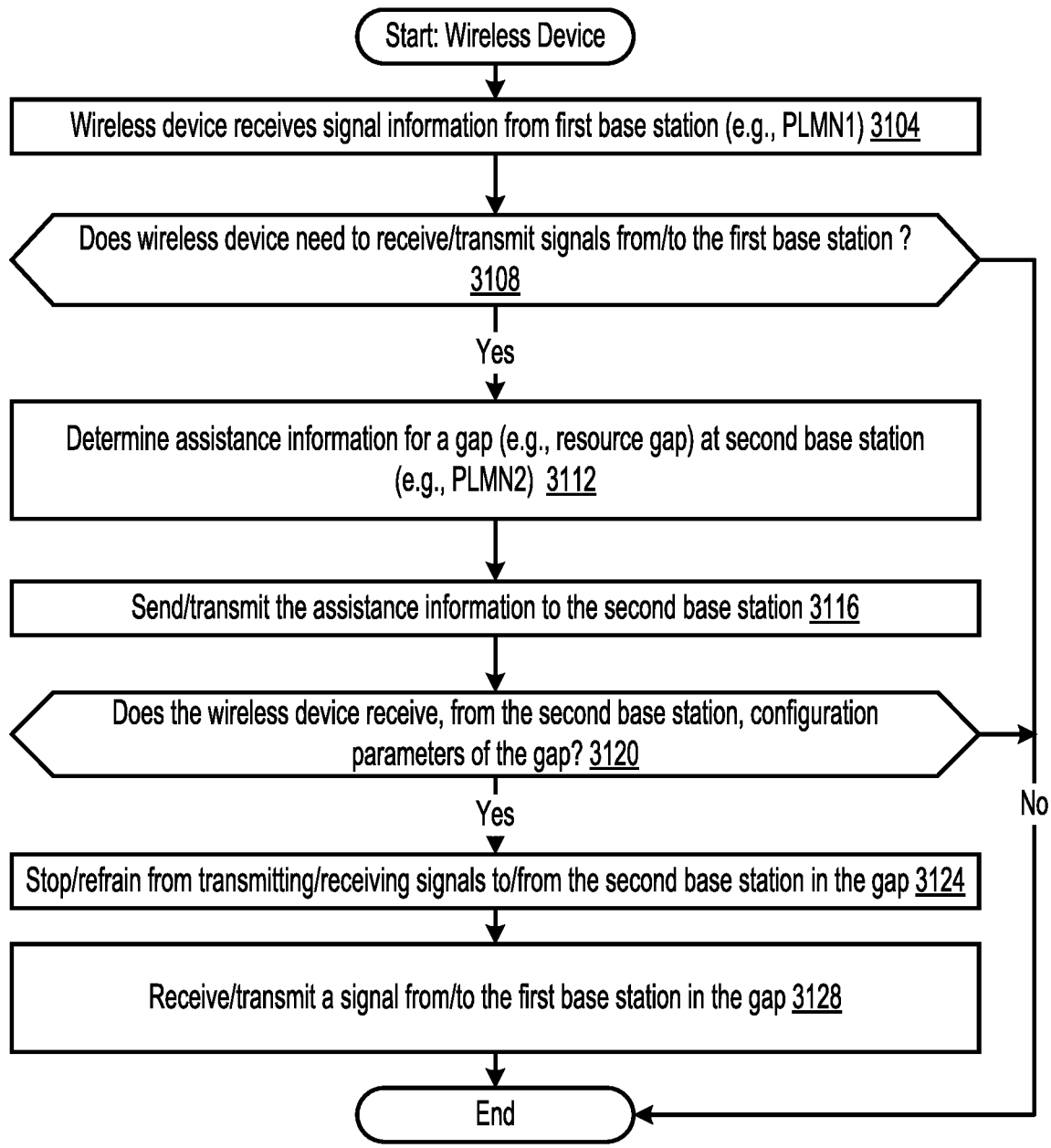
FIG. 31 shows an example method for communicating in a resource/gap.

FIG. 31 shows an example method for communicating in a resource/gap (e.g., monitoring gap and/or communication gap). The example method shown in FIG. 31 may be performed by, for example, a wireless device. At step 3104, The wireless device may receive, from a first base station, at least one SIB comprising signal information of a first cell of the first base station. The first base station may correspond to a first PLMN (e.g., PLMN1). At step 3112, the wireless device may determine assistance information for a gap (e.g., a resource gap) at a second base station, for example, if the wireless device determines it has to receive/transmit signals from/to the first base station. The second base station may correspond to a second PLMN (e.g., PLMN2). At step 3116, the wireless device may send (e.g., transmit), to the second base station and based on the signal information, a first message comprising assistance information for signal monitoring/reception/transmission. The assistance information may indicate a periodicity and/or a timing offset. At step 3124, the wireless device may stop and/or refrain from transmitting/receiving signals to/from the second base station in the gap, for example, if the wireless device receives a second message indicating configuration parameters of the gap. At step 3128, the wireless device may monitor, based on the gap, at least one channel of the first cell from the first base station. The wireless device may receive a signal (e.g., a paging indication) from the first base station, for example, based on the monitoring. The wireless device may send (e.g., transmit), to the first base station and in/during the gap, a signal.

Figure 32:
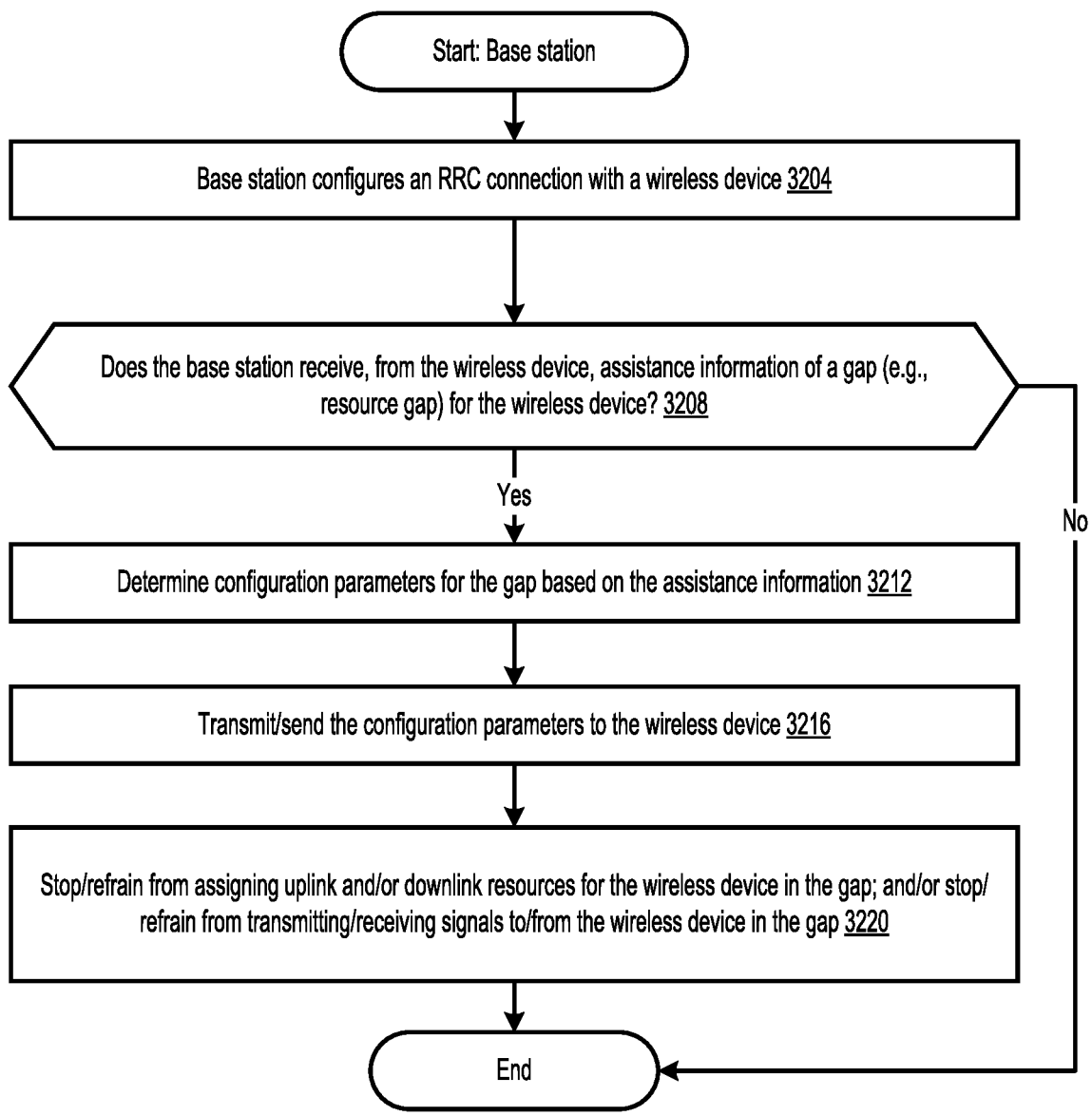
FIG. 32 shows an example method at a base station for communicating in a resource/gap.

FIG. 32 shows an example method or communicating in a resource/gap (e.g., monitoring gap and/or communication gap). The example method shown in FIG. 32 may be performed by, for example, a base station. At step 3208, the base station may configure an RRC connection with a wireless device. At step 3212, the base station may determine configuration parameters for a gap based on assistance information, for example, if the base station receives the assistance information of the gap from the wireless device. The assistance information may be for monitoring signals, at the wireless device, from another base station. The assistance information may be for transmitting/receiving signals to/from another base station. At step 3216, the base station may send (e.g., transmit) the configuration parameters to the wireless device. At step 3220, the base station may stop and/or refrain from assigning uplink and/or downlink resources for the wireless device in the gap; and/or may stop and/or refrain from transmitting/receiving signals to/from the wireless device in/during the gap.

The wireless device may maintain an RRC connection with the second base station, for example, if receiving (e.g., during a reception of) a signal from the first base station. The wireless device may be in an RRC connected state at the second wireless network of the second base station, for example, if receiving (e.g., during the reception of) the signal from the first base station. The signal may comprise at least one of: a paging indication; a synchronization signal; a reference signal; an SIB; transport blocks for MBMS; transport blocks for at least one service (e.g., emergency service, URLLC service, V2X service, etc.); and/or the like. The signal information transmitted by the first base station may comprise configuration information of at least one of: a paging occasion; a synchronization signal; a reference signal (e.g., CSI-RS, DM-RS, etc.); an SIB; an MBMS; reception of transport blocks for at least one service (e.g., emergency service, URLLC service, V2X service, etc.); and/or the like. In an example, the wireless device may be a a multi-SIM (dual SIM) device.

The wireless device may send (e.g., transmit), to the first base station and based on (e.g., in response to) receiving the signal, a random access preamble for at least one of: an RRC connection procedure; a registration update procedure; a tracking area update procedure; a RAN area update procedure; an early data transmission; a data transmission; and/or the like. The second message may comprise configuration parameters of the gap. The configuration parameters may indicate at least one of: a gap periodicity; a gap time offset; a gap size; and/or the like. The configuration parameters may indicate at least one of: a frequency; a bandwidth; a combination of bands; a carrier; a subcarrier; a bandwidth part; a beam (e.g., SS, CSI-RS, etc.); and/or the like. The second base station may determine, based on the assistance information, the configuration parameters of the gap.

The second message may comprise at least one of: an RRC message; a MAC CE; a PDCCH signal; DCI; and/or the like. The second message may comprise, for the monitoring gap, at least one of: configuration parameters for DRX; configuration parameters for a measurement gap; configuration parameters for a paging gap; configuration parameters for a system information gap; and/or the like.

The assistance information may comprise DRX configuration parameters of the wireless device at the first base station. The assistance information may be based on at least one of: DRX configuration parameters at the first base station; a wireless device identifier of the wireless device at the first cell; and/or the like.

The signal information may comprise paging control channel configuration parameters. The paging control channel configuration parameters may comprise at least one of: a paging cycle indication; a paging frame offset indication; an indication of a number of paging occasions per paging frame; an indication of a first PDCCH monitoring occasion for paging of a paging occasion of a paging frame (e.g., firstPDCCH-MonitoringOccasionOfPO); and/or the like.

The first base station may correspond to a first RAT (e.g., first system, first network). The second base station may correspond to a second radio access technology (e.g., second system, second network). The first base station may be for a first PLMN. The second base station may be for a second PLMN. The first cell may correspond to a first RAT (e.g., first system, first network). A second cell of the second base station may correspond to a second RAT (e.g., second system, second network). The first cell of the first base station may be for the first PLMN. The second cell of the second base station may be for the second PLMN.

The assistance information may indicate a size of occasion (e.g., a time duration of occasion). The assistance information may comprise information corresponding to resources that are affected and/or assisted by the assistance information. The information corresponding to the resources may indicate at least one of: a frequency; a bandwidth; a combination of bands; a carrier; a subcarrier; a bandwidth part; a beam (e.g., SS, CSI-RS, etc.); and/or the like. The assistance information may indicate that the wireless device is a multi-SIM device (e.g., a dual SIM device). The assistance information may comprise at least one of: an indication that the assistance information is to monitor a first network of the first base station or the first cell; an indication of a PLMN (e.g., the first PLMN) of the first base station or the first cell; and/or the like. The assistance information may comprise at least one of: an indication that the assistance information is for a V2X service at the first network of the first base station or the first cell; an indication that the assistance information is for an emergency service at the first network of the first base station or the first cell; an indication that the assistance information is for a URLLC service at the first network of the first base station or the first cell; an indication of a QoS and/or a priority of a service at the first network of the first base station or the first cell; an indication that the assistance information is for a primary (e.g., high priority network) network, wherein the first network of the first base station or the first cell is the primary network of the wireless device; and/or the like.

The wireless device may stop and/or refrain from transmitting, to the second network of the second base station (e.g., in/during the monitoring gap), at least one of: transport blocks; sounding reference signals; CSI reports; and/or the like. The wireless device may stop and/or refrain from monitoring, channels associated with/signals from the second network of the second base station (e.g., in/during the monitoring gap). The channels/signals from the second network may comprise at least one of: a PDCCH; a PDSCH; a reference signal; transport blocks; and/or the like.

The second network of the second base station may comprise at least one of: a second cell of the second base station; the second base station; a second RAT comprising the second base station; a second PLMN comprising the second base station; a V2X network (e.g., V2X system, cellular-V2X system, intelligent transportation system (ITS), IoT system, cellular communication system, etc.); and/or the like. The second network of the second base station may comprise at least one of: a second cell of the second base station; the second base station; a second RAT comprising the second base station; a second PLMN comprising the second base station; a second system comprising the second base station; and/or the like. An occasion of the at least one signal may comprise at least one of: a subframe; an OFDM symbol; and/or the like.

The wireless device may determine, based on the signal information, the assistance information for the signal monitoring. The wireless device may transmit/receive/monitor, to/from the second network of the second base station, transport blocks on at one or more resources outside the monitoring gap. The wireless device may comprise at least one of: a single receiver; dual receivers; two or more receivers; and/or the like.

The wireless device may send (e.g, transmit), to the second base station, a first message comprising assistance information for communication with the first base station. The assistance information may indicate at least one of: a time duration; a timing offset; and/or the like. The wireless device may receive a second message indicating a communication gap to communicate with the first base station. The wireless device may transmit/receive, based on the communication gap, one or more signals to/from the first base station. The wireless device may monitor, in the communication gap, one or more channels in a wireless network of the first base station.

The wireless device may maintain an RRC connection with the second base station if/during the transmitting/receiving/monitoring the one or more signals. The wireless device may be in an RRC connected state at the second network, for example, during the transmitting/receiving/monitoring the one or more signals. The communication may correspond at least one of: a registration area update procedure; a tracking area update procedure; a RAN area update procedure; an early data transmission; transmission and/or reception of transport blocks for at least one service (e.g., an emergency service, a URLLC service, a V2X service, etc.); and/or the like.

The second message may comprise configuration parameters of the communication gap. The configuration parameters may indicate at least one of: a gap duration; a gap time offset; and/or the like. The second message may comprise an activation indication of a PSM. The wireless device may activate the PSM for a network of the second base station.

The second base station may determine, based on the assistance information, the configuration parameters of the communication gap. The one or more signals may comprise at least one of: a random access preamble; a random access response; a radio resource control message; transport blocks for one or more services; and/or the like. The one or more signals may correspond to at least one of: a registration area update procedure; a tracking area update procedure; a RAN area update procedure; an early data transmission; transmission and/or reception of transport blocks for at least one service (e.g., an emergency service, a URLLC service, a V2X service, etc.); and/or the like.

The wireless device may stop/refrain from transmitting, to the second network of the second base station (e.g., in/during the communication gap), at least one of: transport blocks; sounding reference signals; CSI reports; and/or the like. The second network of the second base station may comprise at least one of: a second cell of the second base station; the second base station; a second RAT comprising the second base station; a second PLMN comprising the second base station; and/or the like.

The wireless device may stop and/or refrain from monitoring channels associated with/signals from a second network of the second base station (e.g., in/during the communication gap). The wireless device may stop and/or refrain from monitoring, at least one of: a PDCCH; a PDSCH; a reference signal; and/or the like. The second network of the second base station may comprise at least one of: a second cell of the second base station; the second base station; a second RAT comprising the second base station; a second PLMN comprising the second base station; a second system comprising the second base station; and/or the like. The wireless device may transmit/receive/monitor, to/from a second network of the second base station, transport blocks on one or more resources outside the communication gap.

The wireless device may receive, from a first base station, at least one SIB comprising paging information of a first cell of the first base station. The wireless device may send (e.g., transmit), to a second base station and based on the paging information, a first message comprising assistance information for paging monitoring. The assistance information may indicate at least one of a periodicity (e.g., of paging occasion, paging frames/subframes/slots, etc.), a timing offset, and/or the like. The wireless device may receive a second message indicating a monitoring gap based on the assistance information. The second message may comprise, for the monitoring gap, at least one of: configuration parameters for a DRX; configuration parameters for a measurement gap; configuration parameters for a paging gap; and/or the like. The wireless device may monitor, based on the monitoring gap, the at least one paging occasion of the first cell. The wireless device may receive, via the first cell, a paging indication based on the monitoring.

The wireless device may maintain an RRC connection with the second base station, for example, in/during the monitoring gap. The wireless device may maintain an RRC connection with the second base station, for example, during the receiving the paging indication. The wireless device may be in an RRC connected state at the second network, for example, in the monitoring gap. The wireless device may send (e.g., transmit), to the first base station and based on (e.g., in response to) receiving the paging indication, a random access preamble to establish an RRC connection.

The assistance information may comprise DRX configuration parameters of the wireless device at the first base station. The assistance information may be based on at least one of: DRX configuration parameters at the first base station; a wireless device identifier of the wireless device at the first cell; and/or the like. The paging information may comprise paging control channel configuration parameters. The paging control channel configuration parameters may comprise at least one of: a paging cycle; a paging frame offset; a number of paging occasions per paging frame; a first PDCCH monitoring occasion for paging of a paging occasion of a paging frame (e.g., firstPDCCH-MonitoringOccasionOfPO). The assistance information may indicate a size of occasion (e.g., a time duration of occasion). The assistance information may indicate that the wireless device is a multi-SIM wireless device (e.g., a dual-SIM wireless device). The assistance information may comprise at least one of: an indication that the assistance information is to monitor a first network of the first base station and/or the first cell; an indication of a first PLMN of the first base station and/or the first cell.

The second message may comprise configuration parameters of the monitoring gap. The configuration parameters may indicate at least one of: a gap periodicity; a gap time offset; a gap size; and/or the like. The second base station may determine, based on the assistance information, the configuration parameters of the monitoring gap.

The wireless device may stop and/or refrain from to a second network of the second base station (e.g., in/during the monitoring gap). The wireless device may stop and/or refrain from transmitting at least one of: transport blocks; sounding reference signals; CSI reports; and/or the like. The second network of the second base station may comprise at least one of: a second cell of the second base station; the second base station; a second RAT comprising the second base station; a second PLMN comprising the second base station; and/or the like.

The wireless device may stop and/or refrain from monitoring channels associated with/signals from a second network of the second base station (e.g., in/during the monitoring gap). The wireless device may stop and/or refrain from monitoring at least one of: a PDCCH; a PDSCH; a reference signal; and/or the like. The second network of the second base station may comprise at least one of: a second cell of the second base station; the second base station; a second RAT comprising the second base station; a second PLMN comprising the second base station; a second system comprising the second base station; and/or the like.

The PO may comprise at least one of: a subframe; an OFDM symbol; and/or the like. In an example, the wireless device may determine, based on the paging information, the assistance information for the paging monitoring. The wireless device may transmit/receive/monitor, to/from a second network of the second base station, transport blocks on at one or more resources outside the monitoring gap.

A wireless device may receive, from a first base station, signal information of a first cell of the first base station. The wireless device may send (e.g., transmit), to a second base station and based on the signal information, a first message comprising assistance information for signal monitoring. The wireless device may receive, from the second base station, a second message indicating a monitoring gap. The second base station may determine the monitoring gap based on the assistance information. The wireless device may receive a signal via the first cell in/during the monitoring gap.

The wireless device may send (e.g., transmit), to a second base station, a first message comprising assistance information for communication with a first base station. The wireless device may receive a second message indicating a communication gap to communicate with the first base station. The wireless device may transmit/receive/monitor one or more signals to/from the first base station in/during the communication gap.

A wireless device may perform a method comprising multiple operations. The wireless device may receive, from a first base station associated with a first network, at least one system information block comprising paging information associated with a paging channel of a first cell of the first base station. The wireless device may send, to a second base station associated with a second network and based on the paging information, a first message comprising an indication of a periodicity of paging indications associated with the paging channel. The wireless device may receive, from the second base station, a second message indicating a timing gap based on the periodicity of the paging indications. The wireless device may monitor, based on the timing gap, the paging channel. The wireless device may receive, during the timing gap and via the paging channel, a paging indication.

The wireless device may also perform one or more additional operations. The first message may comprise assistance information that comprises the indication of the periodicity of the paging indications. The assistance information may further comprise at least one of: an indication that the wireless device communicates with the first network; an indication that the assistance information is to monitor the first network; an identifier of the first network; or discontinuous reception (DRX) configuration parameters associated with the wireless device at the first base station. The wireless device may be in a radio resource control (RRC) connected state with the second base station during the timing gap. The second message may indicate at least one of: a gap periodicity; a gap time offset; or a gap size. The first message may comprise an indication of at least one of: a timing offset of the paging indications; or a size of the paging indications. The first message may further comprise at least one of: a field indicating that the first message is for a vehicle-to-everything service via the first network; a field indicating that the first message is for an emergency service via the first network; a field indicating that the first message is for an ultra-reliable low-latency communication service via the first network; a field indicating a priority of a service; or a field indicating that the first message is for a primary network associated with the wireless device. The wireless device may be a dual subscriber identity module (SIM) device. The first network may comprise a first public land mobile network (PLMN) and the second network may comprise a second PLMN. The paging indication may comprise at least one of: a synchronization signal; a reference signal; a system information block; transport blocks for multimedia broadcast multicast service; or transport blocks for at least one service. The paging information may comprise configuration information associated with at least one of: a paging occasion; a synchronization signal; a reference signal; a system information block; a multimedia broadcast multicast service; or reception of transport blocks for at least one service. The wireless device may transmit, to the first base station and in response to receiving the paging indication, a random access preamble for at least one of: a radio resource control (RRC) connection; a registration update; a tracking area update; a radio access network (RAN) area update; or an early data transmission. The second message may comprise at least one of: a radio resource control (RRC) message; a medium access control (MAC) control element; a physical downlink control channel (PDCCH) message; or downlink control information (DCI). The second message may comprise configuration parameters of the timing gap, the configuration parameters indicating at least one of: a frequency; a bandwidth; a combination of bands; a carrier; a subcarrier; a bandwidth part; or a beam. The second message may comprise, for the timing gap, at least one of: configuration parameters for discontinuous reception (DRX); configuration parameters for a measurement gap; configuration parameters for a paging gap; or configuration parameters for a system information gap. The assistance information may be based on at least one of: discontinuous reception (DRX) configuration parameters at the first base station; or a wireless device identifier of the wireless device at the first cell. The paging information may comprise paging control channel configuration parameters indicating at least one of: a paging cycle; a paging frame offset; a number of paging occasions per paging frame; or a first physical downlink control channel (PDCCH) monitoring occasion for paging of a paging occasion of a paging frame. The first base station may be associated with a first radio access technology; and the second base station may be associated with a second radio access technology. The first cell may be associated with a first radio access technology; and a second cell of the second base station may be associated with a second radio access technology. The assistance information may indicate at least one of: a frequency; a bandwidth; a combination of bands; a carrier; a subcarrier; a bandwidth part; or a beam. The first message may indicate that the wireless device is a dual subscriber identity module (SIM) device. The wireless device may refrain from sending, during the timing gap, to the second base station, at least one of: transport blocks; sounding reference signals; or channel state information reports. The second network may comprise at least one of: a second cell of the second base station; a radio access technology (RAT) comprising the second base station; a vehicle-to-everything network, or a system comprising the second base station. The wireless device may refrain from monitoring, during the timing gap, at least one of: a physical downlink control channel (PDCCH) associated with the second network; a physical downlink shared channel (PDSCH) associated with the second network; or a reference signal associated with the second network. An occasion of the paging indication may comprise at least one of: a subframe; or an orthogonal frequency-division multiplexing symbol. The wireless device may determine, based on the paging information, assistance information for monitoring the paging indication of the paging channel. The wireless device may communicate, via one or more resources other than the timing gap, with the second network. The wireless device may comprise one or more receivers.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the second message. A computer-readable medium may store instructions that, when executed, cause performance of the described method, additional operations and/or include the additional elements.

A wireless device may perform a method comprising multiple operations. The wireless device may send, to a first base station, a first message indicating: a time duration for communicating with a second base station; and a timing offset for communicating with the second base station. The wireless device may receive, from the first base station, a second message indicating a communication gap based on the first message for communicating with the second base station. The wireless device may communicate, during the communication gap, with the second base station.

The wireless device may also perform one or more additional operations. The wireless device may be in a radio resource control (RRC) connected state with the first base station during the communication gap. The communicating with the second base station may comprise at least one of: a registration area update procedure; a tracking area update procedure; a radio access network (RAN) area update procedure; an early data transmission; or transmission or reception of transport blocks for at least one service. The time duration may be a size of paging indications, the timing offset may be a timing offset of the paging indications, the communication gap may be a timing gap, and the communicating during the communication gap may comprise receiving, during the timing gap and via a paging channel, a paging indication. The second message may further comprise configuration parameters of the communication gap indicating at least one of: a gap size; or a gap time offset. The second message may further comprise an activation indication of a power saving mode. The wireless device may activate the power saving mode for a wireless network of the first base station. The communicating with the second base station may comprise transmitting or receiving one or more signals, wherein the one or more signals may comprise at least one of: a random access preamble; a random access response; a radio resource control (RRC) message; or transport blocks for one or more services. The communicating with the second base station may comprise transmitting or receiving one or more signals associated with at least one of: a registration area update; a tracking area update; a radio access network (RAN) area update; an early data transmission; or at least one service. The wireless device may refrain from sending, during the communication gap and via a wireless network of the first base station, at least one of: transport blocks; sounding reference signals; or channel state information (CSI) reports. A network of the second base station may comprise at least one of: a cell of the second base station; a radio access technology (RAT) comprising the second base station; a public land mobile network (PLMN) comprising the second base station; or a system comprising the second base station. The wireless device may refrain from monitoring, during the communication gap, at least one of: a physical downlink control channel (PDCCH) associated with a network of the second base station; a physical downlink shared channel (PDSCH) associated with the network of the second base station; or a reference signal associated with the network of the second base station. The wireless device may communicate, via one or more resources other than the communication gap, with a network of the second base station.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the second message. A computer-readable medium may store instructions that, when executed, cause performance of the described method, additional operations and/or include the additional elements.

A wireless device may perform a method comprising multiple operations. The wireless device may send, to a first base station, a first message comprising indications of: a periodicity of paging indications associated with a paging channel of a second base station, and a timing offset of the paging indication. The wireless device may receive a second message indicating a timing gap based on the first message. The wireless device may monitor, based on the timing gap, at least one paging occasion of a cell of the second base station. The wireless device may receive, during the timing gap and via the cell, a paging indication.

The wireless device may also perform one or more additional operations. The wireless device may be in a radio resource control (RRC) connected state with the first base station during the timing gap. The wireless device may send, to the second base station and based on receiving the paging indication, a random access preamble to establish an RRC connection. The first message may further comprise discontinuous reception (DRX) configuration parameters associated with the wireless device at the second base station. The first message may comprise assistance information that comprises the indications of the periodicity and the timing offset. The assistance information may be based on at least one of: discontinuous reception (DRX) configuration parameters at the first base station; or a wireless device identifier of the wireless device at a second cell of the first base station. The assistance information may be based on paging information comprising paging control channel configuration parameters indicating at least one of: a paging cycle; a paging frame offset; a number of paging occasions per paging frame; or a first physical downlink control channel (PDCCH) monitoring occasion for paging of a paging occasion of a paging frame. The first base station may be associated with a first radio access technology; and the second base station may be associated with a second radio access technology. The first base station may be associated with a first public land mobile network (PLMN); and the second base station may be associated with a second PLMN. The cell may be associated with a first radio access technology (RAT); and a second cell of the first base station may be associated with a second RAT. The cell is associated with a first PLMN; and a second cell of the first base station is associated with a second PLMN. The first message may indicate a size of a paging occasion. The first message may indicate that the wireless device is a dual subscriber identity module (SIM) device. The assistance information may comprise at least one of: an indicator indicating that the assistance information is to monitor a first network of the first base station; or an indicator indicating a public land mobile network (PLMN) of the first base station. The wireless device may be a dual subscriber identity module (SIM) device. The second message may indicate at least one of: a gap periodicity; a gap time offset; or a gap size. The wireless device may refrain from transmitting, during the timing gap, via a network of the second base station, at least one of: transport blocks; sounding reference signals; or channel state information (CSI) reports. A network of the second base station may comprise at least one of: the cell of the second base station; a RAT comprising the second base station; a PLMN comprising the second base station; or a system comprising the second base station. The wireless device may refrain from monitoring, during the timing gap, at least one of: a PDCCH associated with a network of the second base station; a physical downlink shared channel (PDSCH) associated with the network of the second base station; or a reference signal associated with the network of the second base station. The at least one paging occasion comprises at least one of: a subframe; or an orthogonal frequency-division multiplexing symbol. The wireless device may communicate, via one or more resources other than the timing gap, with a network of the second base station.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the second message. A computer-readable medium may store instructions that, when executed, cause performance of the described method, additional operations and/or include the additional elements.

A wireless device may perform a method comprising multiple operations. The wireless device may receive, from a first base station, signal information of a cell of a first base station. The wireless device may transmit, to a second base station and based on the signal information, a first message comprising assistance information for signal monitoring. The wireless device may receive a second message indicating a monitoring gap based on the assistance information. The wireless device may receive, via the cell and during the monitoring gap, a signal.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the second message. A computer-readable medium may store instructions that, when executed, cause performance of the described method, additional operations and/or include the additional elements.

A wireless device may perform a method comprising multiple operations. The wireless device may transmit, to a first base station, a first message comprising assistance information for communication with a second base station. The wireless device may receive a second message indicating a communication gap to communicate with the second base station. The wireless device may communicate, during the communication gap, with the second base station.

Systems, devices and media may be configured with the method. A wireless device may comprise one or more processors; and memory storing instructions that, when executed, cause the wireless device to perform the described method, additional operations and/or include the additional elements. A system may comprise a wireless device configured to perform the described method, additional operations and/or include the additional elements; and a base station configured to send the second message. A computer-readable medium may store instructions that, when executed, cause performance of the described method, additional operations and/or include the additional elements.

Figure 33:
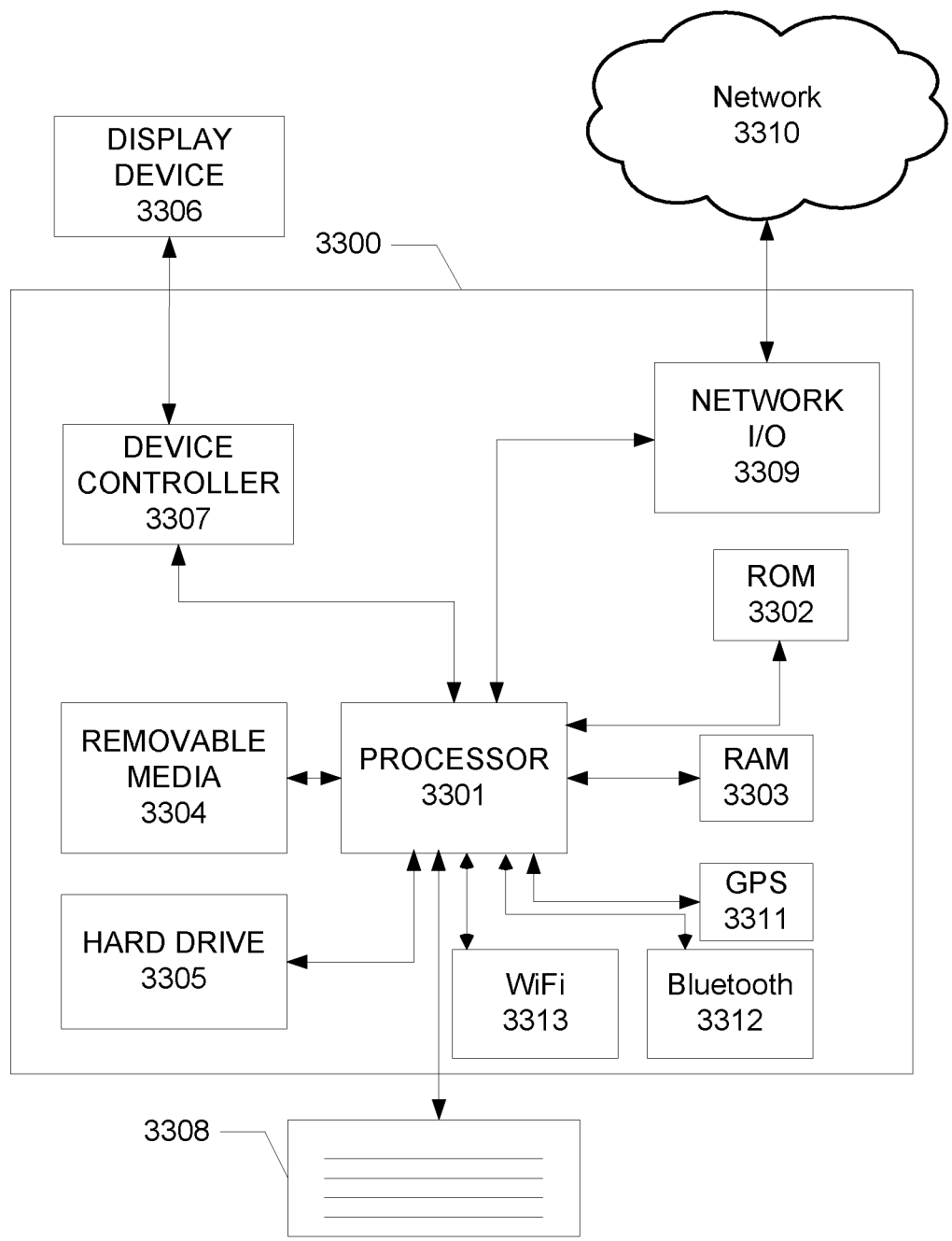
FIG. 33 shows example elements of a computing device that may be used to implement any of the various devices described herein.

FIG. 33 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3300 may include one or more processors 3301, which may execute instructions stored in the random-access memory (RAM) 3303, the removable media 3304 (such as a Universal Serial Bus (USB) drive, compact disk (CD) or digital versatile disk (DVD), or floppy disk drive), or any other desired storage medium. Instructions may also be stored in an attached (or internal) hard drive 3305. The computing device 3300 may also include a security processor (not shown), which may execute instructions of one or more computer programs to monitor the processes executing on the processor 3301 and any process that requests access to any hardware and/or software components of the computing device 3300 (e.g., ROM 3302, RAM 3303, the removable media 3304, the hard drive 3305, the device controller 3307, a network interface 3309, a GPS 3311, a Bluetooth interface 3312, a WiFi interface 3313, etc.). The computing device 3300 may include one or more output devices, such as the display 3306 (e.g., a screen, a display device, a monitor, a television, etc.), and may include one or more output device controllers 3307, such as a video processor. There may also be one or more user input devices 3308, such as a remote control, keyboard, mouse, touch screen, microphone, etc. The computing device 3300 may also include one or more network interfaces, such as a network interface 3309, which may be a wired interface, a wireless interface, or a combination of the two. The network interface 3309 may provide an interface for the computing device 3300 to communicate with a network 3310 (e.g., a RAN, or any other network). The network interface 3309 may include a modem (e.g., a cable modem), and the external network 3310 may include communication links, an external network, an in-home network, a provider's wireless, coaxial, fiber, or hybrid fiber/coaxial distribution system (e.g., a DOCSIS network), or any other desired network. Additionally, the computing device 3300 may include a location-detecting device, such as a global positioning system (GPS) microprocessor 3311, which may be configured to receive and process global positioning signals and determine, with possible assistance from an external server and antenna, a geographic position of the computing device 3300.

The example in FIG. 33 may be a hardware configuration, although the components shown may be implemented as software as well. Modifications may be made to add, remove, combine, divide, etc. components of the computing device 3300 as desired. Additionally, the components may be implemented using basic computing devices and components, and the same components (e.g., processor 3301, ROM storage 3302, display 3306, etc.) may be used to implement any of the other computing devices and components described herein. For example, the various components described herein may be implemented using computing devices having components such as a processor executing computer-executable instructions stored on a computer-readable medium, as shown in FIG. 33. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   receiving, by a wireless device from a first base station associated with a first network, at least one system information block comprising paging information associated with a paging channel of a first cell of the first base station;
   sending, by the wireless device to a second base station associated with a second network and based on the paging information, a first message comprising an indication of a periodicity of paging indications associated with the paging channel;
   receiving, from the second base station, a second message indicating a timing gap based on the periodicity of the paging indications;
   monitoring, based on the timing gap, the paging channel; and
   receiving, during the timing gap and via the paging channel, a paging indication.

2. The method of claim 1, wherein the first message comprises assistance information that comprises the indication of the periodicity of the paging indications, and wherein the assistance information further comprises at least one of:
   an indication that the wireless device communicates with the first network;
   an indication that the assistance information is to monitor the first network;
   an identifier of the first network; or
   discontinuous reception (DRX) configuration parameters associated with the wireless device at the first base station.

3. The method of claim 1, wherein the wireless device is in a radio resource control (RRC) connected state with the second base station during the timing gap.

4. The method of claim 1, wherein the second message indicates at least one of:
   a gap periodicity;
   a gap time offset; or
   a gap size.

5. The method of claim 1, wherein the first message further comprises an indication of at least one of:
   a timing offset of the paging indications; or
   a size of the paging indications.

6. The method of claim 1, wherein the first message further comprises at least one of:
   a field indicating that the first message is for a vehicle-to-everything service via the first network;
   a field indicating that the first message is for an emergency service via the first network;
   a field indicating that the first message is for an ultra-reliable low-latency communication service via the first network;
   a field indicating a priority of a service; or
   a field indicating that the first message is for a primary network associated with the wireless device.

7. The method of claim 1, wherein the wireless device is a dual subscriber identity module (SIM) device.

8. The method of claim 1, wherein the first network comprises a first public land mobile network (PLMN), and wherein the second network comprises a second PLMN.

9. A method comprising:
   sending, by a wireless device to a first base station, a first message indicating:
      a time duration for communicating with a second base station; and
      a timing offset for communicating with the second base station;
   receiving, from the first base station, a second message indicating a communication gap based on the first message for communicating with the second base station; and
   communicating, during the communication gap, with the second base station.

10. The method of claim 9, wherein the wireless device is in a radio resource control (RRC) connected state with the first base station during the communication gap.

11. The method of claim 9, wherein the communicating with the second base station comprises at least one of:
    a registration area update procedure;
    a tracking area update procedure;
    a radio access network (RAN) area update procedure;
    an early data transmission; or
    transmission or reception of transport blocks for at least one service.

12. The method of claim 9, wherein:
    the time duration is a size of paging indications,
    the timing offset is a timing offset of the paging indications,
    the communication gap is a timing gap, and
    communicating during the communication gap comprises receiving, during the timing gap and via a paging channel, a paging indication.

13. The method of claim 9, wherein the second message further comprises configuration parameters of the communication gap indicating at least one of:
    a gap size; or
    a gap time offset.

14. The method of claim 9, wherein the second message further comprises an activation indication of a power saving mode, and wherein the method further comprises:
    activating the power saving mode for a wireless network of the first base station.

15. The method of claim 9, further comprising not sending, during the communication gap and via a wireless network of the first base station, at least one of:
    transport blocks;
    sounding reference signals; or
    channel state information reports.

16. A method comprising:
sending, by a wireless device to a first base station, a first message comprising indications of:
a periodicity of paging indications associated with a paging channel of a second base station, and
a timing offset of the paging indications;
receiving a second message indicating a timing gap based on the first message;
monitoring, based on the timing gap, at least one paging occasion of a cell of the second base station; and
receiving, during the timing gap and via the cell, a paging indication.

17. The method of claim 16, wherein the wireless device is in a radio resource control (RRC) connected state with the first base station during the timing gap.

18. The method of claim 16, further comprising, sending, to the second base station and based on receiving the paging indication, a random access preamble to establish a radio resource control (RRC) connection.

19. The method of claim 16, wherein the second message comprises, for the timing gap, at least one of:
configuration parameters for a discontinuous reception (DRX);
configuration parameters for a measurement gap; or
configuration parameters for a paging gap.

20. The method of claim 16, wherein the first message further comprises discontinuous reception (DRX) configuration parameters associated with the wireless device at the second base station.

* * * * *

UNITED STATES PATENT AND TRADEMARK OFFICE
CERTIFICATE OF CORRECTION

PATENT NO. : 11,071,086 B2
APPLICATION NO. : 16/863160
DATED : July 20, 2021
INVENTOR(S) : Park et al.

It is certified that error appears in the above-identified patent and that said Letters Patent is hereby corrected as shown below:

In the Specification

Column 3, Detailed Description, Line 53:
Delete "Internation" and insert --International-- therefor Column 4, Detailed Description, Line 44:
Delete "Temptorary" and insert --Temporary-- therefor Column 10, Detailed Description, Line 66:
Delete "MasterinformationBlock" and insert --MasterInformationBlock-- therefor Column 14, Detailed Description, Line 27:
After "channel", insert --.--

Column 27, Detailed Description, Line 28:
Delete "1119)." and insert --1118).-- therefor Column 32, Detailed Description, Line 4:
Delete "1250," and insert --1240,-- therefor Column 38, Detailed Description, Line 63:
Delete "technologyes)." and insert --technologies).-- therefor Column 39, Detailed Description, Line 39:
Delete "ultra-relaible" and insert --ultra-reliable-- therefor Column 40, Detailed Description, Line 20:
Delete "connecton" and insert --connection-- therefor Signed and Sealed this
Eighteenth Day of April, 2023

*Katherine Kelly Vidal*

Katherine Kelly Vidal
*Director of the United States Patent and Trademark Office*

CERTIFICATE OF CORRECTION (continued)
U.S. Pat. No. 11,071,086 B2

Column 41, Detailed Description, Line 65:
Delete "occassion" and insert --occasion-- therefor Column 42, Detailed Description, Line 27:
Delete "occassion" and insert --occasion-- therefor Column 42, Detailed Description, Line 28:
Delete "occassion" and insert --occasion-- therefor Column 45, Detailed Description, Line 47:
Delete "1902" and insert --1904-- therefor Column 47, Detailed Description, Line 20:
Delete "ued" and insert --used-- therefor Column 49, Detailed Description, Line 48:
Delete "in/durin" and insert --in/during-- therefor Column 55, Detailed Description, Line 34:
Delete "SIBS," and insert --SIB3,-- therefor Column 56, Detailed Description, Line 55:
Delete "servingCellConfigCommonSlB," and insert --servingCellConfigCommonSIB,-- therefor Column 62, Detailed Description, Line 53:
Delete "occassion," and insert --occasion,-- therefor Column 63, Detailed Description, Line 25:
Delete "gI" and insert --gl-- therefor Column 66, Detailed Description, Line 40:
Delete "resoure/gap" and insert --resource/gap-- therefor Column 67, Detailed Description, Line 39:
Delete "a a" and insert --a-- therefor Column 78, Detailed Description, Line 32:
Delete "Lab VIEWMathScript." and insert --LabVIEWMathScript.-- therefor Column 79, Detailed Description, Lines 14-15:
After "manner", insert --.--